(12) United States Patent
Kuroda et al.

(10) Patent No.: US 10,790,735 B2
(45) Date of Patent: Sep. 29, 2020

(54) VIBRATION GENERATOR MOVING VIBRATOR BY MAGNETIC FIELD GENERATED BY COIL AND HOLDER USED IN VIBRATION-GENERATOR

(71) Applicant: MINEBEA CO., LTD., Kitasaku-gun, Nagano (JP)

(72) Inventors: Minoru Kuroda, Sakaiminato (JP); Makoto Tanaka, Kurayoshi (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 0 days.

(21) Appl. No.: 15/417,844

(22) Filed: Jan. 27, 2017

(65) Prior Publication Data
US 2017/0141643 A1    May 18, 2017

Related U.S. Application Data

(62) Division of application No. 13/618,987, filed on Sep. 14, 2012, now Pat. No. 9,590,463.

(30) Foreign Application Priority Data

Sep. 22, 2011    (JP) ................................. 2011-207335
Feb. 13, 2012    (JP) ................................. 2012-028847
(Continued)

(51) Int. Cl.
*H02K 33/02*    (2006.01)
*H02K 33/00*    (2006.01)
(Continued)

(52) U.S. Cl.
CPC ............. *H02K 33/02* (2013.01); *B06B 1/045* (2013.01); *H02K 1/06* (2013.01); *H02K 1/34* (2013.01);
(Continued)

(58) Field of Classification Search
CPC ........ H02K 33/00; H02K 33/02; H02K 35/00; H02K 35/02; H02K 7/065; H02K 41/02;
(Continued)

(56) References Cited

U.S. PATENT DOCUMENTS 2,237,338 A * 4/1941 Dale ........................ F16B 19/06
411/501
2,347,329 A * 4/1944 Morrow .................. E21C 25/36
16/263
(Continued)

FOREIGN PATENT DOCUMENTS

CN    201608618 U  * 10/2010
CN    201608618 U    10/2010
(Continued)

OTHER PUBLICATIONS

Dogn (CN-201608618-U) (Year: 2010).*
(Continued)

*Primary Examiner* — Tulsidas C Patel
*Assistant Examiner* — Robert E Mates
(74) *Attorney, Agent, or Firm* — Oliff PLC

(57) ABSTRACT

A holder is used while attached to a chassis of a vibration generator that moves a vibrator to generate a vibration. The holder includes a vibrator retention unit retaining the vibrator, a fixed unit fixed to the chassis, and an arm. The arm connects the fixed unit and the vibrator retention unit, and the arm supports the vibrator retention unit while the vibrator retention unit can be displaced with respect to the fixed unit. The fixed unit, the arm, and the vibrator retention unit are integrally formed using resin.

16 Claims, 43 Drawing Sheets

(30) Foreign Application Priority Data

| | | | |
|---|---|---|---|
| Feb. 13, 2012 | (JP) | ............................ | 2012-028848 |
| Jun. 8, 2012 | (JP) | ............................ | 2012-130712 |
| Jun. 8, 2012 | (JP) | ............................ | 2012-130758 |

(51) Int. Cl.

| | |
|---|---|
| *H02K 1/06* | (2006.01) |
| *H02K 1/34* | (2006.01) |
| *H02K 5/04* | (2006.01) |
| *H02K 7/06* | (2006.01) |
| *B06B 1/04* | (2006.01) |
| *H02K 5/24* | (2006.01) |
| *H02K 7/065* | (2006.01) |
| *H02K 5/02* | (2006.01) |

(52) U.S. Cl.
CPC .............. *H02K 5/02* (2013.01); *H02K 5/04* (2013.01); *H02K 5/24* (2013.01); *H02K 7/065* (2013.01); *H02K 33/00* (2013.01)

(58) Field of Classification Search
CPC ........ H02K 41/03; H02K 41/031; H02K 5/24; H02K 5/04; H02K 5/02; H02K 1/34; H02K 1/06; B06B 1/045
USPC .. 310/81, 12.31, 12.24, 12.25, 12.27, 12.32, 310/12.26
See application file for complete search history.

(56) References Cited

U.S. PATENT DOCUMENTS

| | | | |
|---|---|---|---|
| 3,634,928 A * | 1/1972 | Falcioni | B21J 15/02 29/243.53 |
| 4,121,837 A | 10/1978 | Tominari et al. | |
| 4,871,251 A | 10/1989 | Preikschat et al. | |
| 5,231,336 A | 7/1993 | van Namen | |
| 5,268,784 A | 12/1993 | Chaya | |
| 5,495,762 A | 3/1996 | Tamura et al. | |
| 5,674,137 A | 10/1997 | Maruko et al. | |
| 6,054,335 A | 4/2000 | Sun et al. | |
| 6,850,138 B1 * | 2/2005 | Sakai | H04R 9/025 335/222 |
| 7,671,493 B2 | 3/2010 | Takashima et al. | |
| 8,624,450 B2 | 1/2014 | Dong et al. | |
| 10,298,106 B2 | 5/2019 | Kuroda et al. | |
| 2002/0047388 A1 | 4/2002 | Ibata et al. | |
| 2003/0139238 A1 | 7/2003 | Konno et al. | |
| 2003/0142845 A1 | 7/2003 | Miyamoto et al. | |
| 2003/0169895 A1 | 9/2003 | Fukuyama | |
| 2004/0169425 A1 | 9/2004 | Aihara | |
| 2004/0251748 A1 | 12/2004 | Inagaki et al. | |
| 2005/0140219 A1 | 6/2005 | Sanematsu et al. | |
| 2005/0140225 A1 | 6/2005 | Fujinaka et al. | |
| 2007/0164628 A1 | 7/2007 | Fonseca et al. | |
| 2007/0241626 A1 | 10/2007 | Suzuki et al. | |
| 2008/0018187 A1 | 1/2008 | Yamaguchi et al. | |
| 2008/0306332 A1 | 12/2008 | Choi et al. | |
| 2009/0267422 A1 | 10/2009 | Komori et al. | |
| 2009/0267423 A1 | 10/2009 | Kajiwara et al. | |
| 2009/0309436 A1 | 12/2009 | Saito et al. | |
| 2010/0016769 A1 | 1/2010 | Rach et al. | |
| 2010/0213773 A1 | 8/2010 | Dong et al. | |
| 2010/0297403 A1 | 11/2010 | Thorpe et al. | |
| 2011/0018366 A1 | 1/2011 | Choi | |
| 2011/0051987 A1 | 3/2011 | Ueda et al. | |
| 2011/0089772 A1 | 4/2011 | Dong et al. | |
| 2011/0101796 A1 * | 5/2011 | Odajima | H02K 33/16 310/25 |
| 2011/0101797 A1 | 5/2011 | Lee et al. | |
| 2011/0115313 A1 | 5/2011 | Lee et al. | |
| 2011/0115327 A1 | 5/2011 | Pan | |
| 2011/0133577 A1 | 6/2011 | Lee | |
| 2011/0156500 A1 * | 6/2011 | Dong | H02K 33/16 310/25 |
| 2011/0241451 A1 | 10/2011 | Park | |
| 2011/0243368 A1 | 10/2011 | Doh et al. | |
| 2012/0032534 A1 | 2/2012 | Choi | |
| 2012/0104875 A1 | 5/2012 | Park | |
| 2012/0169148 A1 | 7/2012 | Kim et al. | |
| 2012/0313459 A1 | 12/2012 | Zhang | |
| 2013/0076178 A1 | 3/2013 | Kuroda | |

FOREIGN PATENT DOCUMENTS

| | | |
|---|---|---|
| CN | 201937432 U | 8/2011 |
| CN | 102223048 A | 10/2011 |
| EP | 0970758 A1 | 1/2000 |
| EP | 1515420 A1 | 3/2005 |
| JP | S63-134180 U | 9/1988 |
| JP | H02-243918 A | 9/1990 |
| JP | H04-340357 A | 11/1992 |
| JP | H05-88242 U | 12/1993 |
| JP | H07-170712 A | 7/1995 |
| JP | H09-85169 A | 3/1997 |
| JP | H10-14194 A | 1/1998 |
| JP | H10-14195 A | 1/1998 |
| JP | H10-308047 A | 11/1998 |
| JP | H11-192455 A | 7/1999 |
| JP | H11-214586 A | 8/1999 |
| JP | H11-275846 A | 10/1999 |
| JP | 2000-21491 A | 1/2000 |
| JP | 2001-046970 A | 2/2001 |
| JP | 2002-177882 A | 6/2002 |
| JP | 2002-200460 A | 7/2002 |
| JP | 2002-225067 A | 8/2002 |
| JP | 2002-361174 A | 12/2002 |
| JP | 2003-024871 A | 1/2003 |
| JP | 2003-154314 A | 5/2003 |
| JP | 2003515435 A | 5/2003 |
| JP | 2003-220363 A | 8/2003 |
| JP | 2003-305409 A | 10/2003 |
| JP | 2004-023909 A | 1/2004 |
| JP | 2004-195444 A | 7/2004 |
| JP | 2004-261684 A | 9/2004 |
| JP | 2005-12935 A | 1/2005 |
| JP | 2005-12987 A | 1/2005 |
| JP | 2005-028331 A | 2/2005 |
| JP | 2005-195639 A | 7/2005 |
| JP | 2005-303895 A | 10/2005 |
| JP | 2006-150310 A | 6/2006 |
| JP | 2006-320887 A | 11/2006 |
| JP | 2007-104898 A | 4/2007 |
| JP | 2008-154303 A | 7/2008 |
| JP | 2009-081913 A | 4/2009 |
| JP | 2009-100595 A | 5/2009 |
| JP | 2009-213952 A | 9/2009 |
| JP | 2009-303443 A | 12/2009 |
| JP | 2010-29037 A | 4/2010 |
| JP | 2010-082508 A | 4/2010 |
| JP | 2010-089061 A | 4/2010 |
| JP | 2010-094567 A | 4/2010 |
| JP | 2011-19384 A | 1/2011 |
| JP | 2011-030370 A | 2/2011 |
| JP | 2011-72856 A | 4/2011 |
| JP | 2011-097747 A | 5/2011 |
| JP | 2011-115672 A | 6/2011 |
| JP | 2011-173074 A | 9/2011 |
| KR | 20110002221 A | 1/2011 |

OTHER PUBLICATIONS

Aug. 4, 2015 Office Action issued in Japanese Patent Application No. 2011-207335.

Nov. 24, 2015 Office Action issued in Japanese Patent Application No. 2012-028848.

Nov. 24, 2015 Office Action issued in Japanese Patent Application No. 2012-028847.

Mar. 22, 2016 Office Action issued in Japanese Patent Application No. 2012-130712.

(56) References Cited

OTHER PUBLICATIONS

Mar. 29, 2016 Office Action issued in Japanese Patent Application No. 2012-130758.
Jul. 6, 2016 Office Action Issued in U.S. Appl. No. 13/618,987.
Nov. 9, 2015 Office Action issued in U.S. Appl. No. 13/618,987.
Oct. 24, 2016 Notice of Allowance issued in U.S. Appl. No. 13/618,987.
Dec. 5, 2014 Office Action issued in U.S. Appl. No. 13/618,987.
Jul. 2, 2015 Office Action issued in U.S. Appl. No. 13/618,987.
Sep. 8, 2017 Office Action issued in U.S. Appl. No. 15/417,927.
Sep. 12, 2017 Office Action issued in U.S. Appl. No. 15/417,901.
Aug. 8, 2017 Office Action issued in Japanese Patent Application No. 2016-219347.
Aug. 7, 2018 Office Action issued in Japanese Patent Application No. 2017-208030.
May 25, 2018 Office Action issued in U.S. Appl. No. 15/417,927.
Jul. 26, 2018 Office Action issued in U.S. Appl. No. 15/417,901.
Watanabe (JP 2010094567 A) English Translation (Year: 2010).
Jun. 13, 2019 Office Action Issued for U.S. Appl. No. 15/417,901.
Jun. 14, 2019 Office Action issued in U.S. Appl. No. 16/416,832.
Sep. 17, 2019 Office Action issued in Japanese Patent Application No. 2018-214273.
Dec. 10, 2019 Office Action issued in U.S. Appl. No. 15/417,901.
Jan. 24, 2020 Office Action issued in U.S. Appl. No. 16/416,832.
Jul. 9, 2020 Office Action issued in U.S. Appl. No. 16/416,832.

* cited by examiner

VIBRATION GENERATOR MOVING VIBRATOR BY MAGNETIC FIELD GENERATED BY COIL AND HOLDER USED IN VIBRATION-GENERATOR

This application is a divisional of U.S. application Ser. No. 13/618,987 filed Sep. 14, 2012, which is based on and claims priority under 35 U.S.C. 119 from Japanese Patent Application No. 2011-207335, No. 2012-028847, No. 2012-028848, No. 2012-130712, and No. 2012-130758 filed with the Japan Patent Office on Sep. 22, 2011, Feb. 13, 2012, Feb. 13, 2012, Jun. 8, 2012, and Jun. 8, 2012 respectively, the entire content of which is hereby incorporated by reference.

BACKGROUND OF THE INVENTION

Field of the Invention

The present invention relates to a holder and a vibration generator, particularly to a holder, which is used in a vibration generator that moves a vibrator to generate a vibration by passage of a current through a coil, and the vibration generator.

Description of the Related Art

Various vibration generators having a structure, in which a vibrator including a magnet is supported by a chassis with a spring unit interposed therebetween, are used as the vibration generator that moves the vibrator to generate the vibration. This kind of vibration generator includes a coil, which is disposed below a magnet while being opposite the magnet. When a current is passed through the coil to generate a magnetic field, the vibrator moves while deforming a spring unit.

For example, Document 1 discloses a vibration generator having a structure in which a vibration unit having the magnet is supported using a plate spring. In the vibration generator, one plate-like coil is disposed opposite the magnet of the vibration unit. One end of the plate spring is fixed to a chassis with a screw. The other end of the plate spring is fixed to a weight of the vibration unit by caulking.

Document 2 discloses a vibration generating device, in which the magnet is attached to a movable block and the coil is wound around a rod-shaped yoke body disposed along the magnet. In the vibration generating device, the spring unit supporting the movable block and a frame are integrally molded using a resin material.

[Document 1] Japanese Patent Laying-Open No. 2003-24871

[Document 2] Japanese Patent Laying-Open No. 2010-94567

In the vibration generator disclosed in Document 1, the vibrator is supported using the plate spring attached to the chassis. Therefore, a structure of a portion in which the plate spring is attached onto the chassis side becomes complicated. Specifically, in the vibration generator disclosed in Document 1, the plate spring is attached to the chassis with the screw. Therefore, an assembly man-hour of the vibration generator increases, and the number of components also increases, which increases a production cost of the vibration generator.

The problem becomes more prominent with increasing demand for downsizing and a low profile of the vibration generator. That is, because the downsizing of the component advances with the downsizing of the vibration generator, it is necessary to adopt attachment methods, such as spot welding, instead of screw clamp or caulking, and the structure of the attachment portion between the components becomes complicated. For example, in the case that the spot welding is performed to the attachment portion of the plate spring and the chassis, it is necessary to perform the spot welding at many points in order to maintain high reliability of the vibration generator, and sometimes it takes a lot of trouble with the production. This is because a region where the spot welding is performed is relatively brittle against an impact force.

The vibration generating device disclosed in Document 2 has the structure in which the spring unit and the frame are integrally molded, and the problem with the method for joining the spring unit and the chassis is not originally generated. However, in this case, unfortunately the material used for the chassis is restricted to a material, which can be molded while being integral with the spring unit.

An object of the present invention is to provide a holder, which is used in the high-impact-resistance, easily constructible, and low-production-cost vibration generator, and the vibration generator.

SUMMARY OF THE INVENTION

In accordance with one aspect of the present invention, a holder, which is used while attached to a chassis of a vibration generator that moves a vibrator to generate a vibration, includes: a vibrator retention unit retaining the vibrator; a fixed unit being fixed to the chassis; and an arm connecting the fixed unit and the vibrator retention unit, the arm supporting the vibrator retention unit while the vibrator retention unit can be displaced with respect to the fixed unit, wherein the fixed unit, the arm, and the vibrator retention unit are integrally molded using resin.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a vibration generator using a holder according to an exemplary embodiment of the present invention will be described with reference to the drawings.

A vibration generator has a structure in which a vibrator retaining a magnet is supported by a chassis while being able to be displaced with respect to the chassis. A coil is disposed near the vibrator. The vibrator generates a magnetic field in order to change at least one of a position and an attitude with respect to the chassis. The vibration generator is what is called a linear type vibration generator that generates a vibration force by reciprocating the vibrator in response to excitation of the coil.

First Embodiment

Figure 1:
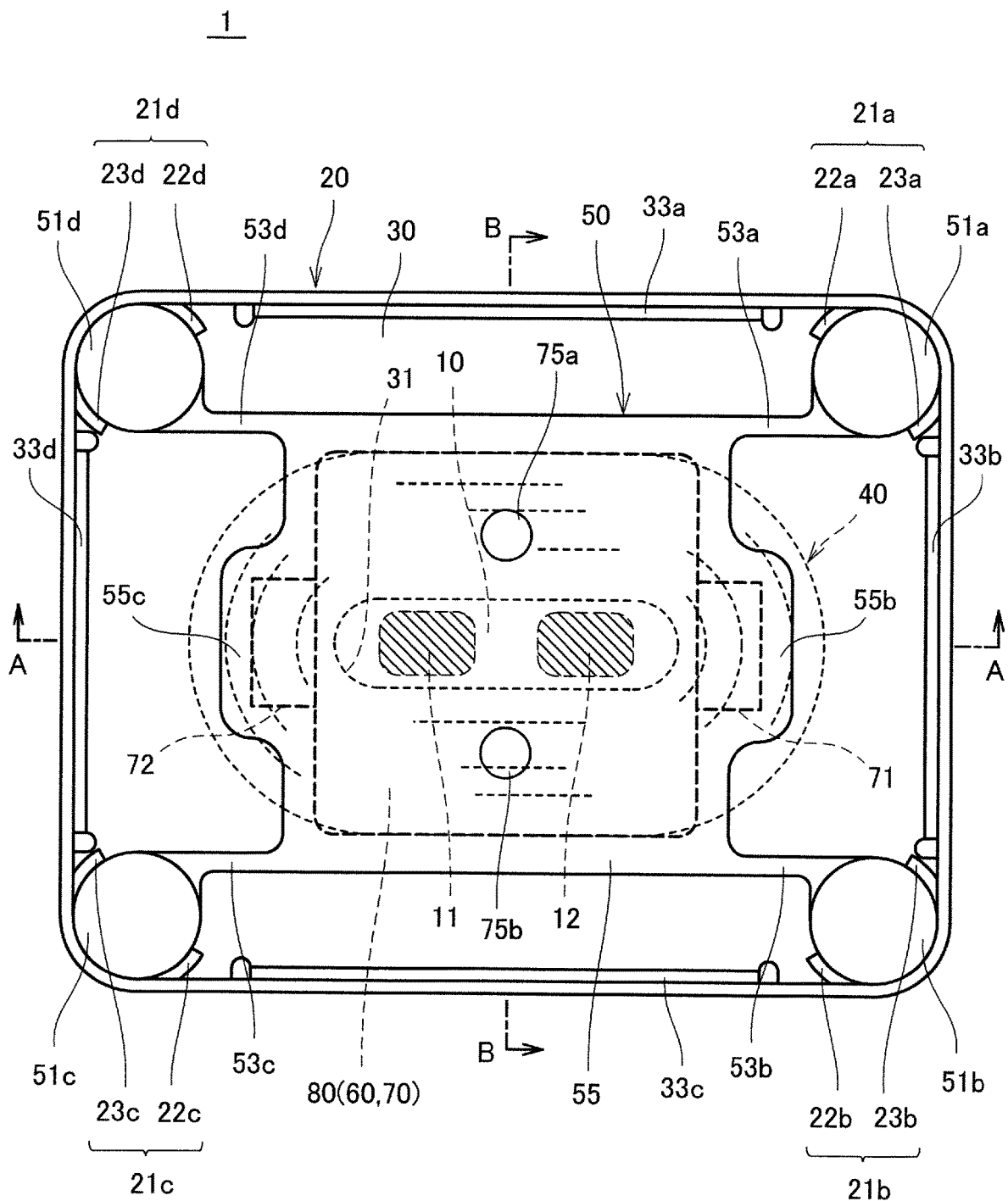
FIG. 1 is a plan view illustrating a vibration generator according to a first embodiment of the present invention.
Figure 2:
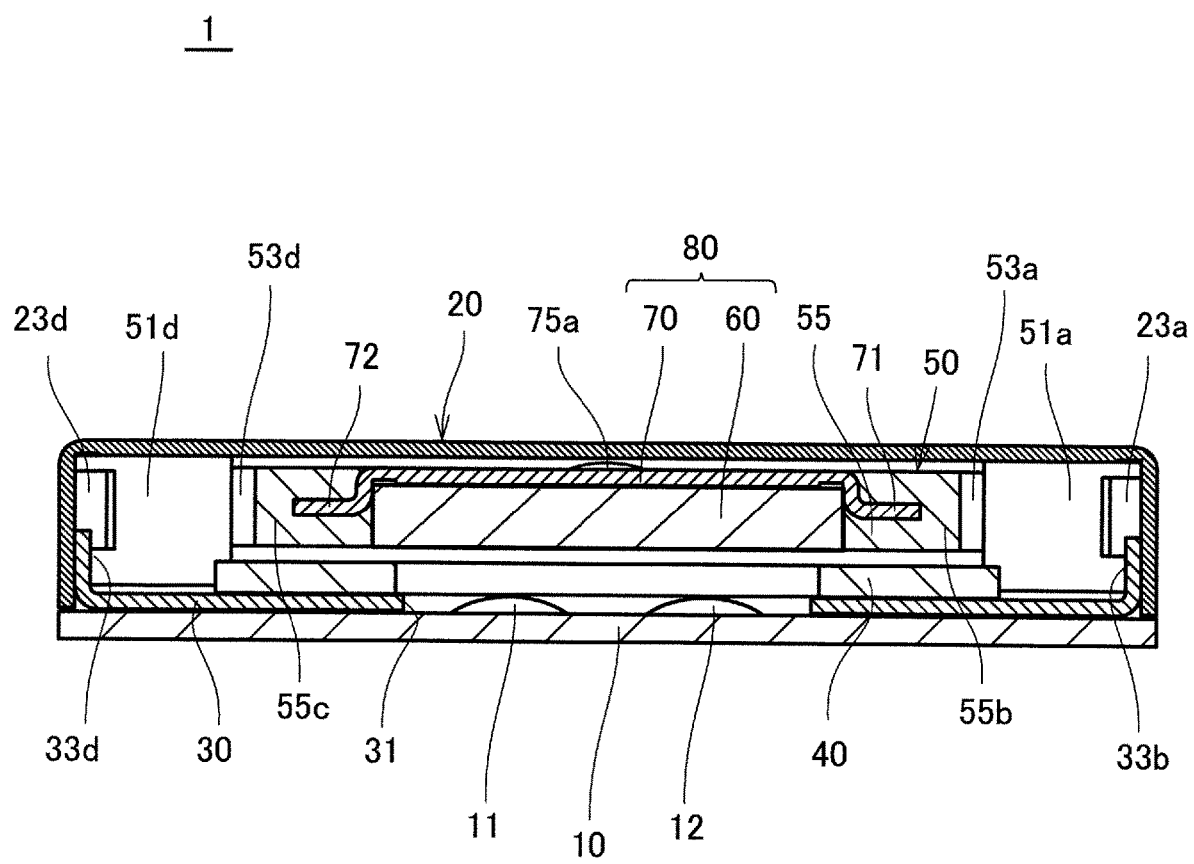
FIG. 2 is a sectional view taken on a line A-A of FIG. 1.

FIG. 1 is a plan view illustrating a vibration generator according to a first embodiment of the present invention. FIG. 2 is a sectional view taken on a line A-A of FIG. 1.

In FIG. 1, a holder 50 and the like, which are originally hidden behind an upper surface of a frame 20, are partially illustrated by a solid line for the purpose of easy understanding of a component layout in a vibration generator 1.

In the following description, with respect to vibration generator 1, sometimes an X-axis direction of an coordinate in FIG. 1 is referred to as a crosswise direction (a positive direction of an X-axis is a tight direction when viewed from an origin), and a Y-axis direction is referred to as a front-back direction (a positive direction of a Y-axis is backward when viewed from the origin). Sometimes a Z-axis direction (direction perpendicular to an XY-plane in FIG. 1) in FIG. 2 is referred to as a vertical direction (a positive direction of a Z-axis is upward when viewed from the origin).

[Entire Structure of Vibration Generator 1]

As illustrated in FIG. 1, vibration generator 1 includes a double-side board (an example of the circuit board) 10, frame (an example of the chassis) 20, a bottom plate 30, a coil 40, and holder 50. In the first embodiment, holder 50 includes four columnar bodies (an example of the fixed unit) 51 (51a, 51b, 51c, and 51d), four arms 53 (53a, 53b, 53c, and 53d), and one vibrator retention unit (hereinafter sometimes simply referred to as retention unit) 55. A vibrator 80 including a magnet 60 and a yoke 70 is retained in retention unit 55.

Vibration generator 1 is formed into a low-profile, substantially-rectangular-solid shape, in which a vertical size is relatively small, as a whole. For example, in vibration generator 1, external dimensions in the crosswise direction and the front-back direction range from about 10 millimeters to about 20 millimeters. Vibration generator 1 has a box-shaped external form, in which side surfaces in all directions and an upper surface are constructed by frame 20 and a bottom surface is covered with double-side board 10.

In the first embodiment, frame 20 and yoke 70 are made of soft magnetic materials, such as iron.

Double-side board 10 is a printed wiring board in which patterns are provided in double sides. Two terminals 11 and 123 are provided in a central portion on the upper surface of double-side board 10. Terminals 11 and 12 are electrically connected to a pattern (not illustrated) provided on the bottom surface of double-side board 10. Winding end portions of coil 40 are connected to terminals 11 and 12 by soldering, and coil 40 can be energized through the pattern on the bottom surface of double-side board 10. A method for connecting the winding end portions of coil 40 is not limited to the soldering, but terminals 11 and 12 and the winding end portions of coil 40 may be connected by techniques, such as resistance welding and laser welding.

Bottom plate 30 is formed into a rectangular plate shape so as to cover the substantially whole upper surface of double-side board 10. For example, bottom plate 30 and double-side board 10 are fixed to each other with an adhesive sheet or a bonding agent interposed therebetween. In other words, double-side board 10 is connected along bottom plate 30. An opening 31 is provided in the central portion of bottom plate 30 such that terminals 11 and 12 are exposed upward. Four joining units 33 (33a, 33b, 33c, and 33d) are formed in four sides of bottom plate 30. As illustrated in FIG. 2, each joining unit 33 is bent upward at substantial 90 degrees from bottom plate 30. A section of each joining unit 33 has an L-shape together with a region on double-side board 10 of bottom plate 30. Each joining unit 33 is formed such that an outside surface of joining unit 33 contacts an inner surface of a side portion of frame 20. Bottom plate 30 is disposed further away from coil 40 with respect to vibrator 80. That is, bottom plate 30 and frame 20 covers vibrator 80 and coil 40.

In the first embodiment, bottom plate 30 is made of a nonmagnetic material. Bottom plate 30 is made of nonmagnetic metallic materials, such as nonmagnetic stainless steel. Bottom plate 30 is not limited to the metallic material, but bottom plate 30 may be made of resin.

Frame 20 has a rectangular-solid shape, in which the bottom surface is opened, as a whole. For example, frame 20 is formed by drawing a steel plate. Corner portions (region between the side surfaces) of frame 20 are connected with an R-surface portion interposed therebetween when viewed from above. As illustrated in FIG. 2, frame 20 is disposed so as to cover the upper surface of double-side board 10 from above of double-side board 10. Frame 20 is fixed to bottom plate 30 such that the inner surface of the side surface is connected to joining unit 33 by bonding or welding while contacting the side surface of joining unit 33 of bottom plate 30. In other words, bottom plate 30 is attached to frame 20. Frame 20 may be fixed to bottom plate 30 by fitting frame 20 in joining unit 33 or by another method.

Thus, because vibration generator 1 has the structure surrounded by frame 20, vibration generator 1 is hardly affected by the surrounding magnetic field. A magnetic flux of vibration generator 1 hardly leaks to the outside, and the magnetic flux is prevented from affecting an external device or circuit.

Because vibration generator 1 is surrounded into a box shape by frame 20 and bottom plate 30, a stiffness of vibration generator 1 is enhanced. Accordingly, vibration generator 1 can surely generate the vibration. Vibration generator 1 is easily attached to the external device.

Coil 40 has an elliptical, planar shape as a whole, and coil 40 is an air core coil around which a conductive wire is wound. That is, coil 40 is a low-profile coil in which a size in a winding axis direction is smaller than that in a direction orthogonal to the winding axis direction. Coil 40 may be constructed by slicing wound metallic foil or by laminating a sheet coil. Coil 40 may have a circular shape or polygonal shapes, such as a quadrangular shape, when viewed from above.

As illustrated in FIG. 2, coil 40 is disposed on the upper surface of bottom plate 30 such that the winding axis direction of coil 40 becomes the vertical direction. As illustrated in FIG. 1, when viewed from above, coil 40 is disposed in the central portion of vibration generator 1 while the surface of coil 40 is opposite the surface of vibrator 80. Coil 40 and bottom plate 30 are electrically insulated from each other. The two winding end portions of coil 40 are arrayed from the inside of coil 40 onto the upper surface side of double-side board 10 through opening 31, and connected to terminals 11 and 12.

Holder 50, magnet 60, and yoke 70 are integrally molded by insert molding. That is, holder 50 and vibrator 80 are integrally molded. In the first embodiment, pillar body 51, arm 53, and retention unit 55 are integrally molded using an elastic material (an example of the resin). For example, beat-resistant fluorine rubber or silicon rubber can be used as the elastic material. Holder 50 is made of the rubber, which allows a heat resistance property of vibration generator 1 to be enhanced. The elastic material is not limited to the rubber, but various materials may be used as the elastic material.

[Structures of Holder 50 and Vibrator 80]

Figure 3:
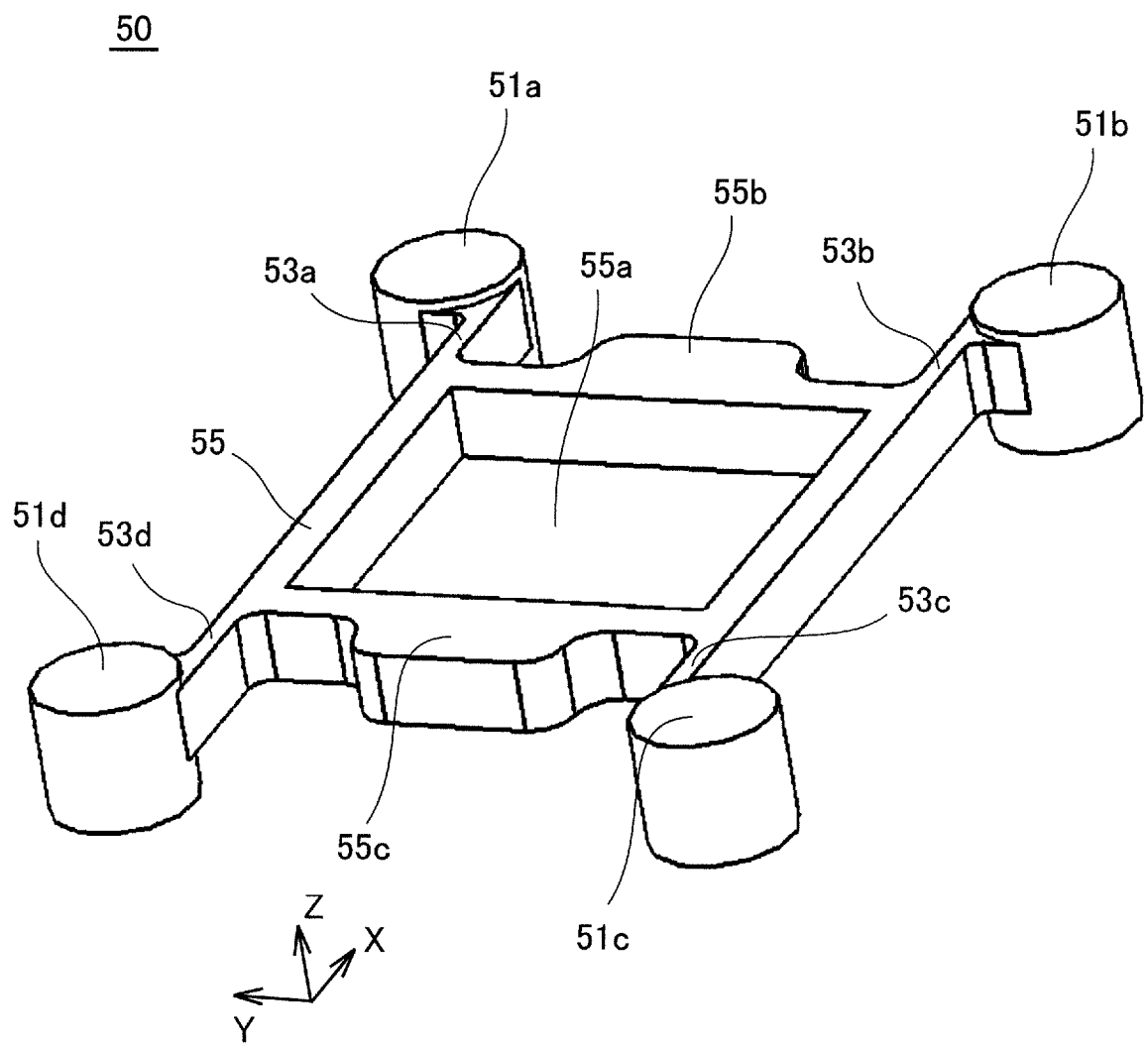
FIG. 3 is a perspective view illustrating a holder.

FIG. 3 is a perspective view illustrating holder 50.

In the first embodiment, holder 50 and vibrator 80, which includes magnet 60 and yoke 70, are integrally molded. For the sake of convenience, holder 50 is illustrated in FIG. 3 while magnet 60 and yoke 70 are not attached to retention unit 55. In other words, vibrator 80 is not illustrated in FIG. 3, but only holder 50 made of the elastic material is illustrated.

Each pillar body 51 has a columnar shape in which a height direction is the vertical direction. A height of each pillar body 51 is less than a size in the vertical direction of the inside of frame 20.

As illustrated in FIG. 1, four columnar bodies 51 are disposed at four corners of holder 50 when viewed from above. Each pillar body 51 is disposed in the R-surface portion of the side surface of frame 20.

As illustrated in FIGS. 1 and 2, vibrator 80 has a plate shape parallel to the horizontal plane (an XY-plane in FIG. 1). Vibrator 80 is formed into a substantially rectangular shape, in which each side is parallel to the front-back direction or the crosswise direction, when viewed from above.

As illustrated in FIG. 1, vibrator 80 is disposed in the central portion of holder 50, namely the central portion of vibration generator 1 when viewed from above. As illustrated in FIG. 2, vibrator 80 is disposed in substantially parallel to coil 40 while the surface of vibrator 80 is opposite the surface of coil 40.

Magnet 60 is a low-profile permanent magnet having a rectangular-solid shape. For example, magnet 60 is magnetized into two poles in a bottom-side portion opposite coil 40 such that an N-pole and an S-pole are divided in the front-back direction. Yoke 70 is a rectangular magnetic plate, which is attached so as to cover the upper surface of magnet 60, when viewed from above. The upper surface of yoke 70 is disposed opposite the inner surface of the upper surface of frame 20. Yoke 70 includes ears 71 and 72 that project partially from the sides of the right and left toward the crosswise direction. For example, yoke 70 and magnet 60 are bonded to each other by the spot welding or bonding, thereby constituting integral vibrator 80. Vibrator 80, which includes yoke 70 and magnet 60, and holder 50 are integrally molded by the insert molding while yoke 70 and magnet 60 are bonded. Projections 75a and 75b are provided in the upper surface of yoke 70.

As illustrated in FIG. 3, retention unit 55 has a square-frame shape, which forms a substantially square aperture 55a in which vibrator 80 is disposed. In retention unit 55, two overhangs 55b and 55c are formed so as to overhang in the crosswise direction. As illustrated in FIG. 2, yoke 70 is disposed together with magnet 60 such that ears 71 and 72 are buried in overhangs 55b and 55c. Therefore, vibrator 80 is configured to hardly drop out from retention unit 55.

Each of four arms 53 is formed so as to connect the corner portion of retention unit 55 and pillar body 51 closest to the corner portion. Each arm 53 is formed into a beam shape that extends in the crosswise direction. As illustrated in FIG. 2, a size in a width direction (front-back direction) of arm 53 is smaller than that in a longitudinal direction (vertical direction). Because each arm 53 is made of the elastic material, arm 53 is easily bent in the front-back direction. The relationship between the sizes in the width direction and the longitudinal direction of arm 53 is not limited to the example in FIG. 2. The size in the width direction of arm 53 may be equal to that in the longitudinal direction, or greater than that in the longitudinal direction.

Each of four arms 53 is formed so as to be easily bent in the front-back direction, so that vibrator 80 can mainly be displaced in the front-back direction with respect to pillar body 51. That is, vibrator 80 is supported by arm 53 so as to be able to be displaced in a direction substantially parallel to the horizontal plane.

Four columnar bodies 51 of holder 50 are fixed to frame 20, whereby holder 50 is attached to frame 20. Therefore, the basic structure of vibration generator 1 is formed such that vibrator 80 is supported by holder 50, which is integrally molded separately from frame 20, while being able to be displaced with respect to frame 20.

In vibration generator 1, coil 40 generates the magnetic field in order to reciprocate vibrator 80 with respect to frame 20. That is, when the current is passed through coil 40, coil 40 is excited to generate the magnetic field in the vertical direction. When the magnetic field is generated, magnet 60 is affected by the magnetic field to generate repulsive and attractive forces. A force displacing vibrator 80 forward or backward according to the direction of the magnetic field and the dispositions of the magnetic poles of magnet 60 is affected to vibrator 80. Therefore, vibrator 80 is displaced in the front-back direction while bending each arm 53. When viewed from above, vibrator 80 performs linearly reciprocating movement with respect to frame 20 by passing an alternating current through coil 40. Therefore, vibration generator 1 generates a vibration force.

When the alternating current decreases to weaken or eliminate the magnetic field, vibrator 80 returns to the central portion of vibration generator 1 by a restoring force of arm 53 when viewed from above. At this point, because arm 53 is made of the elastic material, energy consumed by arm 53 becomes relatively large. Accordingly, the vibration is quickly damped.

In the first embodiment, because bottom plate 30 is made of the nonmagnetic material, a magnetic attractive force is not generated between vibrator 80 and bottom plate 30. Vibrator 80 is smoothly and efficiently displaced according to the magnetic field generated by coil 40. Accordingly, vibration generator 1 can be thinner and properly operated.

[Attachment Structure of Holder 50 to Frame 20]

In the first embodiment, pillar body 51 engages an engaging unit 21 (21a, 21b, 21c, and 21d) provided in frame 20, thereby attaching pillar body 51 to frame 20. Therefore, holder 50 is configured to be able to be easily attached to frame 20.

Figure 4:
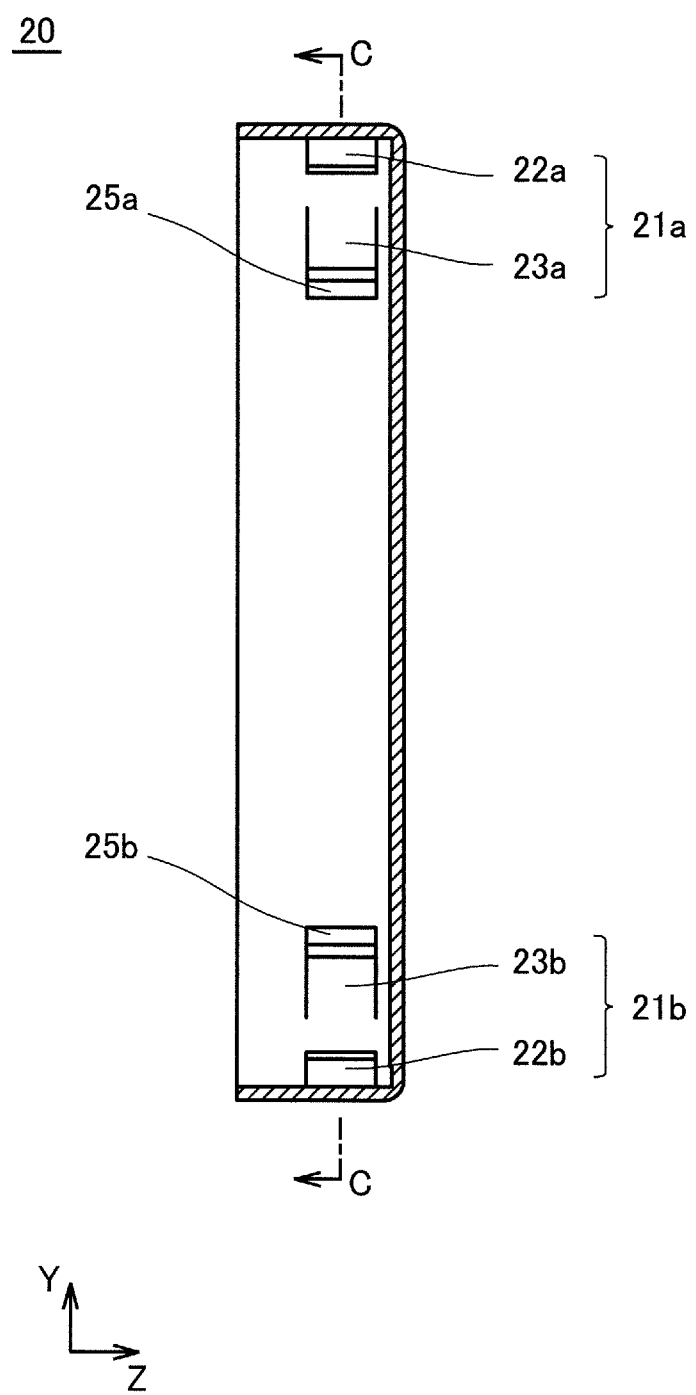
FIG. 4 is a sectional view of a frame taken on a line B-B of FIG. 1.
Figure 5:
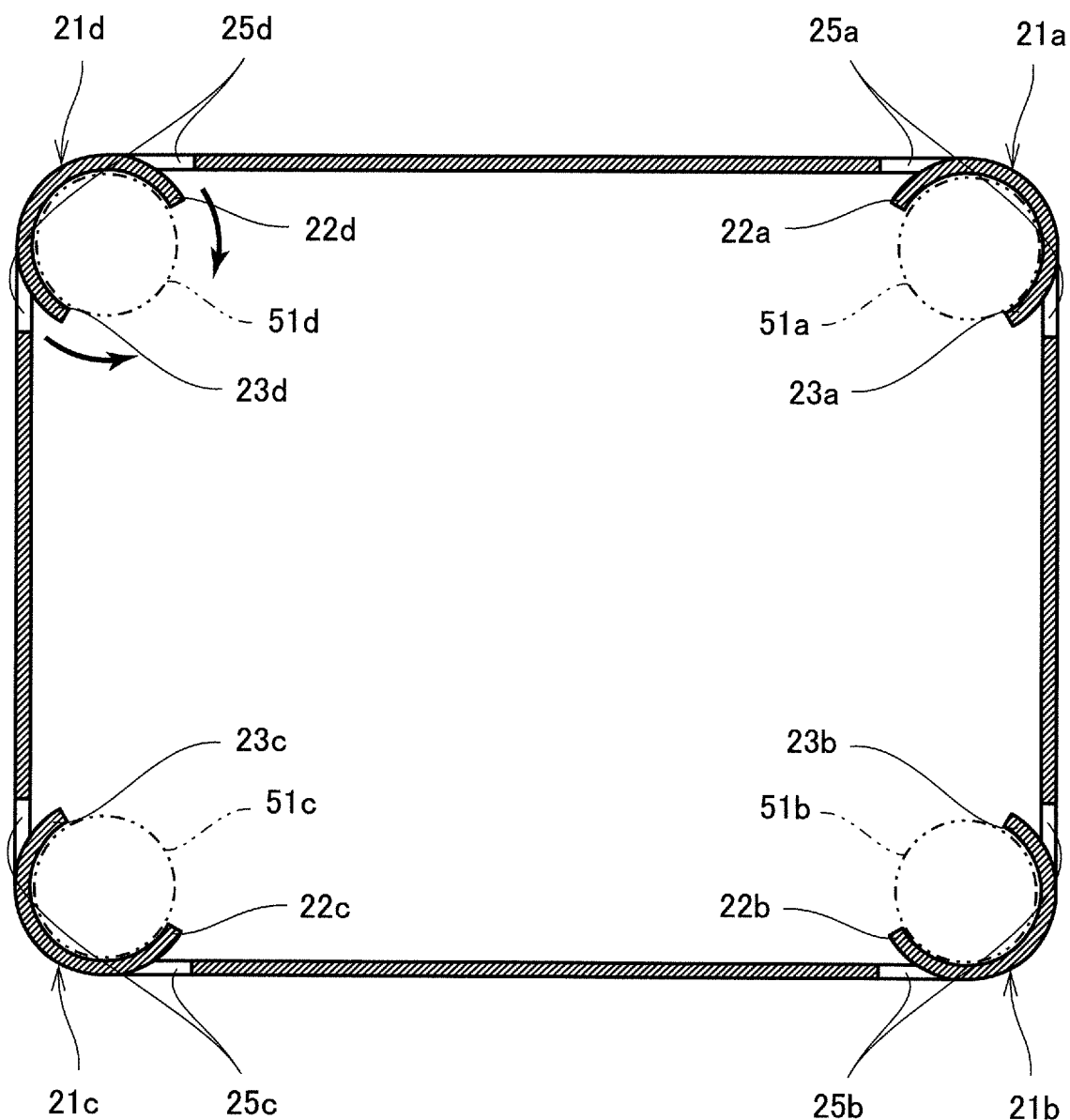
FIG. 5 is a sectional view of the frame taken on a line C-C of FIG. 4.

FIG. 4 is a sectional view of frame 20 taken on a line B-B of FIG. 1. FIG. 5 is a sectional view of frame 20 taken on a line C-C of FIG. 4.

In the first embodiment, as illustrated in FIG. 5, engaging units 21 are provided in the corner portions of frame 20 when viewed from above. Each of four engaging units 21 includes two claws 22 and 23, namely, a first claw 22 (22a, 22b, 22c, and 22d) and a second claw 23 (23a, 23b, 23c, and 23d).

As illustrated in FIG. 4, a U-shape notch is partially provided in the side surface of frame 20, and an interior portion of the notch is pressed into the inside of frame 20, thereby forming each of claws 22 and 23 of engaging unit 21. Accordingly, claws 22 and 23 and frame 20 are integrally molded. Each of claws 22 and 23 is formed in the above manner to partially provide a gap 25 (25a, 25b, 25c, and 25d) in the side surface of frame 20.

In the first embodiment, claws 22 and 23 are formed into the shape corresponding to the shape of pillar body 51. That is, because pillar body 51 has the columnar shape, claws 22 and 23 are formed into the shape along a side circumferential surface of pillar body 51. As illustrated in FIG. 5, when viewed from above, each engaging unit 21 is formed such that at least a semicircle of the outer circumference surface of pillar body 51 disposed in engaging unit 21 is surrounded by claws 22 and 23 and the R-surface portion between the side surfaces of frame 20.

In the case that holder 50 is disposed in frame 20, four columnar bodies 51 are fitted in four engaging units 21. Therefore, each pillar body 51 is held between claws 22 and 23 of engaging unit 21. In other words, in each pillar body 51, the side circumferential surface is gripped by claws 22 and 23 of engaging unit 21. Pillar body 51 and engaging unit 21 engage each other to fix pillar body 51 to frame 20, thereby attaching holder 50 to frame 20.

Each of claws 22 and 23 is caulked in pillar body 51 while each pillar body 51 is fitted in engaging unit 21. For example, as indicated by an arrow in FIG. 5, first claw 22d is pressed in engaging unit 21d forward (a downward direction in FIG. 5) and second claw 23d is pressed in engaging unit 21d rightward (a rightward direction in FIG. 5). Claws 22 and 23 invade in pillar body 51 by caulking claws 22 and 23, and pillar body 51 is strongly fixed to frame 20.

In the vibration generator in the background art, the vibrator is supported using the plate spring attached to the chassis. For example, in the vibration generator in which the plate spring is attached to the chassis using the screw, unfortunately the structure of the portion in which the plate spring is attached onto the chassis side becomes complicated. Therefore, the assembly man-hour of the vibration generator increases, and the number of components also increases, which increases the production cost of the vibration generator. The problem becomes more prominent with increasing demand for the downsizing and the low profile of the vibration generator. That is, because the downsizing of the component advances with the downsizing of the vibration generator, it is necessary to adopt attachment methods, such as the spot welding, instead of the screw clamp or caulking, and the structure of the attachment portion between the components becomes complicated. For example, in the case that the spot welding is performed to the attachment portion of the plate spring and the chassis, the region where the spot welding is performed becomes brittle against the impact force. Therefore, it is necessary to perform the spot welding at many points in order to maintain high reliability of the vibration generator, and sometimes it takes a lot of trouble with the production. The problem with the method for joining the spring unit and the chassis is not originally generated in the vibration generating device in the background art that has the structure in which the spring unit and the frame are integrally molded. However, in this case, unfortunately the material used for the chassis is restricted to a material, which can be molded while being integral with the spring unit.

On the other band, in the first embodiment, holder 50 including pillar body 51 is integrally molded, and pillar body 51 is fitted in engaging unit 21 to attach holder 50 to frame 20. Holder 50 can easily be attached to frame 20, and the number of components is suppressed to a low level, so that the production cost of vibration generator 1 can be reduced. Because each holder 50 and frame 20 is integrally formed, the attachment portion of holder 50 and frame 20 does not become brittle. Accordingly, the reliability of vibration generator 1 can be enhanced against the impact. It is not necessary to attach holder 50 to frame 20 using other members, such as the screw, so that the downsizing, low profile, weight reduction of vibration generator 1 can be implemented.

In the structure of the background art in which the spring unit supporting the vibrator and the chassis are integrally molded using resin, unfortunately it is necessary that the spring unit and the chassis be made of the same material for the viewpoint of material selection. However, in the first embodiment, the number of components decreases because holder 50 and frame 20 are constructed by different members. While holder 50 and frame 20 have the simple structures that can easily be assembled, the material for frame 20 can properly be selected. Accordingly, frame 20 can be configured to exert its function without separately providing a member that acts as a magnetic circuit or a magnetic shield.

In holder 50, pillar body 51, arm 53, and vibrator retention unit 55 are integrally molded using the elastic material. Accordingly, the number of components decreases, and holder 50 can easily be produced. In the first embodiment, magnet 60 and yoke 70 are formed by the insert molding together with holder 50. Accordingly, holder 50 can easily be constructed while retaining vibrator 80, and a production process of vibration generator 1 can be simplified.

Engaging unit 21 and frame 20 are integrally formed such that claws 22 and 23 are formed while the notch is partially provided in the side surface of frame 20. Accordingly, the number of components can decrease to reduce the production cost.

In the attachment stricture of holder 50 to frame 20, columnar pillar body 51 is gripped by two claws 22 and 23. Accordingly, while the structure of vibration generator 1 is simplified, pillar body 51 is surely positioned in frame 20, and accuracy of the attachment of holder 50 to frame 20 can be enhanced. Because of the structure in which claws 22 and 23 are caulked with respect to pillar body 51, holder 50 is strongly attached to frame 20.

The attachment structure of vibrator 80 to holder 50, namely, the attachment structure of magnet 60 and yoke 70 to holder 50 is not limited to the insert molding. For example, magnet 60 and yoke 70, which are joined to each other by the welding, may be assembled in and bonded to integrally-molded holder 50. Alternatively, holder 50 and yoke 70 may be integrally molded and then magnet 60 may be attached to yoke 70.

[Structure of Yoke]

Vibrator 80 moves under the influence of the magnetic field, which is generated by the coil disposed below. Therefore, sometimes vibrator 80 is displaced in the vertical direction or tilted from the horizontal plane (from this standpoint, the movement of vibrator 80 is not strictly performed within the horizontal plane. However, a displacement amount or an attitude change amount in the vertical direction of vibrator 80 is relatively small. Therefore, hereinafter the movement of vibrator 80 is macroscopically referred to as "vibrator 80 moves horizontally"). In the case that a force is externally applied to vibration generator 1, sometimes vibrator 80 is vertically displaced with respect to frame 20. Vibration generator 1 has the low-profile structure, and a distance between frame 20 and the upper surface of vibrator 80 is relatively narrow. Therefore, when vibrator 80 is vertically displaced or inclined with respect to frame 20, sometimes an upper portion of vibrator 80 contacts the inner surface of the upper surface of frame 20.

In the first embodiment, projections 75a and 75b on the upper surface of yoke 70 are configured to abut on frame 20 when vibrator 80 is vertically displaced or inclined with respect to frame 20.

As illustrated in FIG. 1, projections 75a and 75b are provided to project from the upper surface of yoke 70 toward the inner surface of the upper surface of frame 20. Projections 75a and 75b are symmetrically provided with respect to a plane (a plane parallel to a ZX-plane), which passes through the center of vibrator 80 and is perpendicular to the front-back direction that is the movement direction of vibrator 80. Projections 75a and 75b are located at two points on the plane, which passes through the center of vibrator 80 and is parallel to a YZ-plane. That is, in the first embodiment, projection 75a is provided at the back of the central portion in the crosswise direction of the upper surface of vibrator 80. Projection 75b is provided in front of the central portion in the crosswise direction of the upper surface of vibrator 80, and projection 75b is provided so as to be symmetrical to projection 75a.

Figure 6:
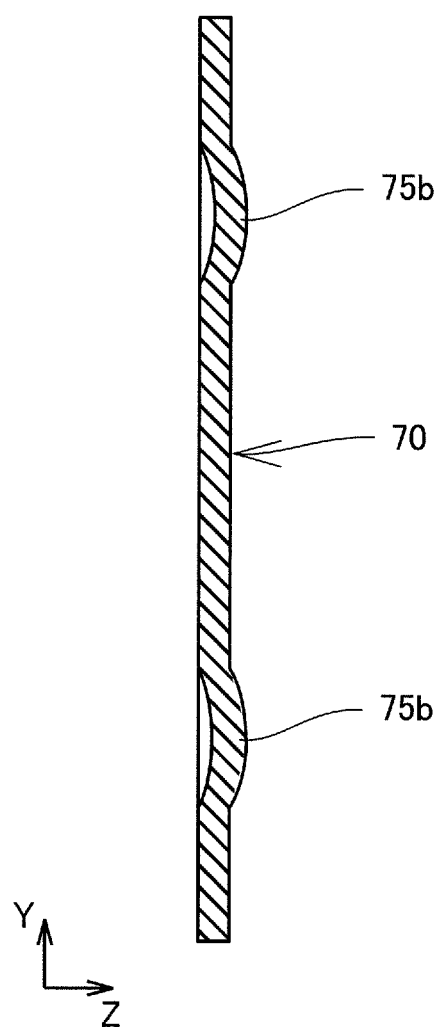
FIG. 6 is a sectional view of a yoke taken on the line B-B of FIG. 1.

FIG. 6 is a sectional view of yoke 70 taken on the line B-B of FIG. 1.

As illustrated in FIG. 6, in the first embodiment, each of projections 75a and 75b has a curved shape that is convex upward (the right direction in FIG. 6). In other words, each of projections 75a and 75b has the curved shape that is convex toward the inner surface of the upper surface of frame 20. For example, in each of projections 75a and 75b, the surface shape is formed into a substantially spherical shape (a substantially arc shape in the cross section in FIG. 6). Each of projections 75a and 75b is formed such that projections 75a and 75b are extruded upward from plate-like yoke 70 by press working or sheet-metal working. That is, each of projections 75a and 75b and the remaining portion of yoke 70 are integrally formed. Each of projections 75a and 75b is not limited to the structure in FIG. 6. For example, each of projections 75a and 75b may be provided such that a member formed separately from the main body of yoke 70 is attached to the upper surface of yoke 70. Each of projections 75a and 75b may be formed such that another liquid member (for example, an epoxy resin material or a melted metal) is put on the upper surface of yoke 70 and then cured or solidified.

In the first embodiment, because projections 75a and 75b are provided on the upper surface of yoke 70, even if vibrator 80 comes close to frame 20, at first projection 75a or projection 75b contacts frame 20. An area that contacts frame 20 is restricted because the region that contacts frame 20 is restricted to projections 75a and 75b. Accordingly, when projections 75a and 75b of vibrator 80 contacts frame 20, a frictional force acting on vibrator 80 is reduced, and has a little influence on the operation of vibrator 80. Properly operable vibration generator 1 can further be thinned. The frictional force acting on vibrator 80 is reduced, so that power consumption of vibration generator 1 can be reduced. The operation of vibrator 80 can be prevented from being obstructed due to the contact with frame 20, and vibrator 80 can smoothly be operated.

Projections 75a and 75b are symmetrically disposed with respect to the movement direction (the vibration direction) of vibrator 80. When vibrator 80 contacts frame 20 during the vibration, projections 75a and 75b contact surely frame 20 while remaining region hardly contacts frame 20. Accordingly, the influence of the contact with frame 20 on the operation of vibrator 80 can surely be reduced.

Because each of projections 75a and 75b has the spherical shape that is convex toward the inner surface of the upper surface of frame 20, each of projections 75a and 75b and frame 20 point-contact with each other. Accordingly, the frictional force acting on vibrator 80 can surely be reduced, and vibrator 80 can surely be operated.

Second Embodiment

Because a basic configuration of a vibration generator according to a second embodiment is identical to that of the first embodiment, the repetitive description is omitted. The second embodiment differs mainly from the first embodiment in that the vibrator includes a weight and a flexible printed board.

Figure 7:
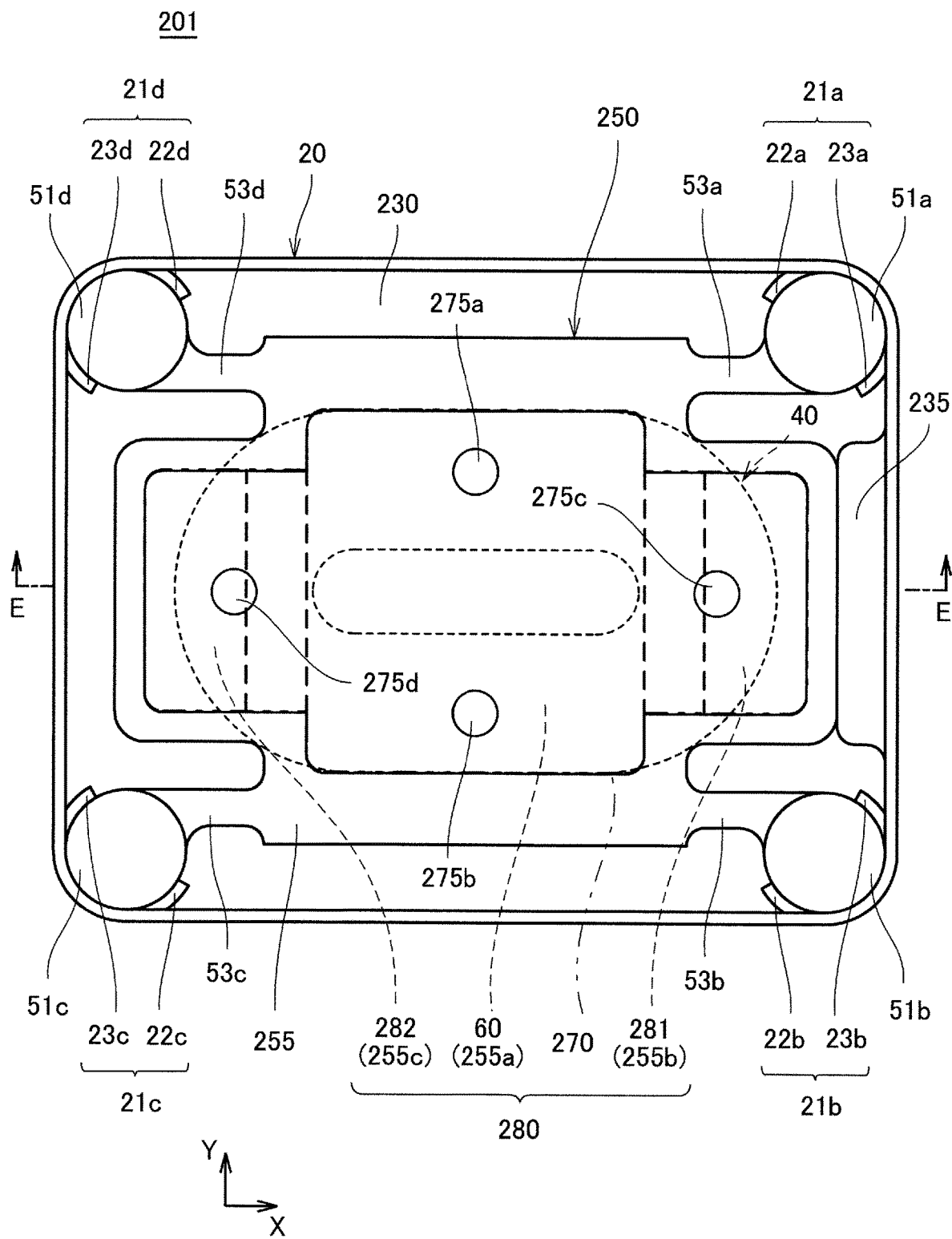
FIG. 7 is a plan view illustrating a vibration generator according to a second embodiment.
Figure 8:
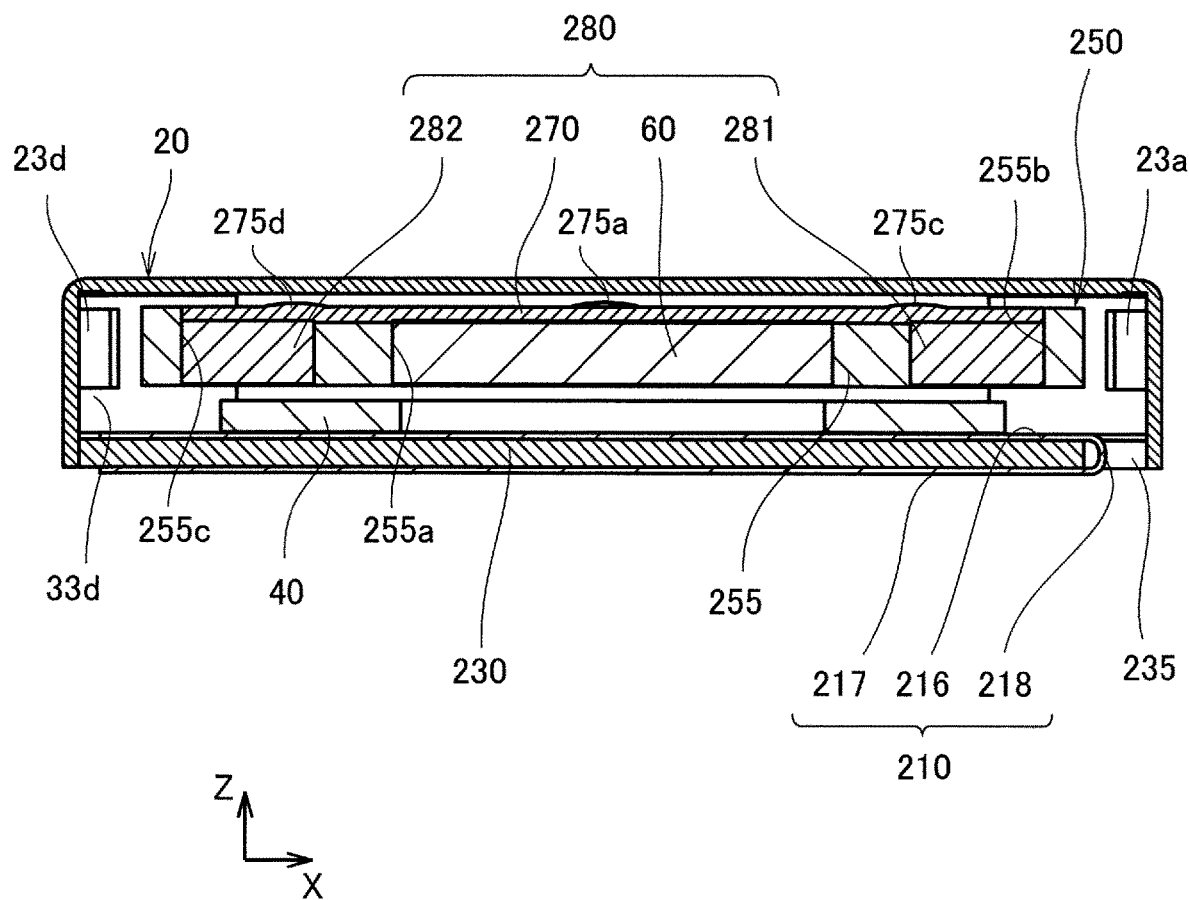
FIG. 8 is a sectional view taken on a line E-E of FIG. 7.

FIG. 7 is a plan view illustrating a vibration generator 201 of the second embodiment. FIG. 8 is a sectional view taken on a line E-E of FIG. 7.

In FIG. 7, similarly to FIG. 1, a holder 250 and the like, which are originally hidden behind upper surface of frame 20, are partially illustrated by the solid line. A board 210 (illustrated in FIG. 8) is not illustrated in FIG. 7.

The structure of vibration generator 1 differs mainly from that of vibration generator 1 of the first embodiment in the following two points. That is, vibration generator 201 includes holder 250 instead of holder 50, and includes board 210 instead of double-side board 10. Board 210 has a structure different from that of double-side board 10.

As illustrated in FIG. 7, similarly to bolder 50, holder 250 includes four pillar bodies 51 and four arms 53. Holder 250 includes a vibrator retention unit (hereinafter sometimes referred to as a retention unit) 255 having a shape different from that of vibrator retention unit 55. Magnet 60, weights 281 and 282, and a yoke 270 are attached to vibrator retention unit 255. That is, in the second embodiment, magnet 60, weights 281 and 282, and yoke 270 constitute a vibrator 280 of vibration generator 201.

As illustrated in FIG. 8, board 210 is a flexible printed board (FPC) that is disposed so as to hold a bottom plate 230. In other words, board 210 is disposed so as to partially cover double sides of bottom plate 230. In the second embodiment, bottom plate 230 has a planar shape. Bottom plate 230 is fixed to frame 20 while fitted in a region on the bottom surface side of frame 20. A notch 235 is provided in end edge portion (an example of the part of the rim portion) on the right side of bottom plate 230. Therefore, the inside and the outside of vibration generator 201 are communicated in the portion, in which notch 235 is provided, while bottom plate 230 is fixed to frame 20.

Bottom plate 230 is made of nonmagnetic materials, such as nonmagnetic stainless steel. Because vibration generator 201 is surrounded by frame 20 and bottom plate 230, which are made of the metallic material, vibration generator 201 is easily handled and durability of vibration generator 201 is also improved.

Board 210 includes an upper surface unit 216 that is disposed along the upper surface of bottom plate 230, a bottom surface unit 217 that is disposed along the bottom surface of bottom plate 230. A folded-back unit 218 is formed between upper surface unit 216 and bottom surface unit 217. Upper surface unit 216 is disposed so as to be held between coil 40 and bottom plate 230. In folded-back unit 218 located in notch 235, board 210 is folded back such that bottom surface unit 217 is provided along the bottom surface of bottom plate 230. For example, board 210 is fixed to bottom plate 230 by bonding.

Figure 9:
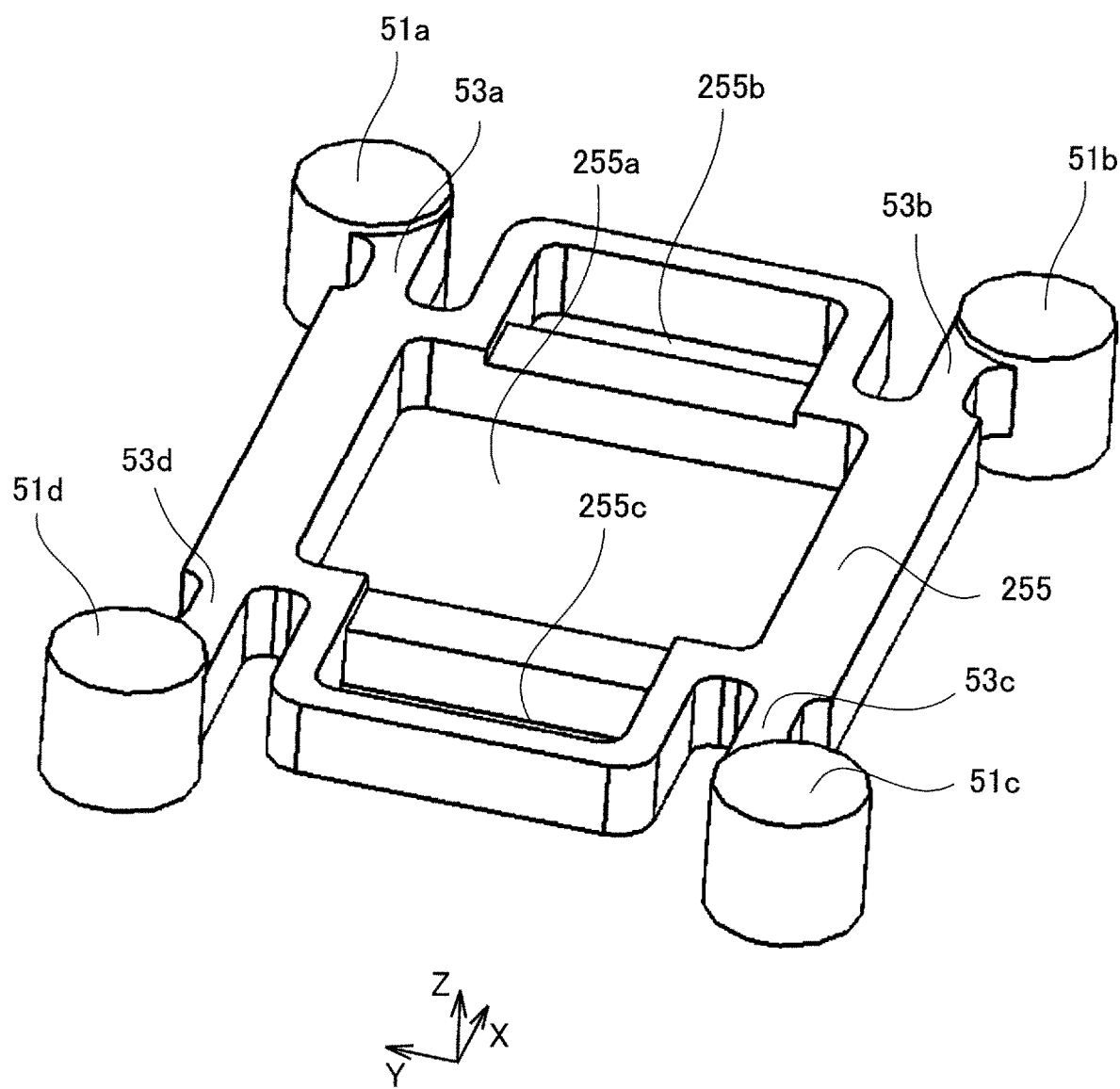
FIG. 9 is a perspective view illustrating a holder.
Figure 10:
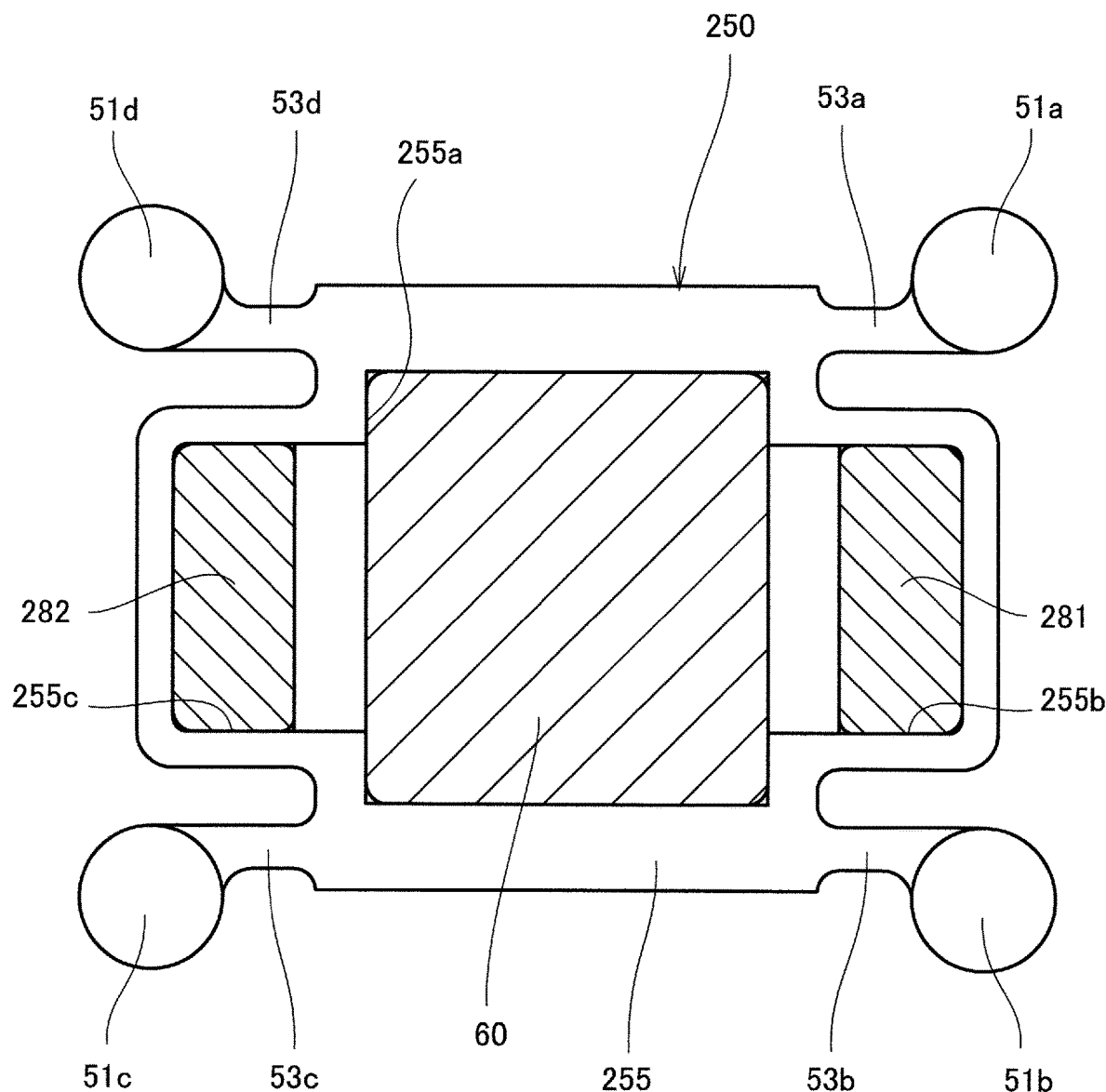
FIG. 10 is a plan view illustrating the holder.

FIG. 9 is a perspective view illustrating holder 250. FIG. 10 is a plan view illustrating holder 250.

In holder 250, similarly to FIG. 3, magnet 60, yoke 270, and weights 281 and 282 are not illustrated in FIG. 9. Yoke 270 is not illustrated in FIG. 10.

As illustrated in FIG. 9, an aperture 255a and apertures 255b and 255c are provided in retention unit 255 of holder 250. Magnet 60 is attached to aperture 255a. Apertures 255b and 255c are provided on both sides in the crosswise direction of aperture 255a so as to overhang in the crosswise direction from the region where aperture 255a is provided. Each of apertures 255b and 255c has a rectangular shape, in which the front-back direction constitutes a long side, when viewed from above. Elastic materials are formed so as to be recessed from the upper surface of retention unit 255 in a region between aperture 255a and aperture 255b and a region between aperture 255a and aperture 255c. Therefore, apertures 255a, 255b, and 255c are partitioned from one another.

As illustrated in FIG. 10, weights 281 and 282 are attached to apertures 255b and 255c, respectively. Holder 250 has a symmetrical shape with respect to the plane, which passes through the central portion of vibrator 280 and is perpendicular to the crosswise direction. That is, weights 281 and 282 have the same shape.

Figure 11:
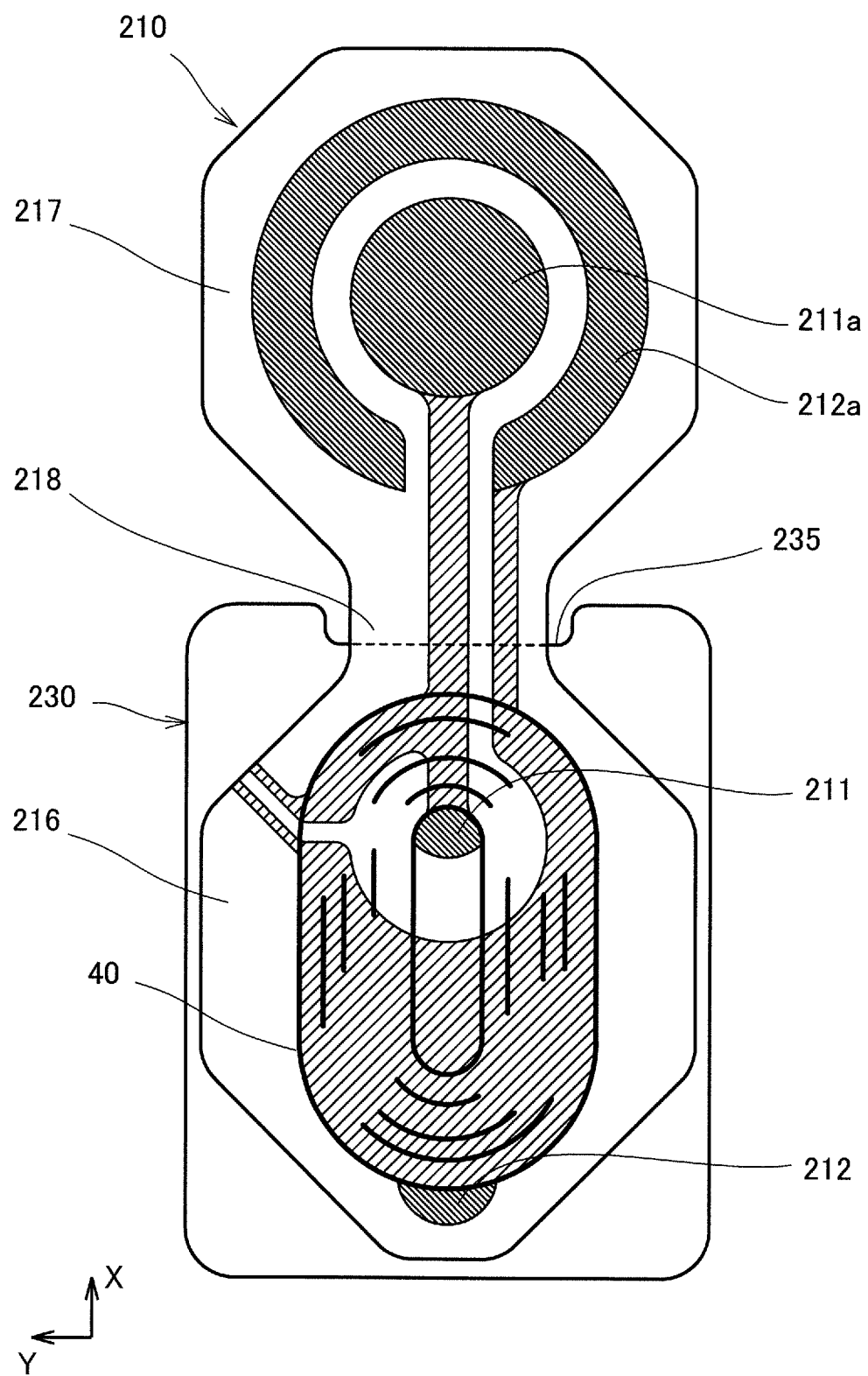
FIG. 11 is a development diagram illustrating a board.

FIG. 11 is a development diagram illustrating board 210.

In board 210 in FIG. 11, upper surface unit 216, bottom surface unit 217, and folded-back unit 218 are developed into the planar shape. As illustrated in FIG. 11, two pads 211 and 212 are provided in upper surface unit 216 of board 210, and two pads 211a and 212a are provided in bottom surface unit 217. Pad 211 and pad 211a are connected through a wiring pattern so as to become the same potential, and pad 212 and pad 212a are connected through a wiring pattern so as to become the same potential. The winding end portion of coil 40 is connected to pads 211 and 212 of upper surface unit 216. Pads 211a and 212a of bottom surface unit 217 constitute an electrode in the case that vibration generator 201 is mounted on the circuit.

As illustrated in FIG. 7, yoke 270 is one magnetic plate that is formed so as to cover the portion in which magnet 60 and weights 281 and 282 are provided in the upper surface of vibrator 280. In the second embodiment, holder 250, magnet 60, yoke 270, and weights 281 and 282 are integrally molded by the insert molding. Therefore, vibrator 280 is retained by retention unit 255 of holder 250.

Figure 12:
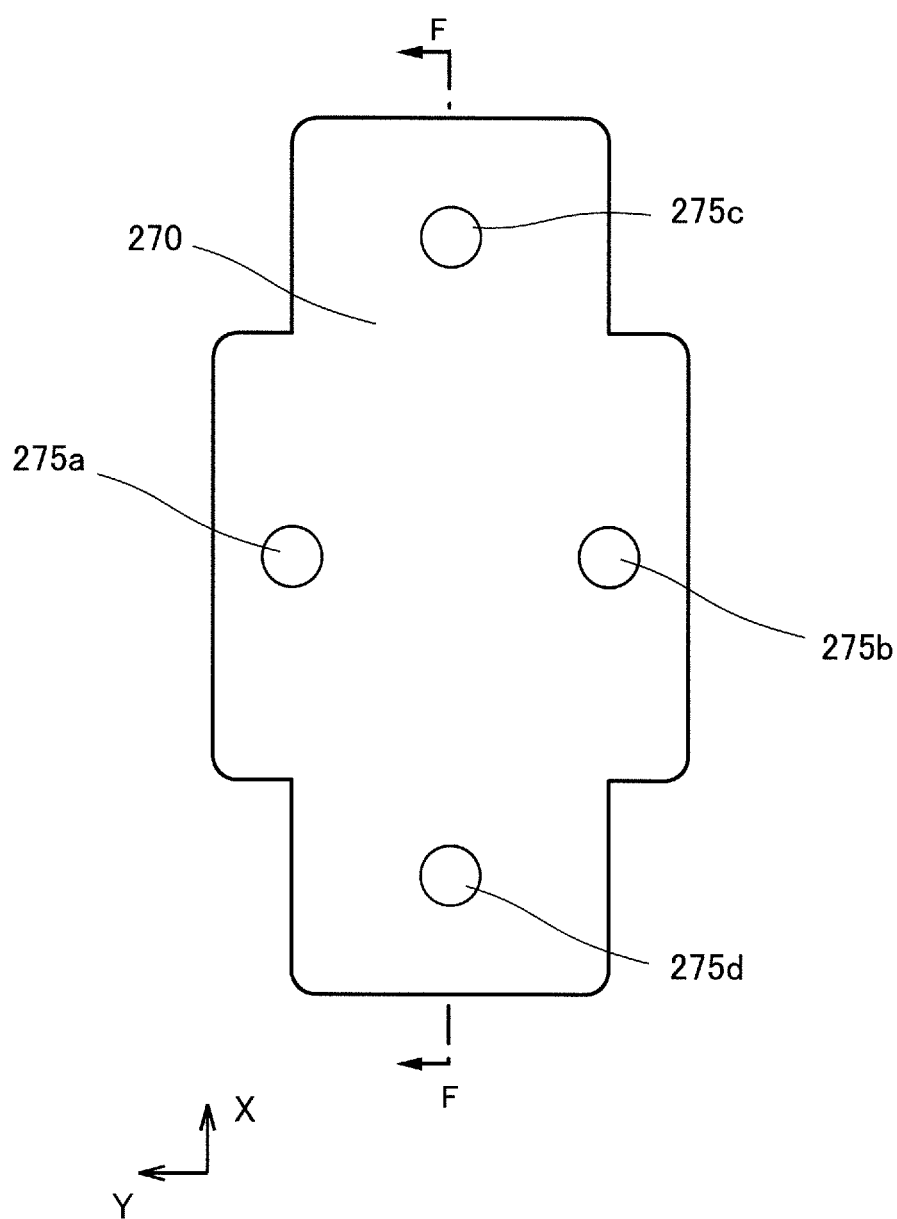
FIG. 12 is a plan view illustrating a yoke.
Figure 13:
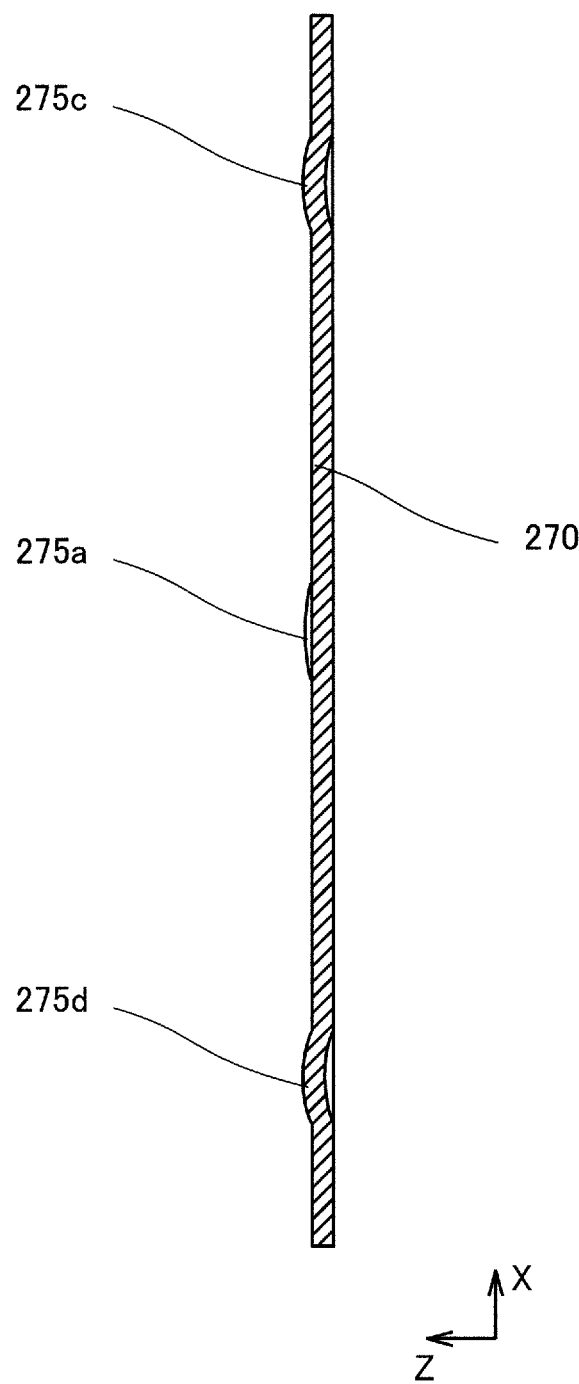
FIG. 13 is a sectional view taken on a line F-F of FIG. 12.

FIG. 12 is a plan view illustrating yoke 270. FIG. 13 is a sectional view taken on a line F-F of FIG. 12.

As illustrated in FIG. 12, four projections 275 (275a, 275b, 275c, and 275d) are provided in yoke 270. As illustrated in FIG. 13, in the second embodiment, similarly to the first embodiment, each projection 275 has the spherical shape that is convex toward the inner surface of the upper surface of frame 20 (upward, in the Z-direction).

Projections 275 are symmetrically disposed on yoke 270. That is, as illustrated in FIG. 7, projections 275a and 275b are located at two points, which are symmetrical to each other with respect to a first plane (a plane parallel to the ZX-plane). The first plane passes through the center of vibrator 280, and is perpendicular to the front-back direction that is the movement direction of vibrator 280. Projections 275a and 275b are located at two points on a second plane, which passes through the center of vibrator 280 and is parallel to a YZ-plane. On the other hand, projections 275c and 275d are symmetrical to each other with respect to the second plane, and provided at two points on the first plane. That is, in the second embodiment, projection 275a is provided at the back of the central portion in the crosswise direction of the upper surface of vibrator 280. Projection 275*b* is provided in front of the central portion in the crosswise direction of the upper surface of vibrator 280, and projection 275*b* is provided so as to be symmetrical to projection 275*a*. Projection 275*c* is provided on the right side and in central portion in the front-back direction of the upper surface of vibrator 280. Projection 275*d* is provided on the left side and in central portion in the front-back direction of the upper surface of vibrator 280, and projection 275*d* is provided so as to be symmetrical to projection 275*c*.

In the second embodiment, because vibration generator 201 basically has the same configuration as vibration generator 1 of the first embodiment, the same effect as the first embodiment is obtained. In the second embodiment, weights 281 and 282 are provided in vibrator 280, weights 281 and 282 are displaced with the reciprocation of vibrator 280. Therefore, a vibration-force generation amount can be increased. The necessary vibration force can easily be adjusted irrespective of the size or length of arm 53 and the elastic material. A metal having a relatively large specific weight may be used as weights 281 and 282. However, there is no limitation to the material for weights 281 and 282.

In the second embodiment, board 218 that is of an FPC is used. Accordingly, in board 210, the size in the vertical direction of vibration generator 201 can be reduced compared with the use of the double-side board. The shape of bottom plate 230 can be simplified.

Because notch 235 is provided in bottom plate 230, board 210 does not run over the outside of the chassis, but board 210 can surely be protected.

In the second embodiment, because projections 275 are provided in yoke 270, vibration generator 201 can be thinned while vibrator 280 moves properly. In yoke 270, projections 275*c* and 275*d* are provided in the positions corresponding to the crosswise direction in which weights 281 and 282 are provided. Therefore, an inertia force increases by providing weights 281 and 282, and projections 275*c* and 275*d* contacts frame 20 even in the structure in which vibrator 280 easily contacts frame 20. Accordingly, vibration generator 201 can surely be operated.

Because bottom plate 230 is made of the nonmagnetic material, similarly to the first embodiment, the operation of vibrator 280 is not obstructed even if the distance between vibrator 280 and bottom plate 230 is narrow. Accordingly, the high-durability, low-profile vibration generator 201 in which the bottom portion is covered with bottom plate 230 can be provided.

Third Embodiment

Because a basic configuration of a vibration generator according to a third embodiment is identical to that of the first embodiment, the repetitive description is omitted. The third embodiment differs mainly from the first and second embodiments in that plural coils are provided.

Figure 14:
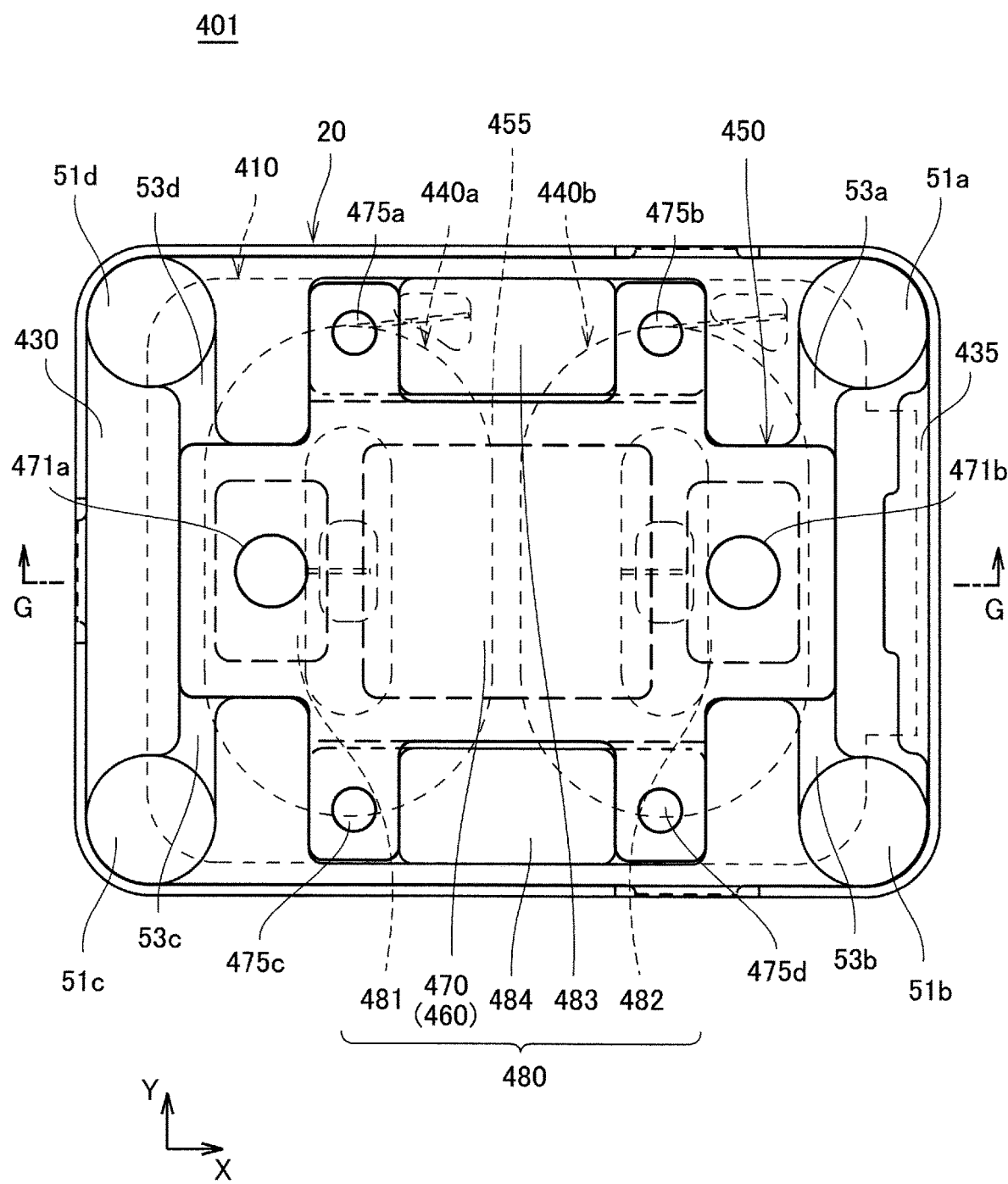
FIG. 14 is a plan view illustrating a vibration generator according to a third embodiment.
Figure 15:
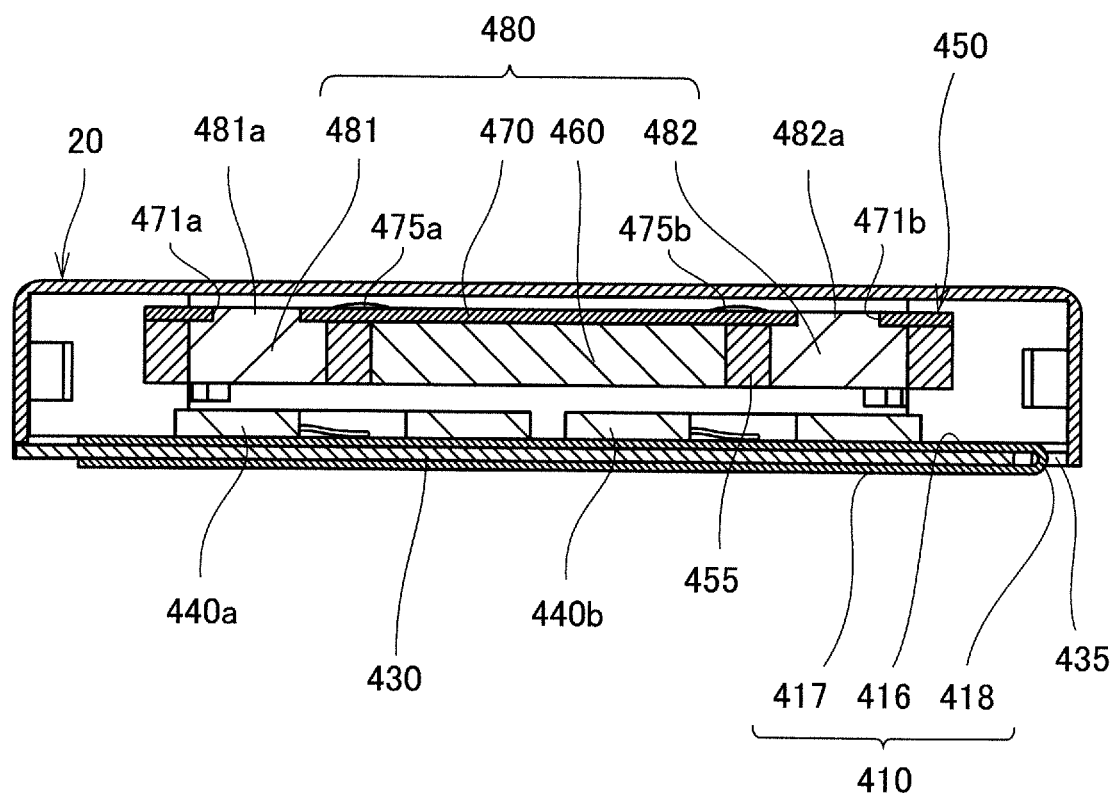
FIG. 15 is a sectional view taken on a line G-G of FIG. 14.

FIG. 14 is a plan view illustrating a vibration generator 401 according to a third embodiment. FIG. 15 is a sectional view taken on a line G-G of FIG. 14.

In FIG. 14, similarly to FIG. 1, a holder 450 and the like, which are originally hidden behind upper surface of frame 20, are partially illustrated by the solid line. A structure in which four pillar bodies 51 of holder 450 are retained by frame 20 is not illustrated in FIG. 14. In the third embodiment, the structure in which holder 450 is retained by frame 20 is identical to that of the first embodiment.

A vibration generator 401 of the third embodiment differs from vibration generator 1 of the first embodiment in that vibration generator 401 includes holder 450 instead of holder 50 and that weights 481 to 484 are included in a vibrator 480. Vibration generator 401 differs from vibration generator 201 of the second embodiment in that vibration generator 401 includes two coils 440*a* and 440*b*. Vibration generator 401 is configured to reciprocate vibrator 480 in the crosswise direction to generate the vibration.

As illustrated in FIG. 15, similarly to board 210 of the second embodiment, a board 410 is a flexible printed board that is disposed so as to hold a bottom plate 430. Bottom plate 430 is made of nonmagnetic materials, such as nonmagnetic stainless steel. Bottom plate 430 is configured similarly to bottom plate 230 of the second embodiment. That is, bottom plate 430 is fixed to frame 20 while fitted in a region on the bottom surface side of frame 20. A notch 435 is provided in an end edge portion on the right side of bottom plate 430. An upper surface unit 416 of board 410 is disposed so as to be held between coils 440*a* and 440*b* and bottom plate 430. In a folded-back unit 418 located in a notch 435, board 410 is folded back such that a bottom surface unit 417 is provided along the bottom surface of bottom plate 430. Therefore, double sides of bottom plate 430 are partially covered with board 410.

Figure 16:
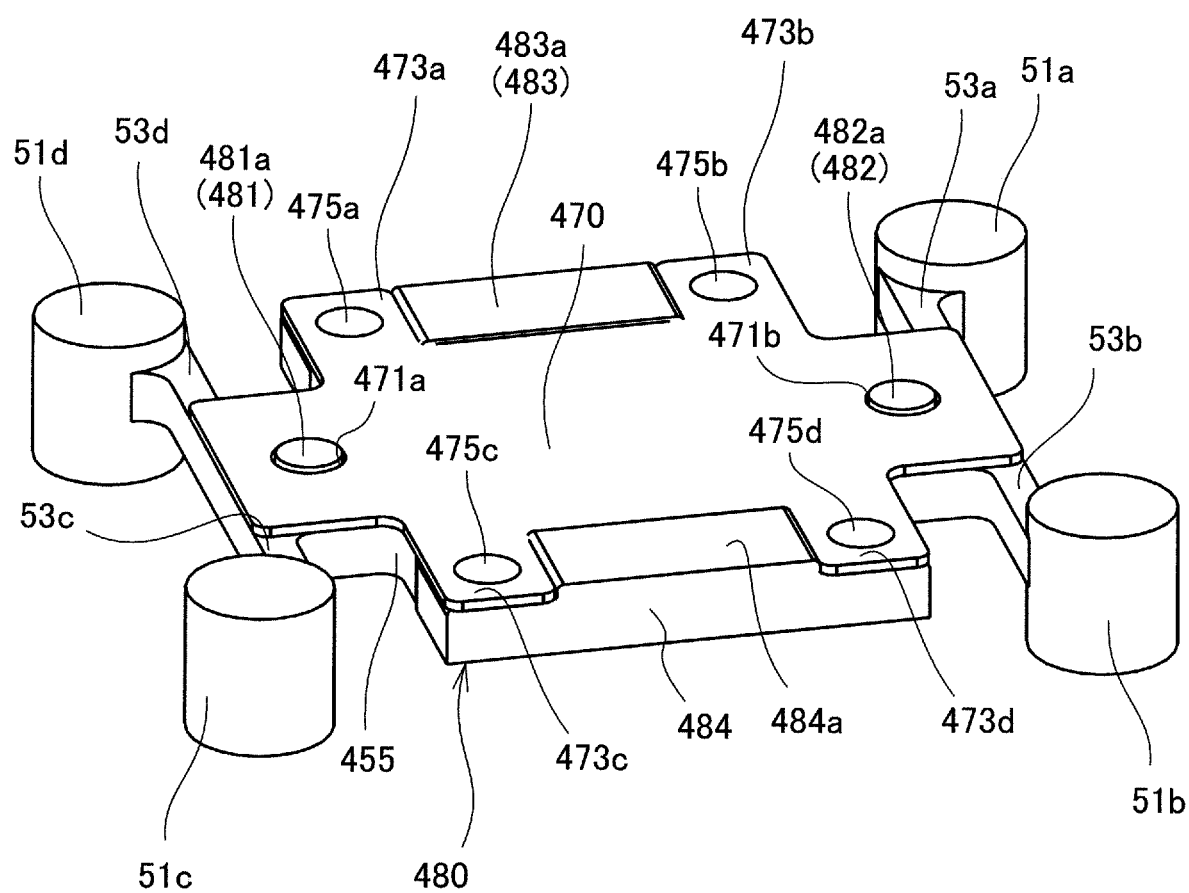
FIG. 16 is a perspective view illustrating a holder and a vibrator.
Figure 17:
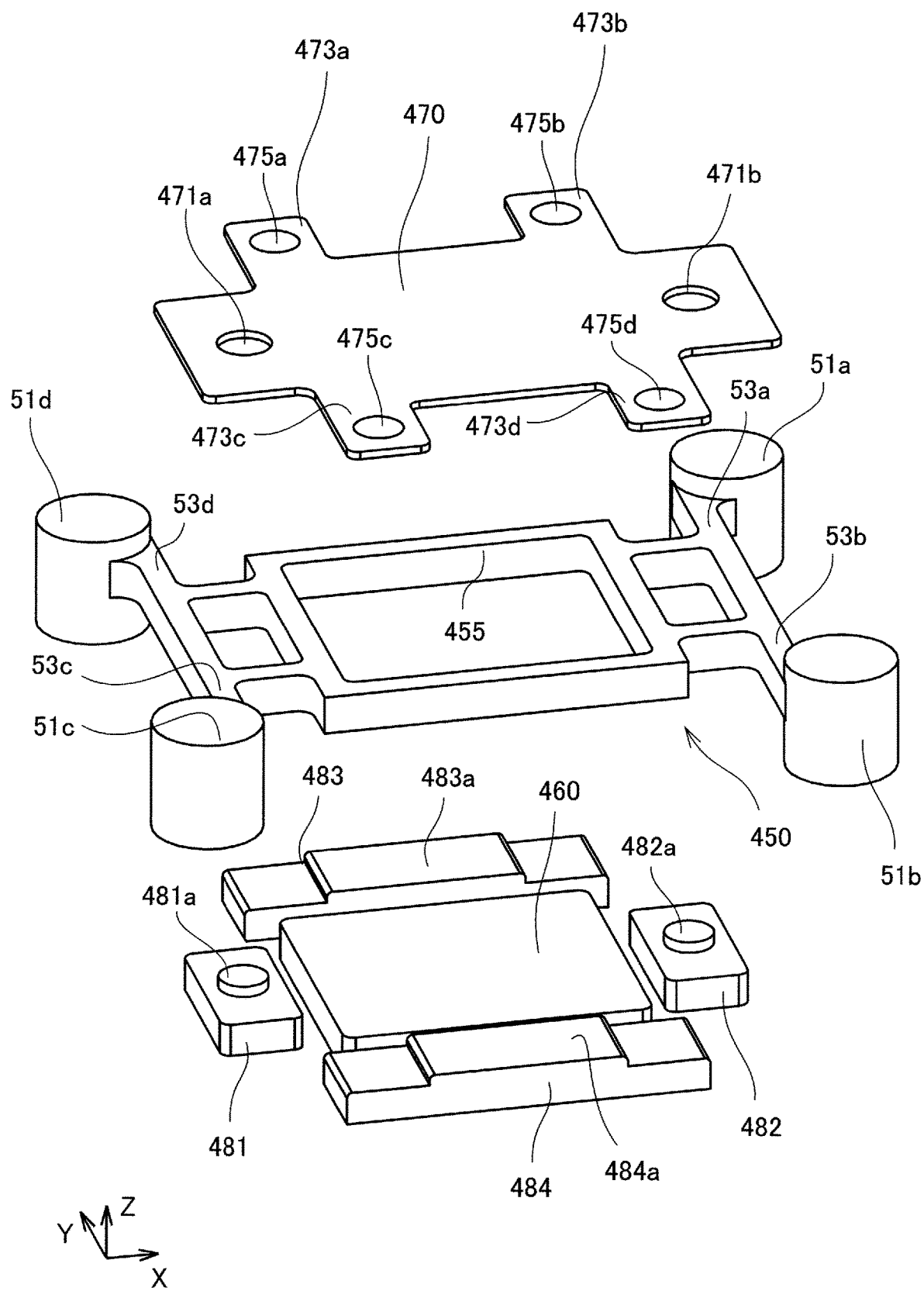
FIG. 17 is an exploded perspective view of the holder and the vibrator of FIG. 16.

FIG. 16 is a perspective view illustrating holder 450 and vibrator 480. FIG. 17 is an exploded perspective view of the holder and the vibrator of FIG. 16.

As illustrated in FIG. 16, similarly to holder 50, holder 450 includes four pillar bodies 51 and four arms 53. In the third embodiment, each arm 53 is formed such that the front-back direction is the lengthwise direction. Therefore, vibrator 480 can vibrate in the crosswise direction.

As illustrated in FIG. 17, holder 450 includes a vibrator retention unit (hereinafter sometimes referred to a retention unit) 455 having a shape different from that of vibrator retention unit 55. A magnet 460 and weights 481 and 482 disposed on the right and left of magnet 460 are accommodated in retention unit 455. A yoke 470 is attached to the upper surface of retention unit 455. Yoke 470 is formed so as to overhang in the front-back direction from retention unit 455. Weights 483 and 484 are attached onto a lower side of the portion overhanging from retention unit 455 in yoke 470. That is, in the third embodiment, magnet 460, weights 481, 482, 483, and 484, and yoke 470 constitute a vibrator 480 of vibration generator 401. The members constituting vibrator 480 are integrally formed as a whole by bonding, solvent welding, welding and insert molding.

Holder 450 has a symmetrical shape with respect to a third plane (a plane parallel to the YZ-plane) and a fourth plane (a plane parallel to the ZX-plane). The third plane passes through the central portion of vibrator 480, and is perpendicular to the crosswise direction. The fourth plane passes through the central portion of vibrator 480, and is perpendicular to the front-back direction. Weights 481 and 482 have the same shape. Weights 483 and 484 have the same shape.

Yoke 470 is formed into a planar shape as a whole so as to cover the substantially whole upper surface of retention unit 455. As illustrated in FIG. 17, near both side portions in the crosswise direction of yoke 470, apertures 471*a* and 471*b* are formed in the positions corresponding to weights 481 and 482. Protrusions 481*a* and 482*a* protruding upward are formed on the upper surfaces of weights 481 and 482, respectively. Protrusions 481*a* and 482*b* are formed so as to be fitted in apertures 471*a* and 471*b*, respectively. That is, weights 481 and 482 are fixed to yoke 470 while protrusions 481*a* and 482*b* are fitted in apertures 471*a* and 471*b*.

In the third embodiment, although the shape of magnet 460 is substantially identical to that of magnet 60 of the first embodiment, a magnetization state of magnet 460 differs from that of magnet 60. That is, magnet 460 is magnetized in single pole. The bottom surface side of magnet 460 is magnetized in one of the S-pole and the N-pole.

In yoke 470, overhangs 473a to 473d are formed so as to extend in the vertical direction from the regions corresponding to four vertices of magnet 460. Overhang 473a is provided at a left rear portion of vibrator 480. Overhang 473b is provided at a right rear portion of vibrator 480. Overhang 473c is provided at a left front portion of vibrator 480. Overhang 473d is provided at a right front portion of vibrator 480. Overhangs 473a to 473d overhang forward or backward from retention unit 455 when viewed from above. In weight 483, the upper surfaces in crosswise direction of both the side portions are fixed to yoke 470 while joined to overhang 473a and 473b. In weight 484, the upper surfaces in the crosswise direction of both the side portions are fixed to yoke 470 while joined to overhang 473c and 473d. A raised unit 483a is formed on the upper surface of weight 483 so as to be fitted between overhang 473a and overhang 473b. A raised unit 484a is formed on the upper surface of weight 484 so as to be fitted between overhang 473c and overhang 473d. Raised units 483a and 484a are raised from the upper surfaces of weighs 483 and 484 by the substantially same level as a thickness of yoke 470. Therefore, the weight of vibrator 480 can be increased without increasing or enlarging the size in the vertical direction of vibrator 480.

Figure 18:
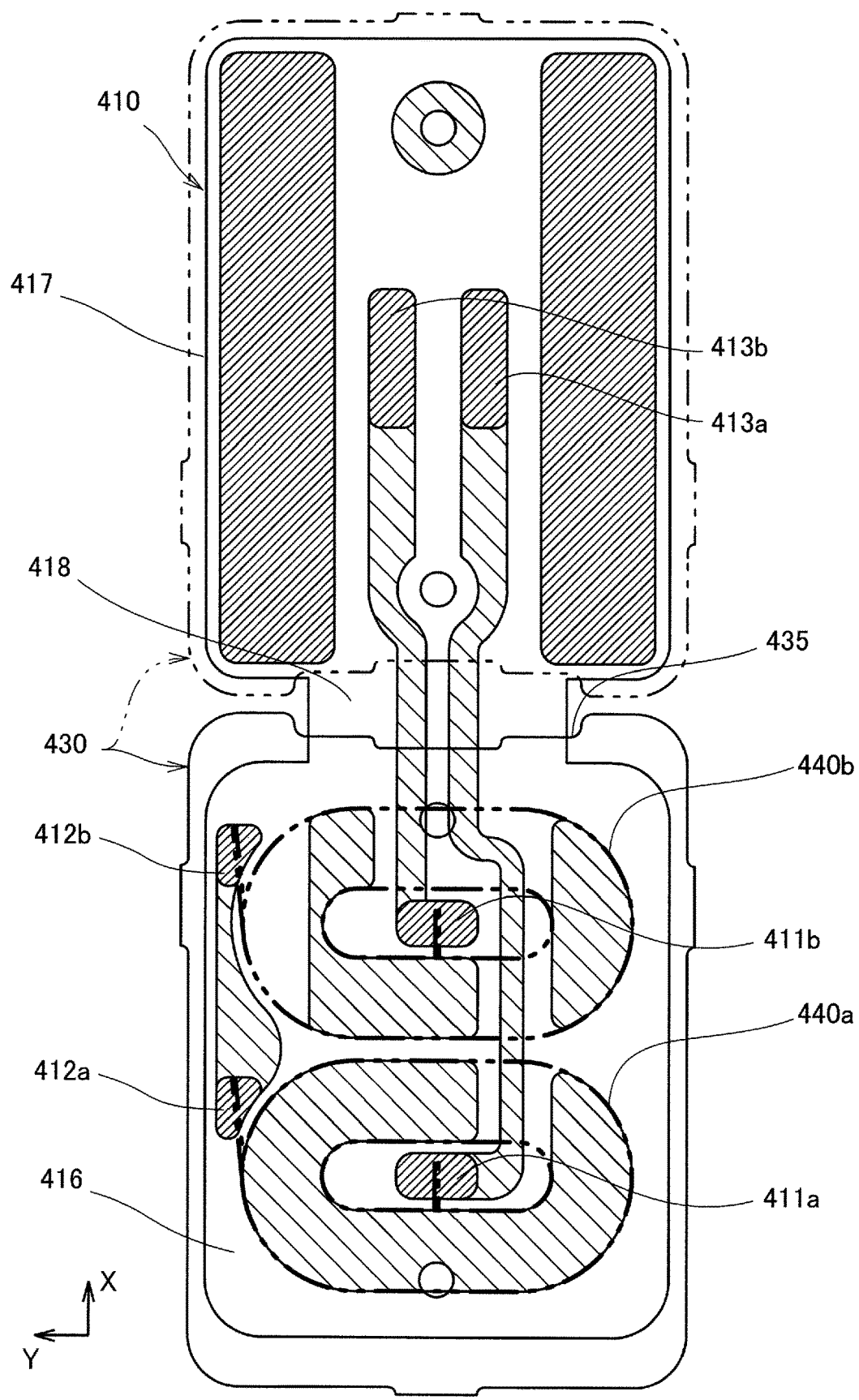
FIG. 18 is a development diagram illustrating a board.

FIG. 18 is a development diagram illustrating board 410.

In board 410 in FIG. 18, upper surface unit 416, bottom surface unit 417, and folded-back unit 418 are developed into the planar shape. In FIG. 18, each of the positions in which coils 440a and 440b are mounted is illustrated by a bold alternate long and two short dashes line.

Coils 440a and 440b are disposed so as to be adjacent to each other in the crosswise direction, namely, the direction corresponding to the movement direction of vibrator 480. Coil 440a is disposed on the left side (the lower side in FIG. 18) of vibration generator 401, and coil 440b is disposed on the right side (the upper side in FIG. 18) of vibration generator 401. As illustrated in FIG. 14, coils 440a and 440b are symmetrically disposed with respect to the third plane.

As illustrated in FIG. 18, pads 411a and 411b and pads 412a and 412b are provided in upper surface unit 416 of board 410. Pad 411a is provided in the center of coil 440a. Pad 411b is provided in the center of coil 440b. Each of pads 412a and 412b is disposed at the back of coils 440a and 440b. Pads 413a and 413b are provided in bottom surface unit 417 of board 410. Pad 411a and pad 413a are connected through the wiring pattern so as to become the same potential. Pad 411b and pad 413b are connected through the wiring pattern so as to become the same potential. Pad 412a and pad 412b are connected through the wiring pattern so as to become the same potential. For example, pads 412a and 412b are connected to a ground potential. The winding end portion of coil 440a is connected to pads 411a and 412a. The winding end portion of coil 440b is connected to pads 411b and 412b. Pads 413a and 413b of bottom surface unit 417 constitute the electrode in the case that vibration generator 401 is mounted on the circuit.

Vibration generator 401 is driven such that the current having different orientations are passed through pads 413a and 413b and coils 440a and 440b. That is, because magnet 460 is magnetized in the single pole, vibrator 480 moves in the crosswise direction as coils 440a and 440b are alternately excited in different polarities.

As illustrated in FIG. 14, yoke 470 is one magnetic plate. In the third embodiment, projections 475a, 475b, 475c, and 475d are provided in yoke 470.

Figure 19:
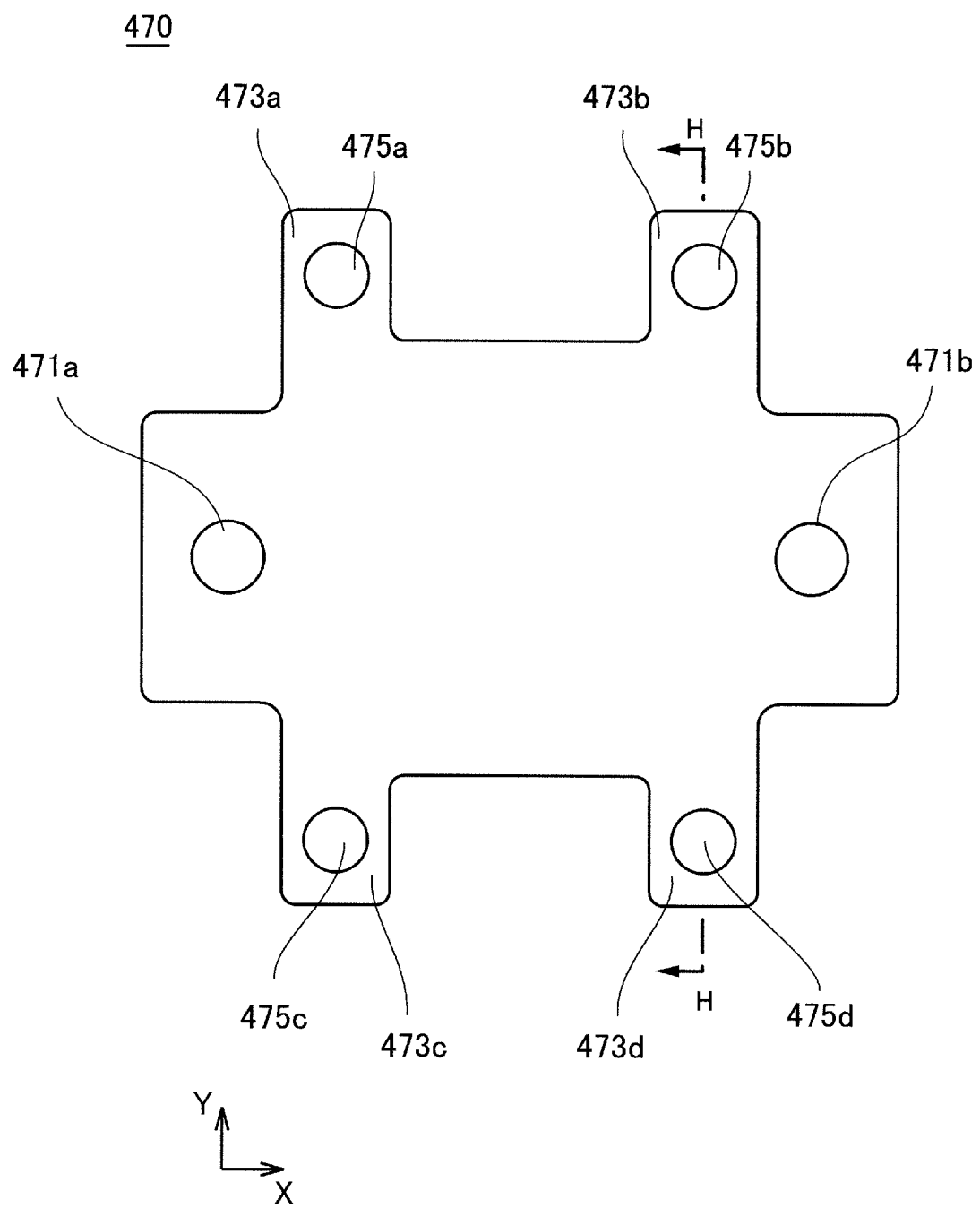
FIG. 19 is a plan view illustrating a yoke.
Figure 20:
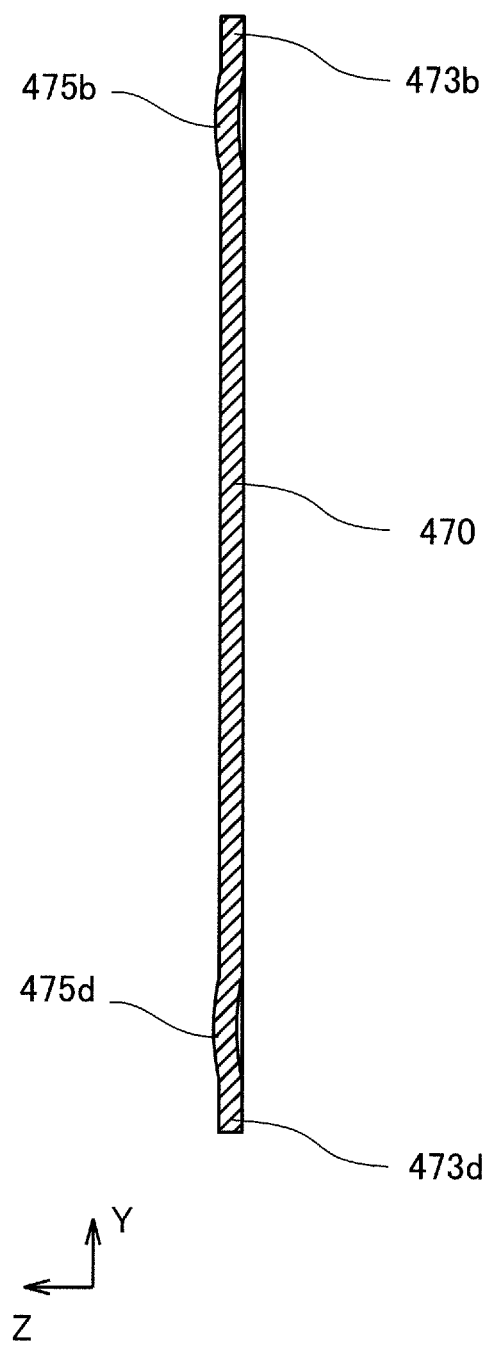
FIG. 20 is a sectional view taken on a line H-H of FIG. 19.

FIG. 19 is a plan view illustrating yoke 470. FIG. 20 is a sectional view taken on a line H-H of FIG. 19.

As illustrated in FIG. 19, four projections 475 (475a, 475b, 475c, and 475d) are provided in yoke 470. Projection 475a is provided in overhang 473a. Projection 475b is provided in overhang 473b. Projection 475c is provided in overhang 473c. Projection 475d is provided in overhang 473d. As illustrated in FIG. 20, in the third embodiment, similarly to the first embodiment, each projection 475 has the spherical shape that is convex toward the inner surface of the upper surface of frame 20 (upward, in the Z-direction).

Projections 475 are symmetrically disposed on yoke 470. That is, projections 475a and 475b are provided at two points symmetrical with respect to the third plane, which is perpendicular to the crosswise direction that is the movement direction of vibrator 480. Similarly, projections 475c and 475d are provided at two points symmetrical with respect to the third plane. Projection 475a is symmetrical to projection 475c with respect to the fourth plane, and projection 475b is symmetrical to projection 475d with respect to the fourth plane.

In the third embodiment, because vibration generator 401 basically has the same configuration as vibration generator 201 of the second embodiment, the same effect as the second embodiment is obtained. That is, the third embodiment is identical to the second embodiment in that vibrator 480 includes weights 481 to 484 and that board 410 that is of the FPC is used. Accordingly, in board 410, the size in the vertical direction of vibration generator 401 can be reduced compared with the use of the double-side board. Because weights 481 to 484 are provided, the vibration-force generation amount can be increased, and the necessary vibration force can easily be adjusted. A metal having a relatively large specific weight may be used as weights 481 to 484. However, there is no limitation to the material for weights 481 and 484.

In the third embodiment, vibrator 480 is driven by the simple structure in which coils 440a and 440b are used. In this case, vibrator 480 can surely be moved to one of coils 440a and 440b. Vibrator 480 can efficiently be moved with a high driving force, so that performance of vibration generator 401 can be enhanced.

Projections 475 are provided near the four corner portions of yoke 470, so that vibration generator 401 can be thinned while vibrator 480 moves properly. Even if vibrator 480 takes any attitude, a contact range between vibrator 480 and frame 20 can surely be reduced.

In the third embodiment, because bottom plate 430 is made of the nonmagnetic material, the operation of vibrator 480 is net obstructed even if the distance between vibrator 480 and bottom plate 430 is narrow. Accordingly, the high-durability, low-profile vibration generator 401 can be provided.

Fourth Embodiment

Because a basic configuration of a vibration generator according to a fourth embodiment is identical to that of the second embodiment, the repetitive description is omitted. The fourth embodiment differs mainly from the first to third embodiments in the attachment structure of the holder to the frame.

Figure 21:
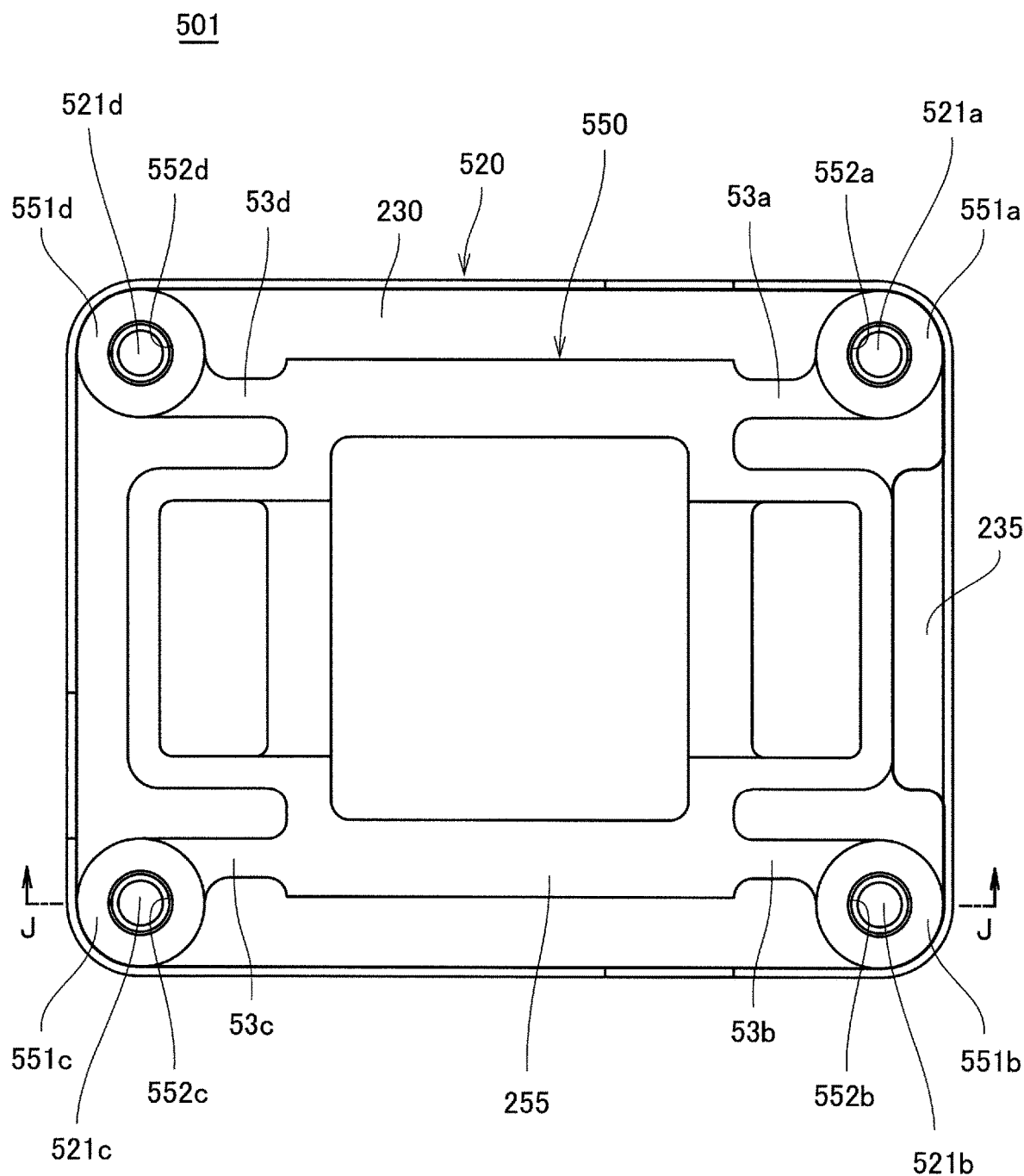
FIG. 21 is a plan view illustrating a vibration generator according to a fourth embodiment.
Figure 22:
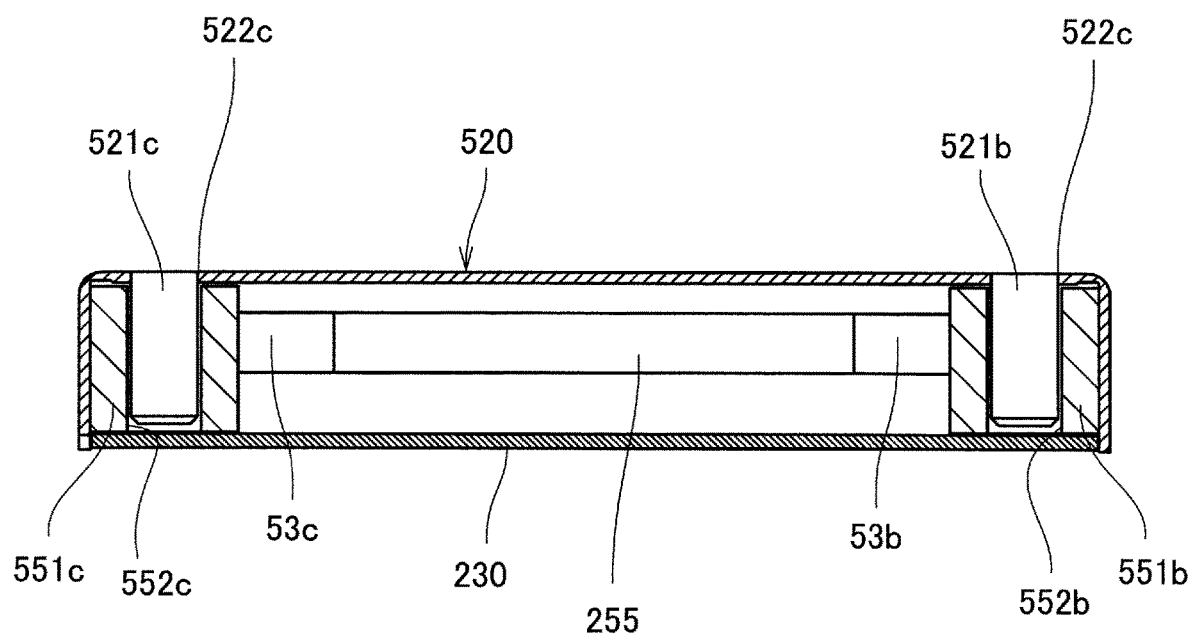
FIG. 22 is a sectional view taken on a line J-J of FIG. 21.

FIG. 21 is a plan view illustrating a vibration generator 501 of the fourth embodiment. FIG. 22 is a sectional view taken on a line J-J of FIG. 21.

In FIG. 21, similarly to FIG. 1, a holder 550 and the like, which are originally hidden behind upper surface of a frame 520, are partially illustrated by the solid line. A magnet and the like, which are retained originally by holder 550, and a vibrator constructed by the magnet and the like are not illustrated in FIGS. 21 and 22. A flexible printed board and a coil disposed on the flexible printed board are also not illustrated. In the fourth embodiment, the structure of the component that is not illustrated is identical to that of the second embodiment.

Vibration generator 501 differs from vibration generator 201 of the second embodiment in the following points. That is, vibration generator 501 includes holder 550 instead of holder 250. Vibration generator 501 also includes frame 520 instead of frame 20. Vibration generator 501 is substantially identical to vibration generator 201 in other structures. For example, magnet 60, weights 281 and 282, and yoke 270 are retained in holder 550 in the same manner as holder 250. Vibration generator 501 is configured to generate the vibration such that the vibrator constructed in the same manner as the second embodiment is reciprocated in the front-back direction.

In the fourth embodiment, the attachment structure of holder 550 to frame 520 is configured as follows. That is, as illustrated in FIG. 22, holder 550 includes four columnar bodies (an example of the fixed unit) 551 (551a, 551b, 551c, and 551d). Each pillar body 551 is provided in the position corresponding to pillar body 51 of holder 250. Pillar body 551 is fixed to frame 520 as described later, whereby holder 550 is supported by frame 520.

Figure 23:
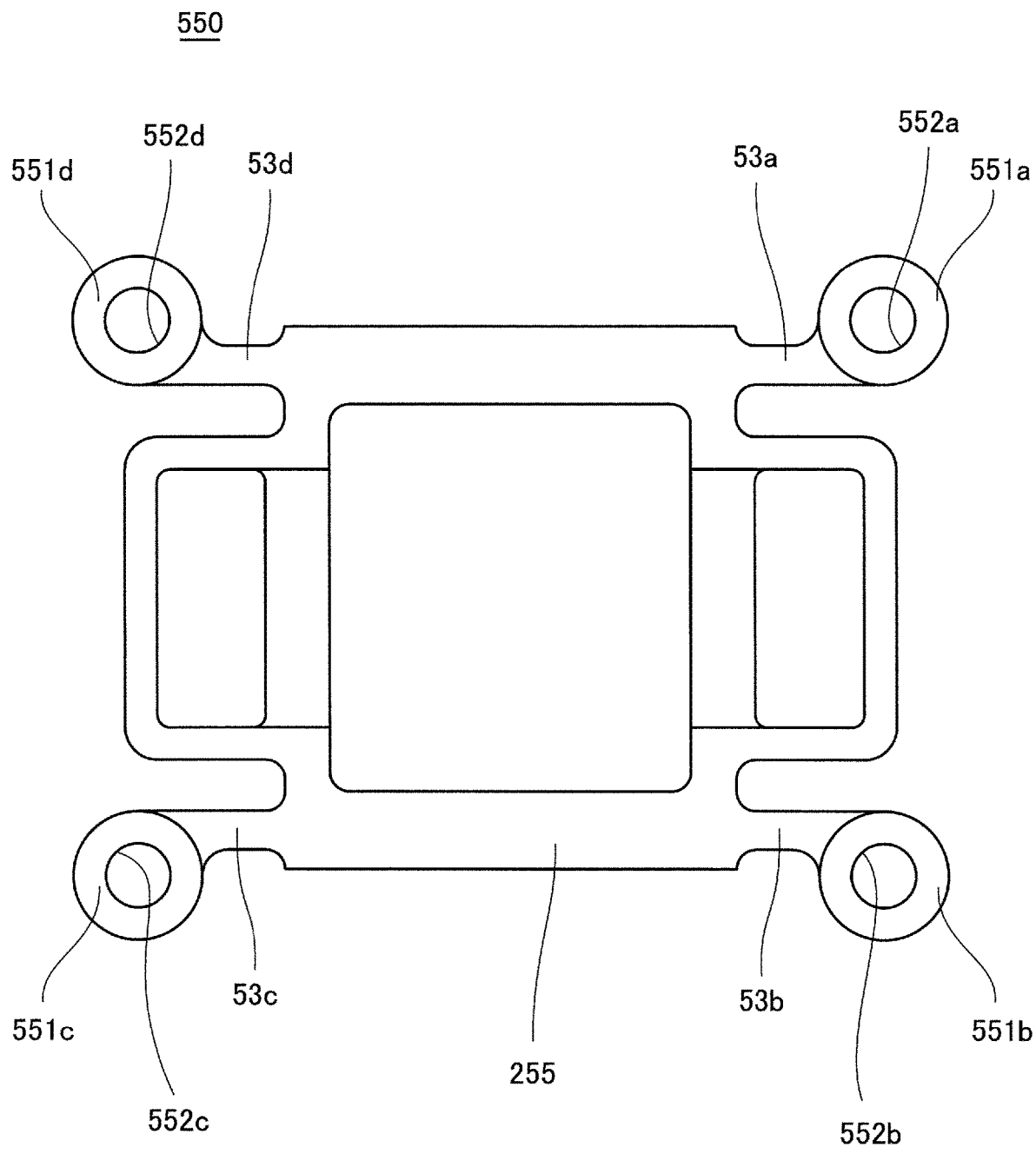
FIG. 23 is a plan view illustrating a holder of the fourth embodiment.

FIG. 23 is a plan view illustrating holder 550 of the fourth embodiment.

A hole unit 552 (552a, 552b, 552c, and 552d) is made in each pillar body 551 of holder 550. As illustrated in FIG. 22, each hole unit 552 is made so as to pierce pillar body 551 from the upper surface to the lower surface. Each hole unit 552 is made such that the center of hole unit 552 is located in the central portion of pillar body 551 when viewed from above. Each hole unit 552 has a cylindrical shape. Each hole unit 552 is made such that the vertical direction perpendicular to the movement direction of the vibrator, namely, the front-back direction is the depth direction. In other words, each hole unit 552 is made along the vertical direction, which is substantially perpendicular to the plate-shape vibrator disposed substantially horizontally.

Figure 24:
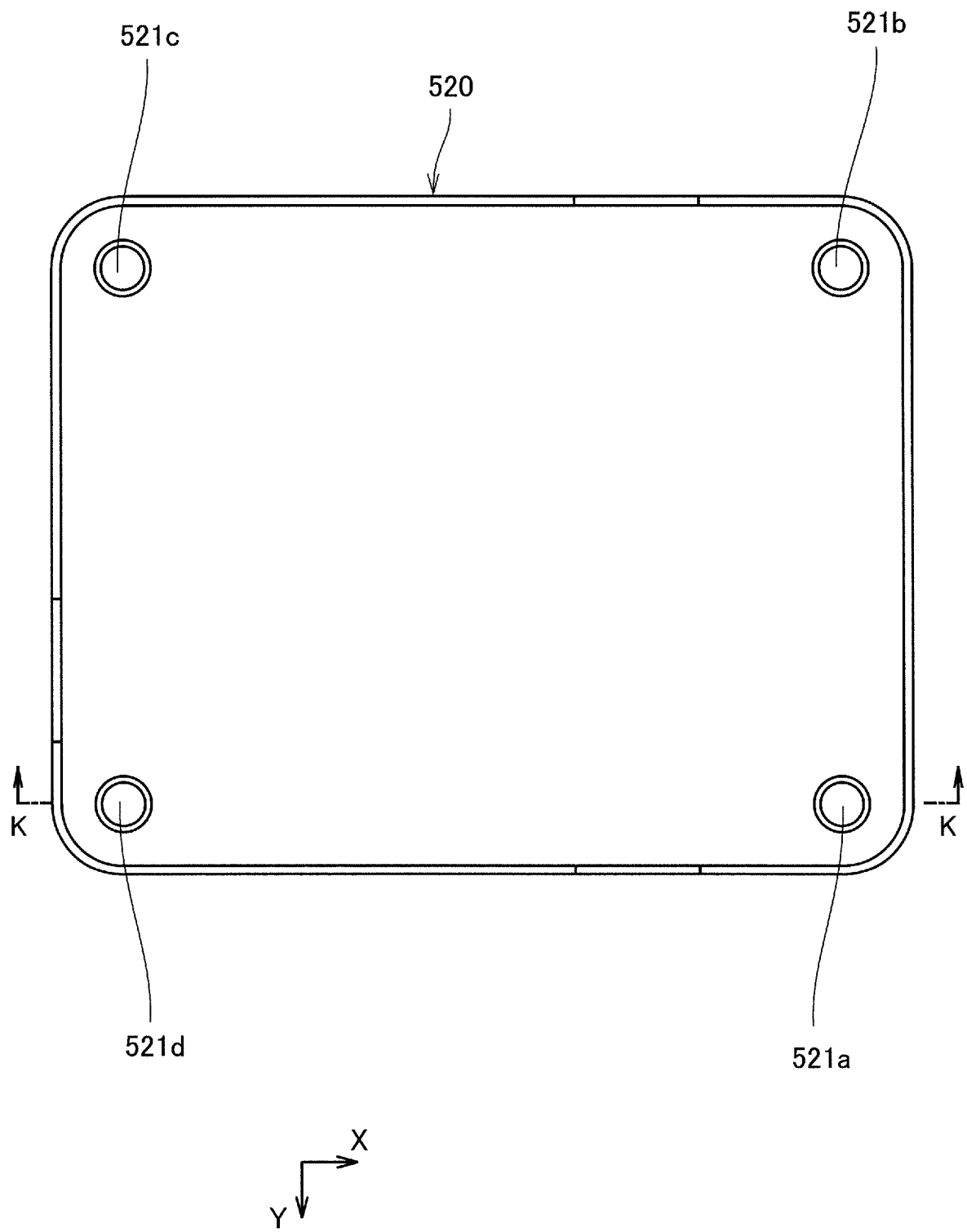
FIG. 24 is a bottom view illustrating a frame of the fourth embodiment.
Figure 25:
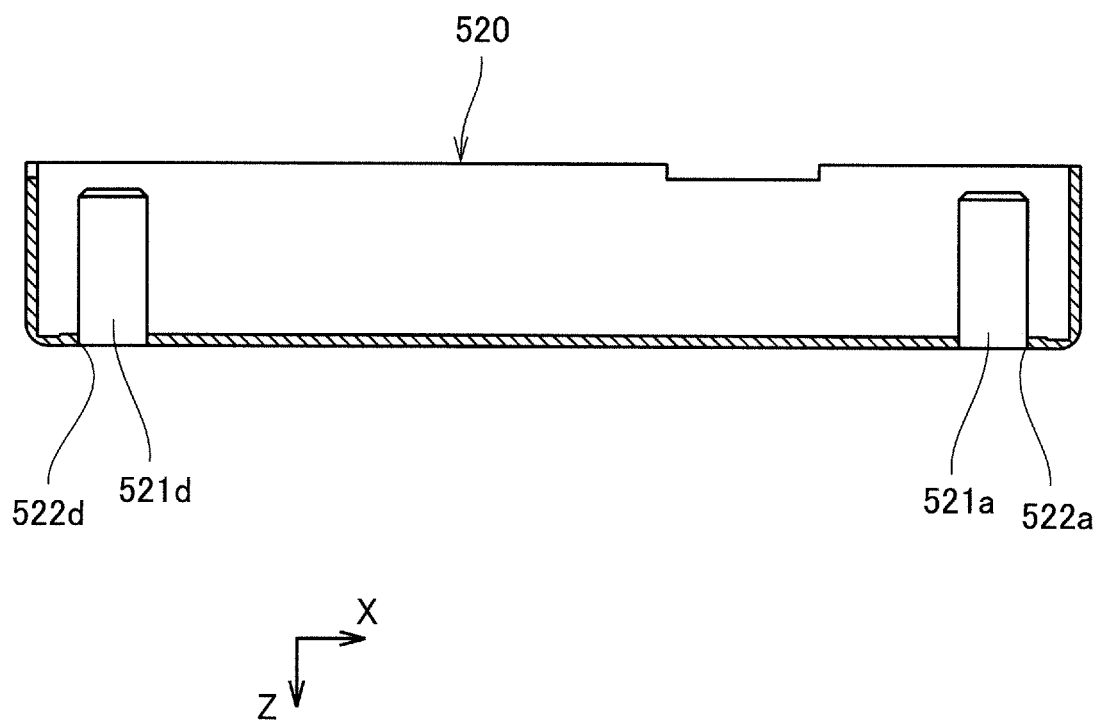
FIG. 25 is a sectional view taken on a line K-K of FIG. 24.

FIG. 24 is a bottom view illustrating frame 520 of the fourth embodiment. FIG. 25 is a sectional view taken on a line K-K of FIG. 24.

As illustrated in FIG. 24, poles 521 (521a, 521b, 521c, and 521d), which are disposed at four corners when viewed from below, are provided in frame 520. Each of four poles 521 is a pin having a columnar shape. Poles 521 are disposed in the positions corresponding to four hole units 552 of holder 550, respectively. As illustrated in FIG. 25, each pole 521 is disposed such that the lengthwise direction is the vertical direction, namely, the direction substantially perpendicular to the movement direction of the vibrator. Each pole 521 is vertically provided in frame 520 such that an upper end portion of each pole 521 projects downward while being press-fitted in a press fitting hole 522 (522a, 522b, 522c, and 522d) made in a top surface (a portion constitutes the lower side in FIG. 25) of the main body of frame 520. Each pole 521 projects from the top surface of the main body of frame 520 by a length slightly shorter than the size in the vertical direction of pillar body 551. Each pole 521 is made of metals, such as steel. However, pole 521 is not limited to the metal. For example, pole 521 may be molded using resin.

As illustrated in FIG. 22, holder 550 is attached to frame 520 such that poles 521 are fitted in hole units 552 from above. Bottom plate 230 is disposed below holder 550 while holder 550 is disposed in frame 520. Therefore, holder 550 is retained in frame 520 so as not to drop out from pole 521. Holder 550 is attached to frame 520 while the magnet and the like are previously attached to holder 550.

Each hole unit 552 has the cylindrical shape, and each pole 521 has the columnar shape. Because the attachment structure of holder 550, in which pole 521 is inserted in hole unit 552, is adopted in the fourth embodiment, pillar body 551 is fixed to frame 520 while being rotatable about a center axis of pole 521. In other words, when viewed from above, pillar body 551 is fixed to frame 520 such that the center axis of hole unit 552 is not displaced with respect to pole 521. Because pillar body 551 is rotatable about pole 521, pillar body 551 rotates slightly about pole 521 when the vibrator is displaced in the front-back direction. Therefore, the restoring force, which applied to the vibrator according to the displacement of the vibrator, can be decreased, and the vibration can efficiently and smoothly be generated.

In the fourth embodiment, holder 550 is attached to frame 520 such that pillar body 551 is fitted in pole 521. Accordingly, unlike the first to third embodiment, it is not necessary to provide the notch, which retains pillar body 551, in the side surface of frame 520. It is not necessary to provide the aperture in frame 520, so that vibration generator 501 care be formed in a substantially sealed structure surrounded by frame 520 and bottom plate 230. Accordingly, foreign substances, such as dust and dirt, can be prevented from invading in vibration generator 501, and the reliability of vibration generator 501 can be improved. Relatively complicated processes, such as a process of caulking pillar body 551, are not required, so that holder 550 can easily be attached to frame 520 while hole unit 552 is fitted in pole 521.

Additionally, vibration generator 501 has the same configuration as vibration generator 201 of the second embodiment. Accordingly, in the fourth embodiment, the same effect as the second embodiment is obtained.

In the fourth embodiment, the attachment structure of the pole to the frame is not limited to the press fitting. The pole may be attached to the frame by a joining method in which the welding, the bonding or the screw is used.

Figure 26:
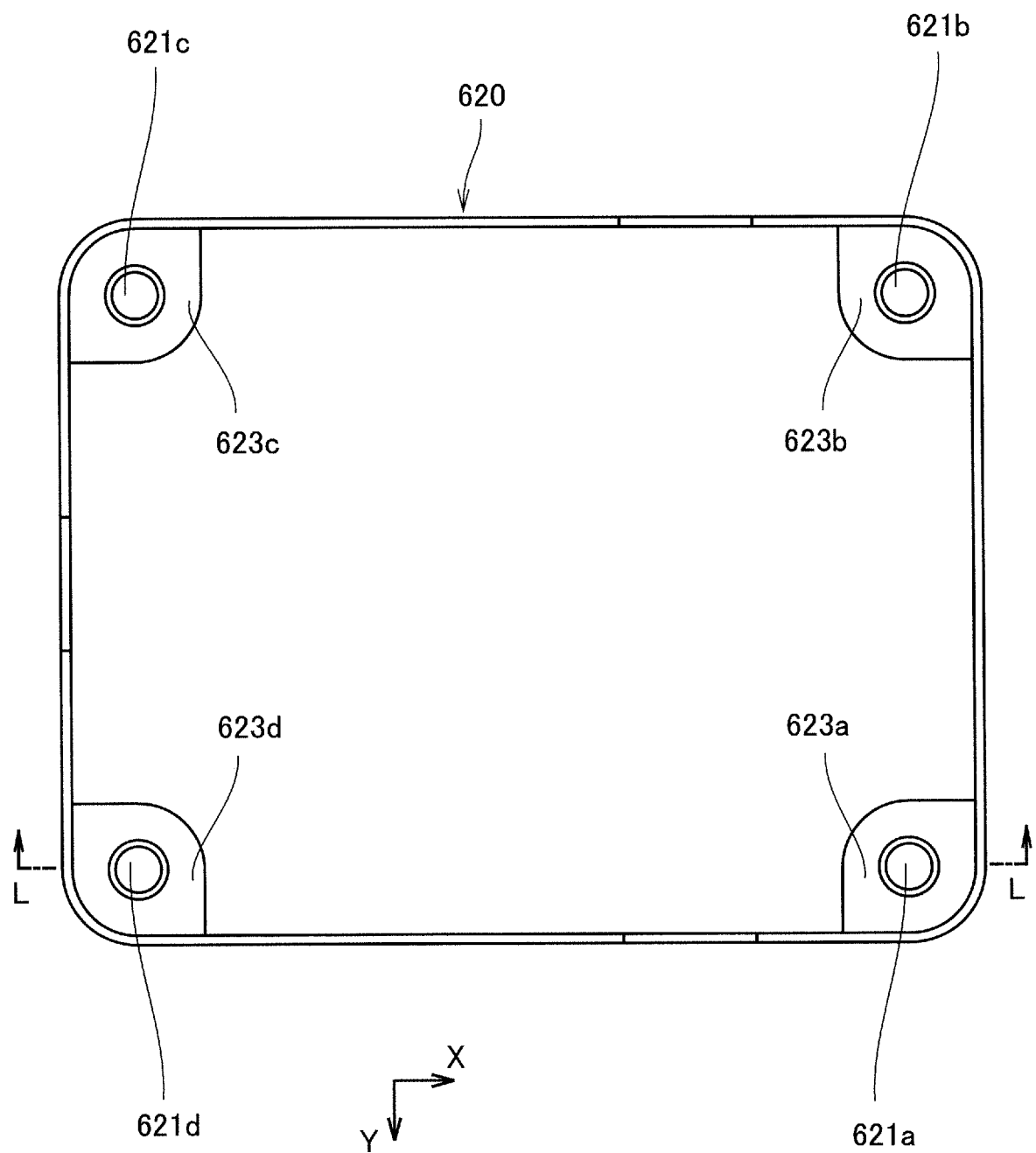
FIG. 26 is a bottom view illustrating a frame used in a vibration generator according to a first modification of the fourth embodiment.
Figure 27:
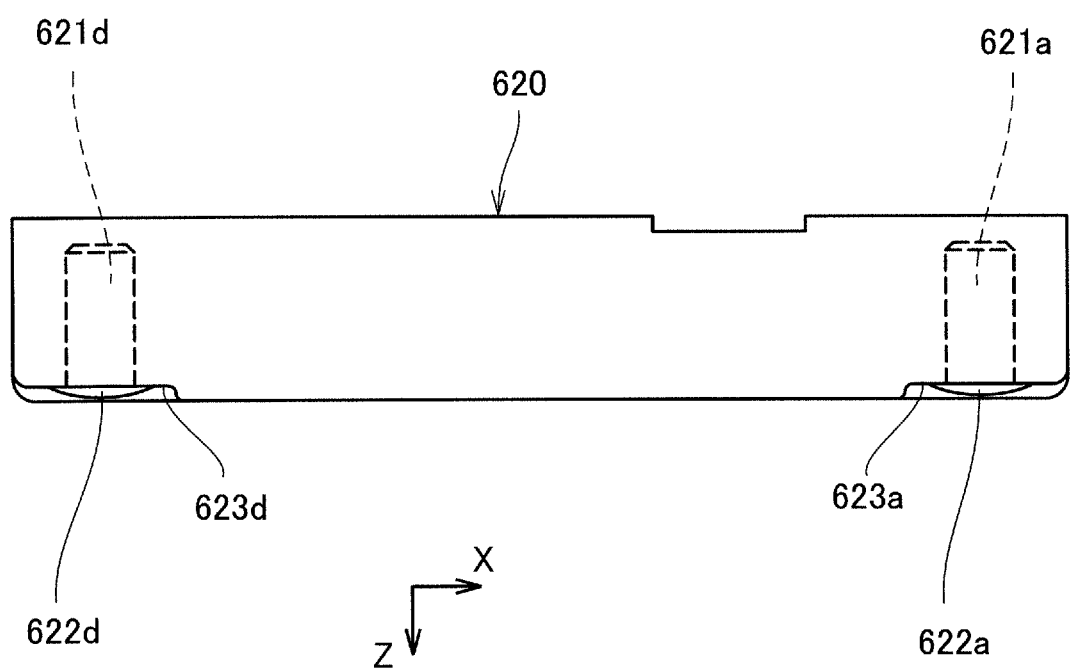
FIG. 27 is a side view of the frame.
Figure 28:
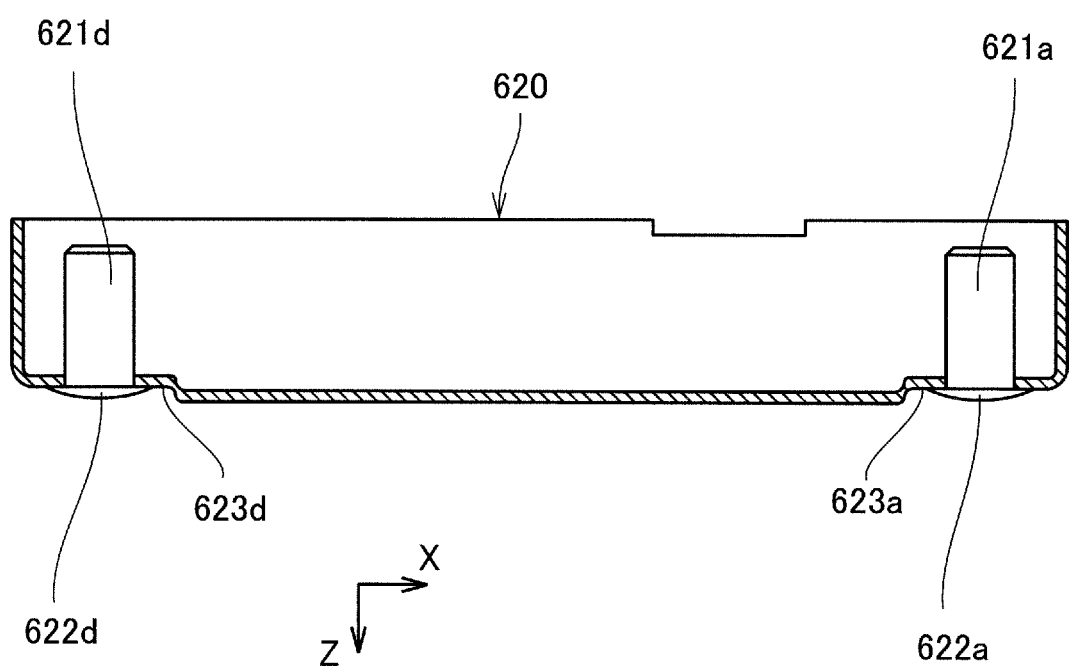
FIG. 28 is a sectional view taken on a line L-L of FIG. 26.

FIG. 26 is a bottom view illustrating a frame 620 used in a vibration generator according to a first modification of the fourth embodiment. FIG. 27 is a side view of frame 620. FIG. 28 is a sectional view taken on a line L-L of FIG. 26.

A rear surface (backward surface) of frame 620 is illustrated in FIG. 27 such that the downward direction in FIG. 27 is the upward direction (the positive direction in the Z-axis) of frame 620. That is, FIG. 27 is a view when frame 620 is viewed from the same direction as FIG. 28.

As illustrated in FIG. 26, frame 620 includes four poles 621 (621a, 621b, 621c, and 621d). Each pole 621 is disposed in the same position as pole 521 of frame 520. As illustrated in FIG. 27, a step 623 (623a, 623b, 623c, and 623d) that is recessed downward by one step from other portions is provided in the region where pole 621 is disposed in the upper surface (the lower-side portion in FIG. 27) of the main body of frame 620.

As illustrated in FIG. 28, a flange-shaped head 622 (622a, 622b, 622c, and 622d) in which a diameter is larger than a diameter of the body portion of pole 621 is provided in an upper end portion of pole 621. Head 622 is configured such that a height in the vertical direction is less than a height of a step from the upper surface of frame 520 to the upper surface of step 623.

Each pole 621 is inserted from above in an aperture (not illustrated) formed in step 623, and pole 621 is attached to frame 620 such that head 622 is hooked in step 623. Each pole 621 is fixed to frame 620 by welding the surroundings of head 622 to step 623. A size in which each pole 621 projects downward can accurately be managed by providing head 622, and therefore the vibration generator having the precise structure can easily be produced.

Pole 621 is fixed to frame 620 by the welding, so that attachment strength of pole 621 to frame 620 can be improved. Accordingly, the durability of the attachment structure of pole 621 can be improved against the vibration. Step 623 is provided in frame 620, so that the welded point can be prevented from projecting upward from the upper surface of frame 620.

The vibration generator is configured while holder 550 is attached to frame 620. At this point, the vertical size of pillar body 551 may be set in consideration of the provision of step 623. Other components of holder 550 may be configured in the same manner as the fourth embodiment.

Step 623 may be eliminated in frame 620. Head 622 may be eliminated in pole 621.

In the fourth embodiment, the hole unit made in the pillar body of the holder may be a bottomed hole. In this case, the pole provided in the frame may be configured to be shortened.

Figure 29:
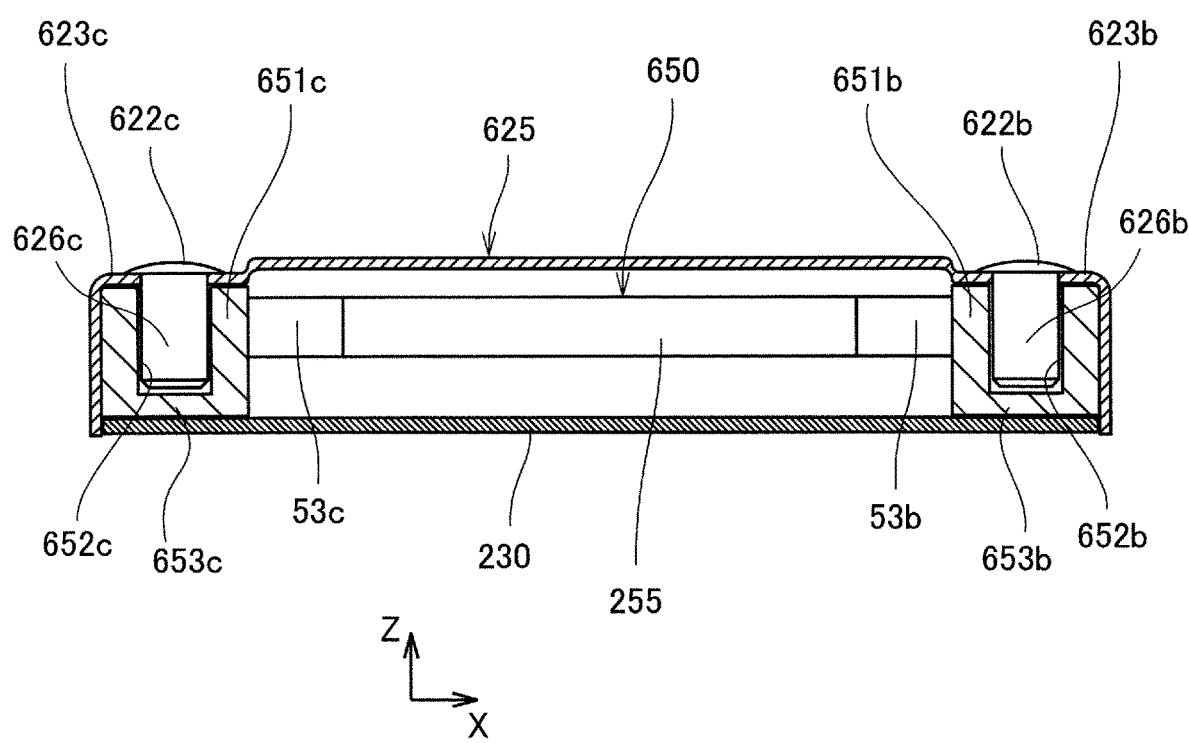
FIG. 29 is a side sectional view illustrating a configuration of a vibration generator according to a second modification of the fourth embodiment.

FIG. 29 is a side sectional view illustrating a configuration of a vibration generator according to a second modification of the fourth embodiment.

The sectional view in FIG. 29 corresponds to the sectional view in FIG. 22. Members, such as the flexible printed board and the coil, which should originally be provided in the vibration generator, are not illustrated in FIG. 29.

As illustrated in FIG. 29, a frame 625 of the vibration generator includes poles 626b and 626c that are short in the lengthwise direction, namely, the vertical direction. Similarly to the main body of frame 620, step 623 is formed in the main body of frame 625. Similarly to frame 620, frame 625 is constructed such that, after poles 626b and 626c are inserted in the main body of frame 625, poles 626b and 626c and the main body of frame 625 are welded.

A holder 650 is attached to frame 625. Basically holder 650 has the same configuration as holder 550. Holder 650 differs from holder 550 in that holder 650 includes pillar bodies 651b and 651c in which bottomed hole units 652b and 652c are formed.

In FIG. 29, only poles 626b and 626c are illustrated with respect to pole 626, and only hole units 652b and 652c and columnar bodies 651b and 651c are illustrated with respect to hole unit 652 and pillar body 651. However, four poles 626, four pillar bodies 651, and four hole units 652 are provided in frame 625 like vibration generator 501.

In the second modification, each hole unit 652 of holder 650 is closed by bottom 653 (for example, 653b and 653c) in the lower portion of hole unit 652. Each hole unit 652 has the bottomed cylindrical shape, so that holder 650 can easily be molded. That is, resin easily goes around the whole of pillar body 651 during the molding of holder 650. Accordingly, what is called a shortage of resin going around can be prevented, and holder 650 can easily be molded. The effect to prevent the shortage of resin going around can surely be obtained by providing a gate, into which the resin is poured, near each pillar body 651.

In the fourth embodiment, the attachment structure of the pole to the main body of the frame is not limited to the above way. For example, a flange abutting on the main body of the frame may be provided in each pole.

Figure 30:
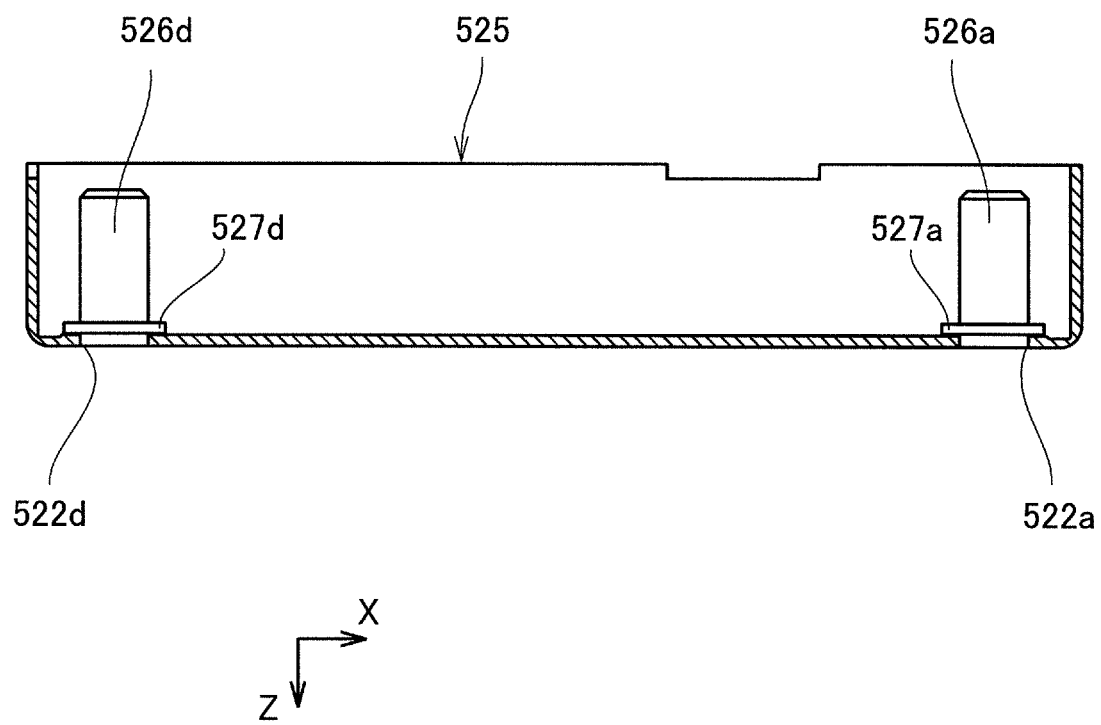
FIG. 30 is a side sectional view illustrating a frame used in a vibration generator according to a third modification of the fourth embodiment.

FIG. 30 is a side sectional view illustrating a frame 525 used in a vibration generator according to a third modification of the fourth embodiment.

The sectional view in FIG. 30 corresponds to the sectional view in FIG. 25.

As illustrated in FIG. 30, the basic configuration of frame 525 is identical to that of frame 520. Frame 525 differs from frame 520 in that frame 525 includes a pole 526 (526a and 526d) in which flange 527 (527a and 527d) is formed. In FIG. 30, only poles 526a and 526d and only flanges 527a and 527d are illustrated with respect to pole 526 and flange 527. However, similarly to vibration generator 501, four poles 526 and four flanges 527 are provided.

Flange 527 is formed in the position that is slightly recessed by the thickness of the main body of frame 525 from the upper end portion of pole 526. Flange 527 has a diameter slightly larger than a diameter of the body portion of pole 526.

Flange 527 is press-fitted in press fitting hole 522 from the inside of frame 525 until flange 527 abuts on the top surface of the main body of frame 525. The distance from the top surface of the main body of frame 525 to the lower end portion of pole 526 can easily be managed by forming flange 527 in pole 526, and the vibration generator can easily be assembled with high accuracy.

Figure 31:
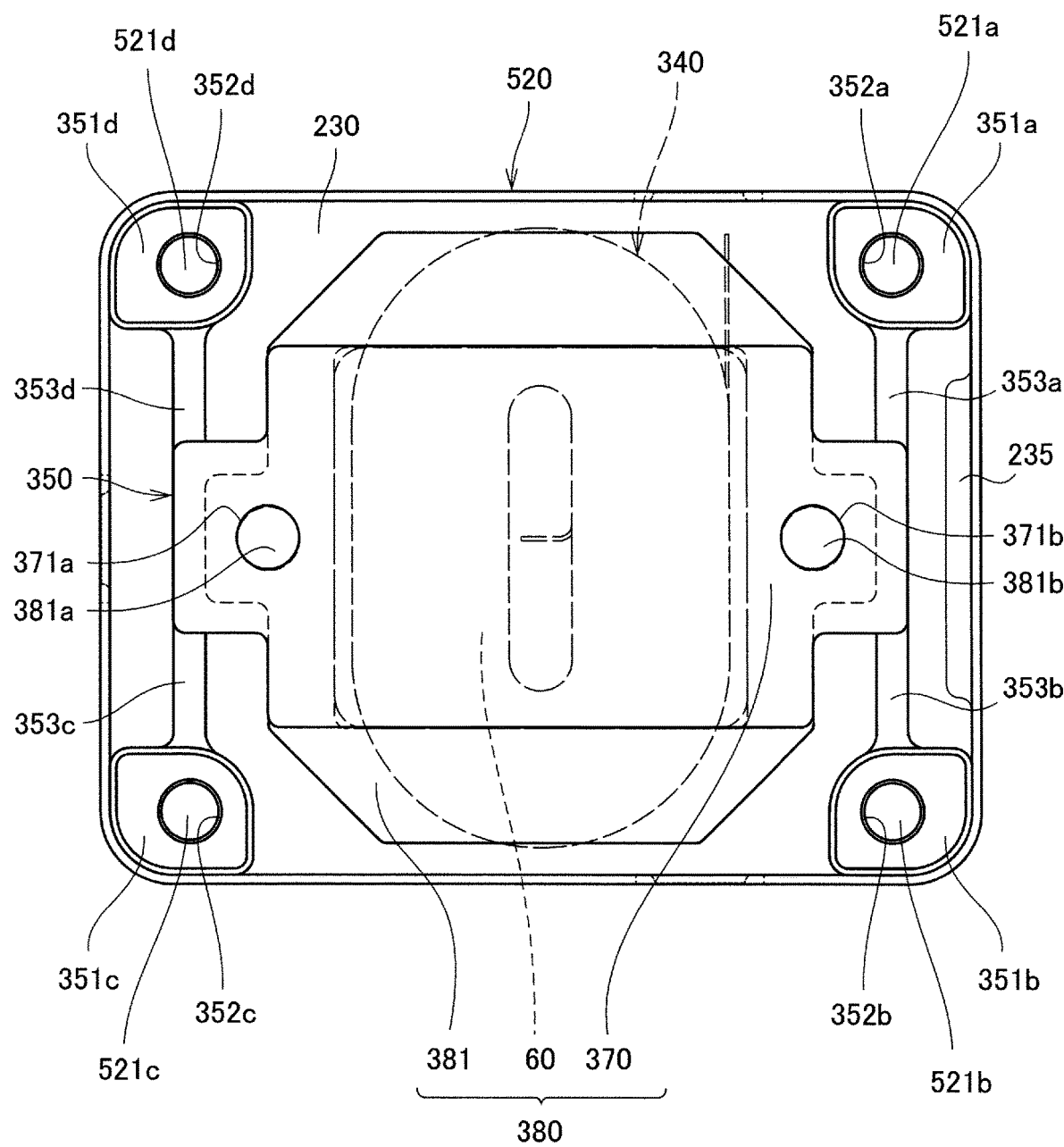
FIG. 31 is a plan view illustrating a configuration of a vibration generator according to a fourth modification of the fourth embodiment.
Figure 32:
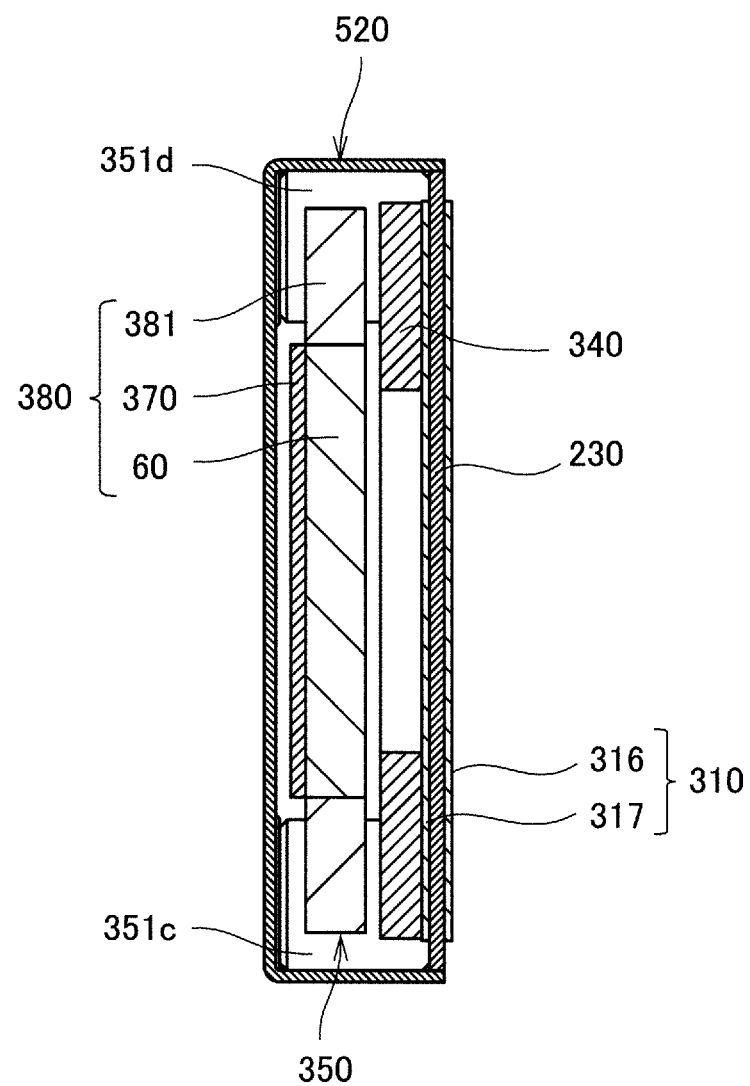
FIG. 32 is a side sectional view of the vibration generator of the fourth modification.
Figure 33:
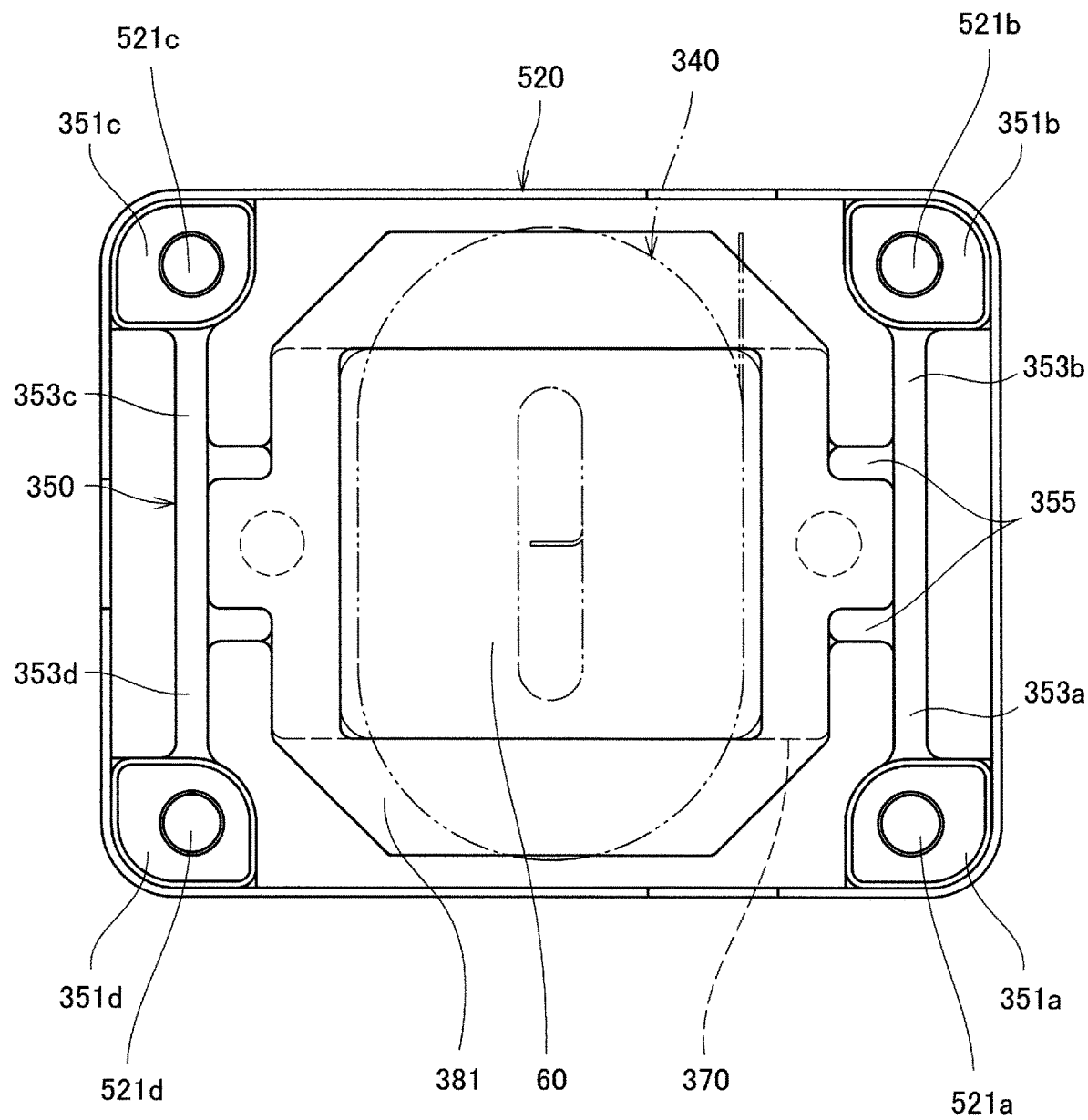
FIG. 33 is a bottom view of the vibration generator of the fourth modification.

FIG. 31 is a plan view illustrating a configuration of a vibration generator 301 according to a fourth modification of the fourth embodiment. FIG. 32 is a side sectional view of vibration generator 301 of the fourth modification. FIG. 33 is a bottom view of vibration generator 301 of the fourth modification.

The sectional view in FIG. 32 corresponds to the sectional view in FIG. 22. A cross section passing through the substantial center in the crosswise direction of vibration generator 301 is illustrated in FIG. 32.

In FIG. 31, similarly to FIG. 1, a holder 350 and the like, which are originally hidden behind upper surface of frame 520, are partially illustrated by the solid line. The flexible printed board is not illustrated in FIG. 31. Bottom plate 230 and the like are not illustrated in FIG. 33. In the fourth modification, the structure of the component that is not illustrated is identical to that of the first embodiment.

Vibration generator 301 includes a holder 350 in which the shape is different from that of holder 550 of vibration generator 501. Holder 350 is attached to frame 520, which is constructed similarly to vibration generator 501. That is, holder 350 is attached to frame 520 so as to be fitted in pole 521. Holder 350 is configured such that the movement direction of vibrator 380 is the crosswise direction (the X-axis direction in FIG. 31).

Holder 350 includes a pillar body 351 (351a, 351b, 351c, and 351d) that is disposed in the position corresponding to pole 521, a vibrator 380, and an arm 353 (353a, 353b, 353c, and 353d) that connects vibrator 380 and pillar body 351. In holder 350, these units are integrally molded using resin.

A hole unit 352 (352a, 352b, 352c, and 352d) is made in pillar body 351. For example, hole unit 352 is made in the same manner as hole unit 552. The outer circumference surface of pillar body 351 is formed so as to contact the inner circumference surface of frame 520 in the state in which holder 350 is attached to frame 520. That is, pillar body 351 is formed into the shape corresponding to an R-curved surface of the corner portion and planar portions located on both sides of the R-curved surface in the inner circumference surface. Therefore, pillar body 351 contacts the inner circumference surface of frame 520 in a relatively wide range while holder 350 is attached to flume 520. Accordingly, pillar body 351 is surely retained such that the position and attitude of pillar body 351 do not change with respect to frame 520. Because pillar body 351 contacts frame 520 in the wide range, the vibration generated by the movement of vibrator 380 easily propagates from holder 350 to frame 520. Accordingly, the vibration can efficiently be transmitted to the outside of vibration generator 301.

Vibrator 380 includes magnet 60, a yoke 370, and a weight 381. Weight 381 is formed so as to surround the side portion of magnet 60. Yoke 370 is attached to the upper surfaces of magnet 60 and weight 381. Yoke 370 includes apertures 371a and 371b that are formed on both sides in the crosswise direction of yoke 370. Protrusions 381, each of which are formed in the upper surface of weight 381 so as to project upward, are fitted in apertures 371a and 371b.

Each arm 353 is formed such that the front-back direction is the lengthwise direction. That is, arms 353a and 353b are provided between the right end portion of vibrator 380 and columnar bodies 351a and 351b. On the other hand, arms 353c and 353d are provided between the left end portion of vibrator 380 and columnar bodies 351c and 351d. As illustrated in FIG. 33, the right and left side portions of weight 381 are retained by retention units 355 made of resin. Retention units 355 are formed so as to sandwich the side portion of weight 381 therebetween in the front-back direction. Each arm 353 is connected to retention unit 355 in the portion on the side of vibrator 380.

Figure 34:
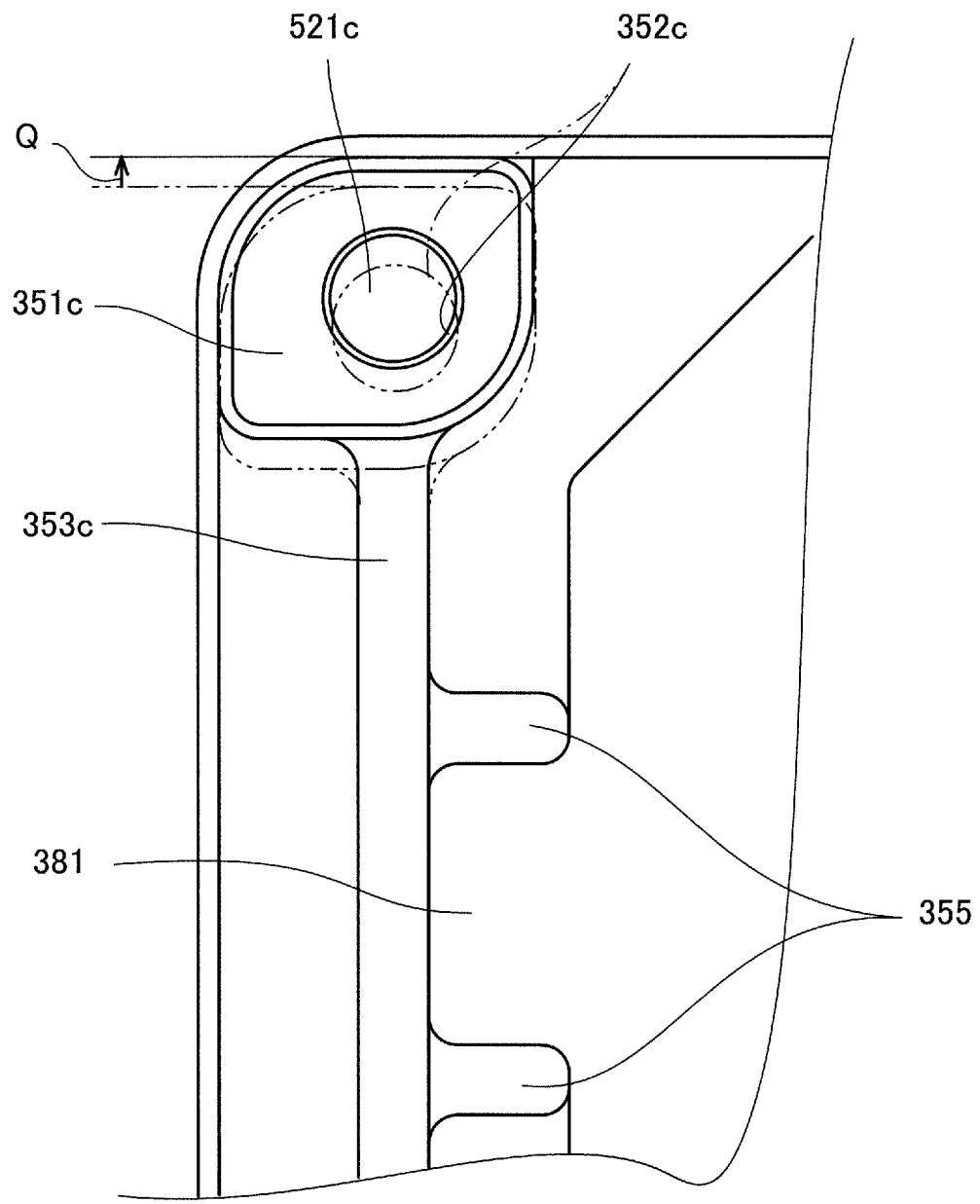
FIG. 34 is a view illustrating a configuration of a holder in the vibration generator of the fourth modification.

FIG. 34 is a view illustrating a configuration of holder 350 in vibration generator 301 of the fourth modification.

In FIG. 34, the portion of one arm 353c is enlarged in the bottom view of vibration generator 301.

In holder 350 in a natural state (for example, a state in which holder 350 is not attached to frame 520), the distance between pillar body 351a and pillar body 351b is shorter than the distance between center axes of pole 521a and pole 521b. In the natural state, a distance between pillar body 351c and pillar body 351d is shorter than the distance between the center axes of pole 521c and pole 521d. Therefore, as indicated by an arrow Q in FIG. 34, when holder 350 is attached to frame 520, each arm 353 is slightly lengthened in the lengthwise direction compared with the natural state. That is, in the state in which holder 350 is attached to frame 520, each arm 353 is elastically deformed from the natural state.

Because each arm 353 is attached while elastically deformed from the natural state, a tension is applied to holder 350 by the restoring force of arm 353. That is, vibration generator 301 has no play. In other words, when the magnetic attractive force acts on vibrator 380, vibration generator 301 can quickly generate the vibration as vibrator 380 is displaced, and a responsive property of the vibration generation is enhanced.

Fifth Embodiment

Because a basic configuration of a vibration generator according to a fifth embodiment is identical to that of the third embodiment, the repetitive description is omitted. The fifth embodiment differs from the above embodiments in a structure of the arm of the holder.

Figure 35:
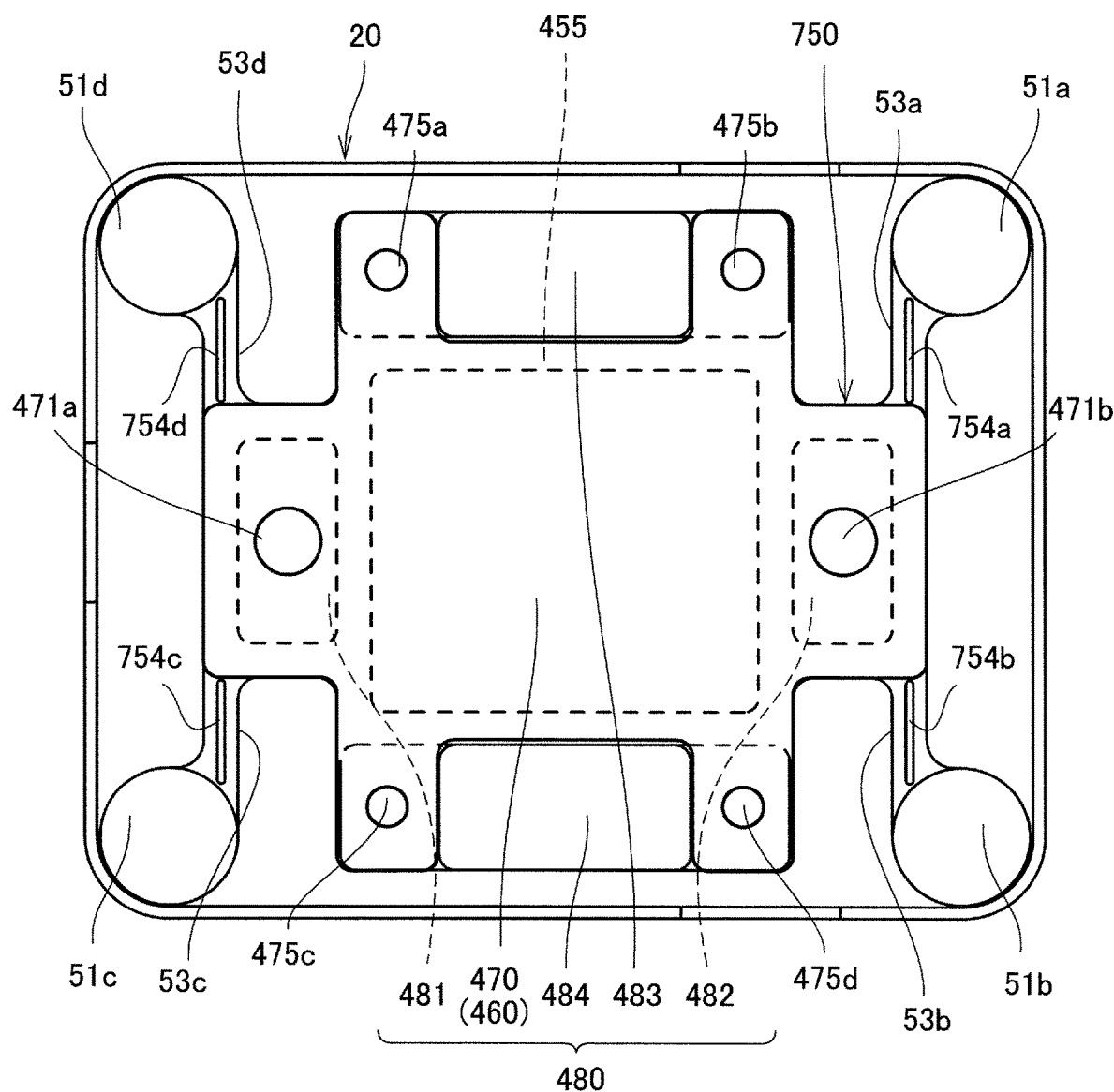
FIG. 35 is a plan view illustrating a vibration generator according to a fifth embodiment.
Figure 36:
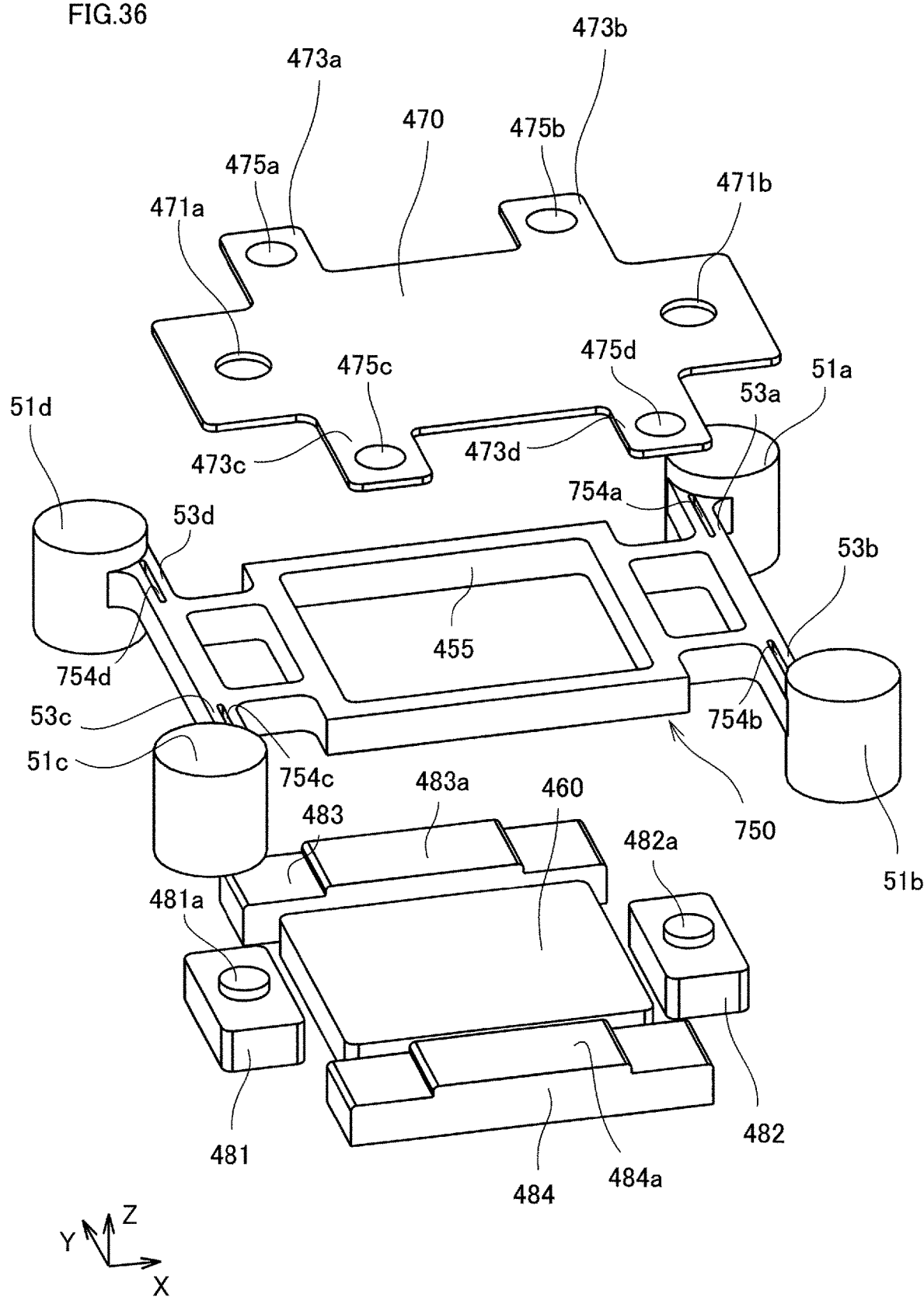
FIG. 36 is an exploded perspective view illustrating a holder and a vibrator of the vibration generator.

FIG. 35 is a plan view illustrating a vibration generator 701 of the fifth embodiment FIG. 36 is an exploded perspective view illustrating a holder 750 and vibrator 480 of vibration generator 701.

In FIG. 35, similarly to FIG. 1, holder 750 and the like, which are originally hidden behind upper surface of frame 20, are partially illustrated by the solid line. A flexible printed board and a coil disposed on the flexible printed hoard are also not illustrated in FIG. 35. In the fifth embodiment, the structure of the component that is not illustrated is identical to that of the third embodiment. For example, the structure in which holder 750 is retained by frame 20 is identical to that of the first embodiment.

Vibration generator 701 includes holder 750 in which the configuration is partially different from that of holder 450. In holder 750, vibrator 480 is provided in vibrator retention unit 455. Vibrator 480 is constructed while magnet 460, yoke 470, and weights 481 to 484 are retained in vibrator 480. Four columnar bodies 51 of bolder 750 are retained in frame 20, whereby holder 750 is attached to frame 20. Holder 750 is identical to holder 450 of the third embodiment in this point. That is, in vibration generator 701 in FIG. 35, the two coils (not illustrated) are excited to reciprocate vibrator 480 in the crosswise direction, thereby generating the vibration.

As illustrated in FIG. 36, in the fifth embodiment, slits 754 (754a, 754b, 754c, and 754d) are formed in four arms 53 of holder 750, respectively. Each slit 754 is formed along the lengthwise direction of arm 53. That is, each slit 754 is formed such that the front-back direction is the lengthwise direction. Four slits 754 have the same shape.

As illustrated in FIG. 35, each slit 754 is formed in the central portion of the width direction of arm 53 when viewed from above. Each slit 754 is formed such that one of vertical end portions of each slit 754 comes close to pillar body 51 while the other end portion comes close to retention unit 455 (in the fifth embodiment, in retention unit 455, the region retaining weights 471a and 471b). That is, each slit 754 is formed in the substantially whole domain in the lengthwise direction of arm 53. Each slit 754 pierces arm 53 from the upper surface to the lower surface. Therefore, it is said that each arm 53 is divided into right and left beam-shaped regions with slit 754 interposed between the regions.

For example, slit 754 may be formed as follows. That is, when holder 750 is integrally molded, arm 53 having slit 754 may be molded during mold release of holder 750 using a die having the shape for forming slit 754. After holder 750 is integrally molded, arm 53 in which slit 754 is not formed yet is machined in order to form a slit 754.

Because vibration generator 701 roughly has the same configuration as vibration generator 401, basically the same effect as the third embodiment is obtained. In the fifth embodiment, the following effect is further obtained by forming slit 754 in arm 53.

That is, in the case of the same displacement amount of vibrator 480, compared with the case that slit 754 is not provided in arm 53, each portion of arm 53 is more evenly deformed when slit 754 is provided in arm 53. Accordingly, arm 53 is hardly broken, and a life of holder 750 is lengthened.

A vibration property of vibration generator 701 can easily be changed by changing the shape and the position of slit 754. For example, a vibration amount of vibrator 480 can easily be changed by changing a width of slit 754. In other words, in the fifth embodiment, the width of slit 754 may be set according to the desired vibration property.

The shape of slit 754 is not limited to the example in FIGS. 35 and 36. For example, slit 754 has the width of substantial zero, and only a cut may be formed in arm 53.

In the fifth embodiment, a reinforcing plate may be inserted in the slit.

Figure 37:
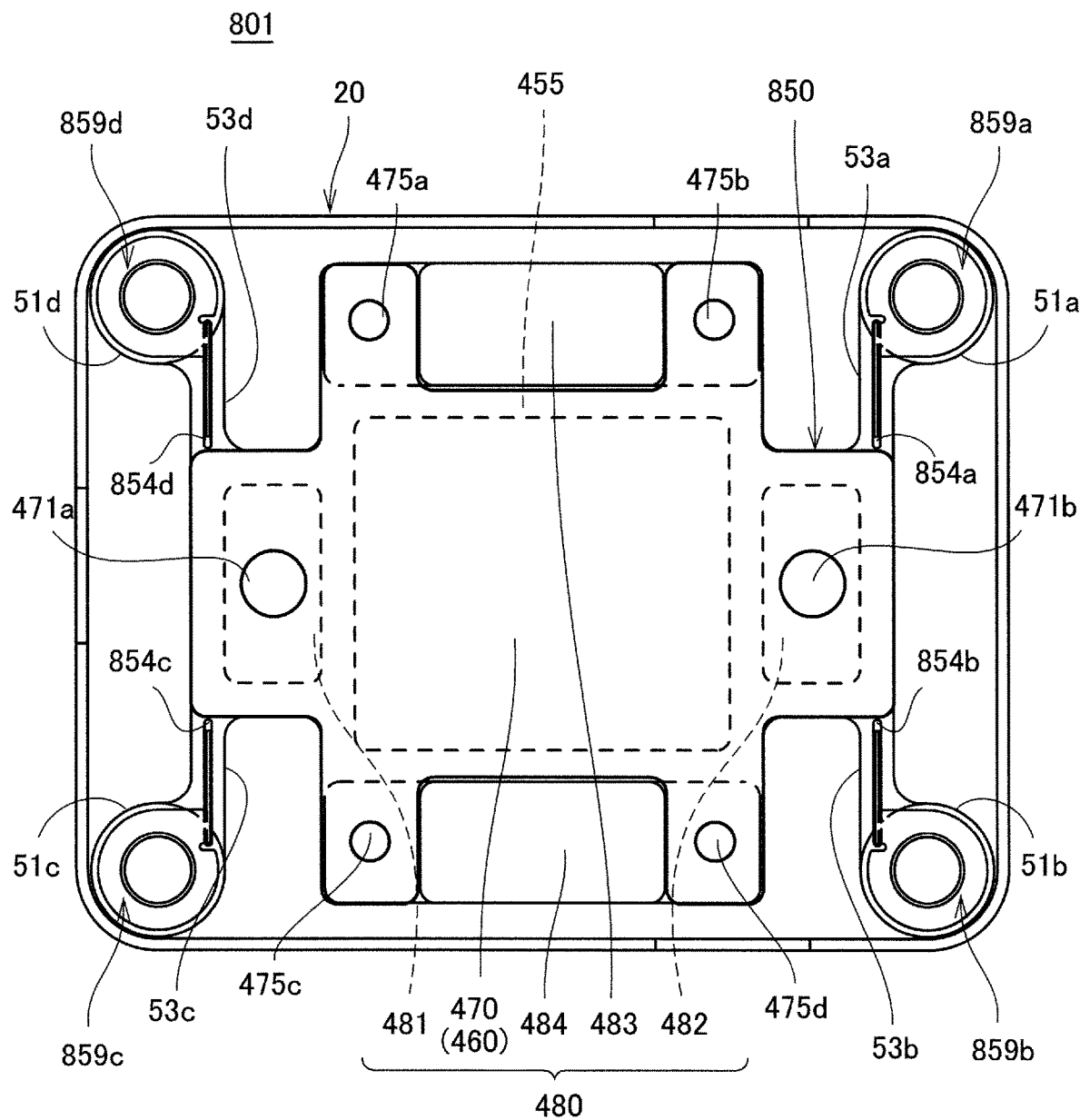
FIG. 37 is a plan view illustrating a vibration generator according to a first modification of the fifth embodiment.

FIG. 37 is a plan view illustrating a vibration generator 801 according to a first modification of the fifth embodiment.

Similarly to FIG. 35, illustrations of components are partially omitted in FIG. 37. Similarly to holder 750, a holder 850 in which a slit 854 (854a, 854b, 854c, and 854d) is formed in each arm 53 is provided in vibration generator 801 of the first modification. Holder 850 includes four reinforcing plates 859 (859a, 859b, 859c, and 859d). In vibration generator 801, other configurations are identical to those of vibration generator 701 of the fifth embodiment.

Figure 38:
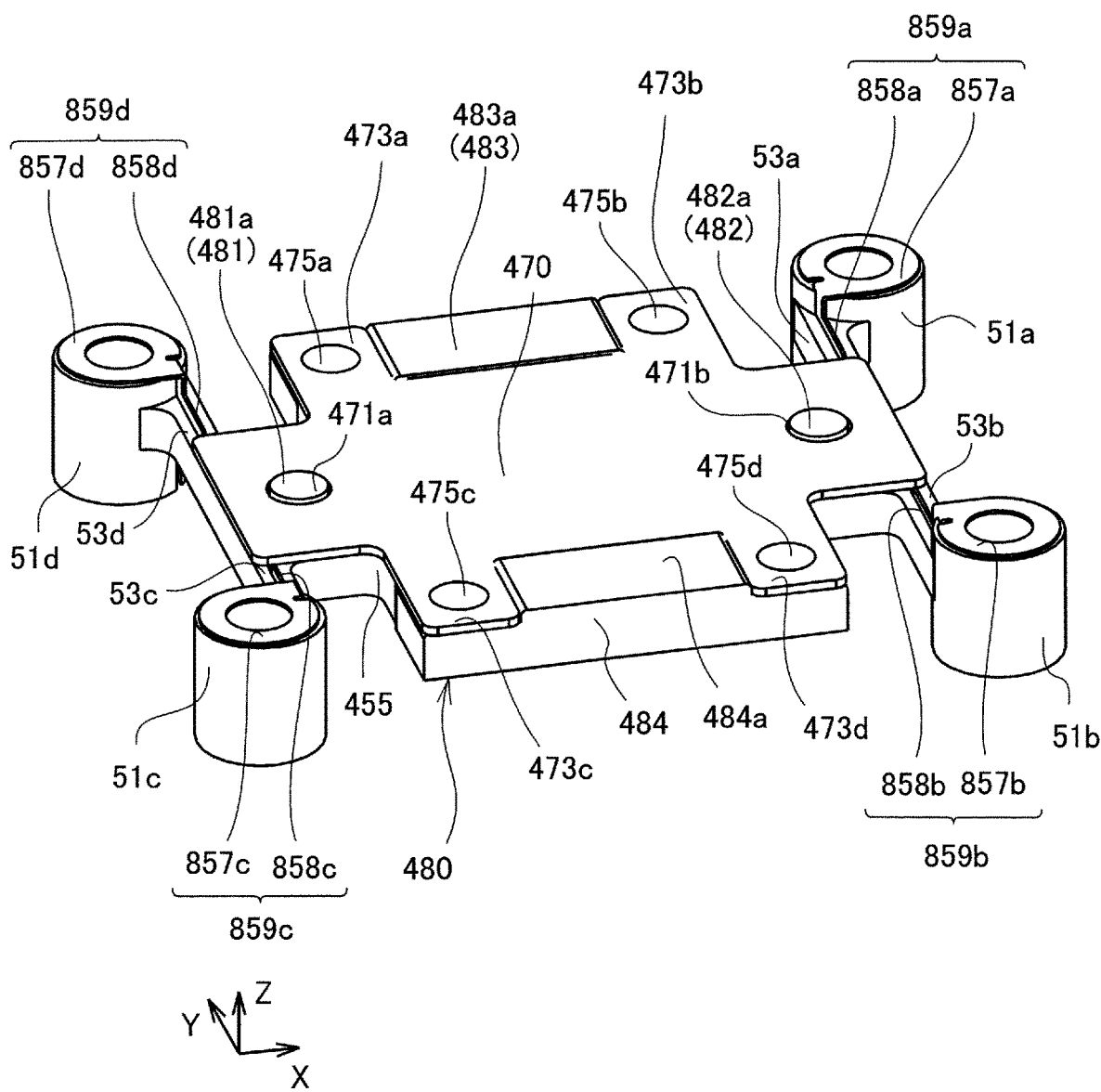
FIG. 38 is a perspective view illustrating a holder and a vibrator of the vibration generator.
Figure 39:
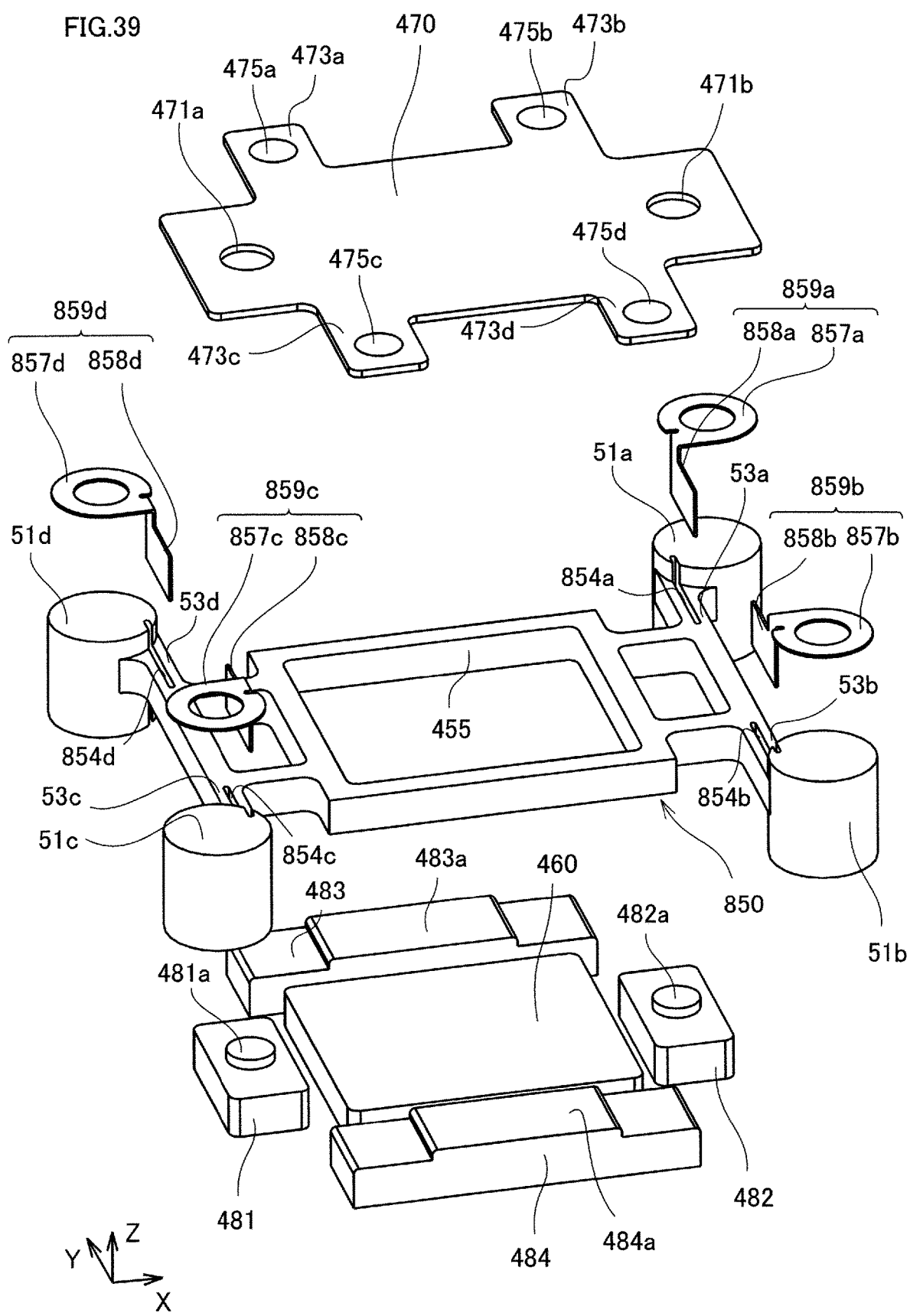
FIG. 39 is an exploded perspective view illustrating the holder and the vibrator.

FIG. 38 is a perspective view illustrating holder 850 and vibrator 480 of vibration generator 801. FIG. 39 is an exploded perspective view illustrating holder 850 and vibrator 480.

As illustrated in FIG. 38, each reinforcing plate 859 is disposed so as to correspond to pillar body 51 and arm 53 of holder 850. Each reinforcing plate 859 includes a support unit 857 (857a, 857b, 857c, and 857d) and an insertion unit 858 (858a, 858b, 858c, and 858d).

As illustrated in FIG. 39, support unit 857 has a circular plate shape in which a diameter is slightly smaller than a diameter of each pillar body 51. Support unit 857 is not limited to the circular shape. Support unit 857 is not limited to the plate shape.

Insertion unit 858 has a substantially rectangular plate shape. Insertion unit 858 is partially connected to support unit 857. In the first modification, reinforcing plate 859 is formed such that insertion unit 858 and support unit 857 are punched out from one metallic sheet and such that insertion unit 858 is bent by 90 degrees with respect to support unit 857. Insertion unit 858 has such the thickness and the size that insertion unit 858 can be inserted in slit 854 previously formed in arm 53 of holder 850.

Figure 40:
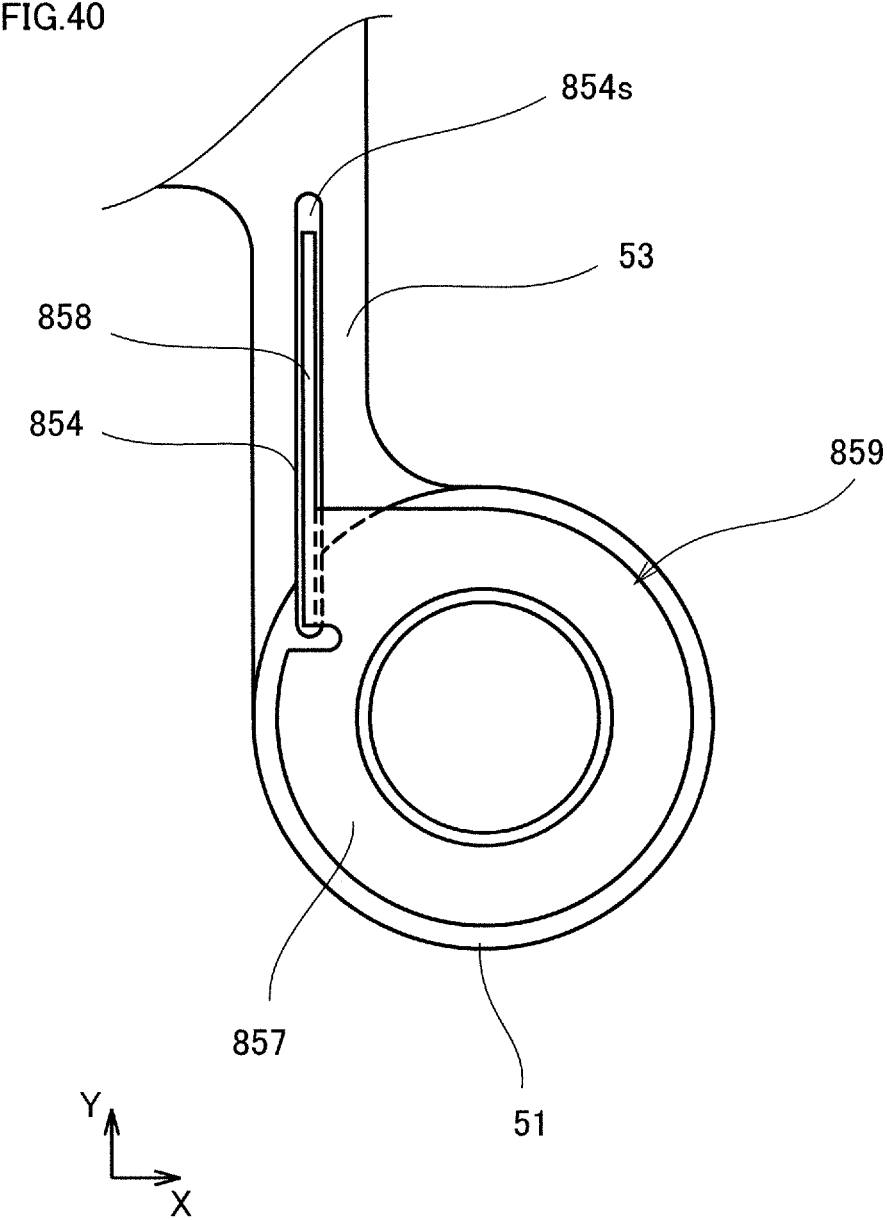
FIG. 40 is an enlarged view illustrating a portion in which a reinforcing plate of the holder is disposed.
Figure 41:
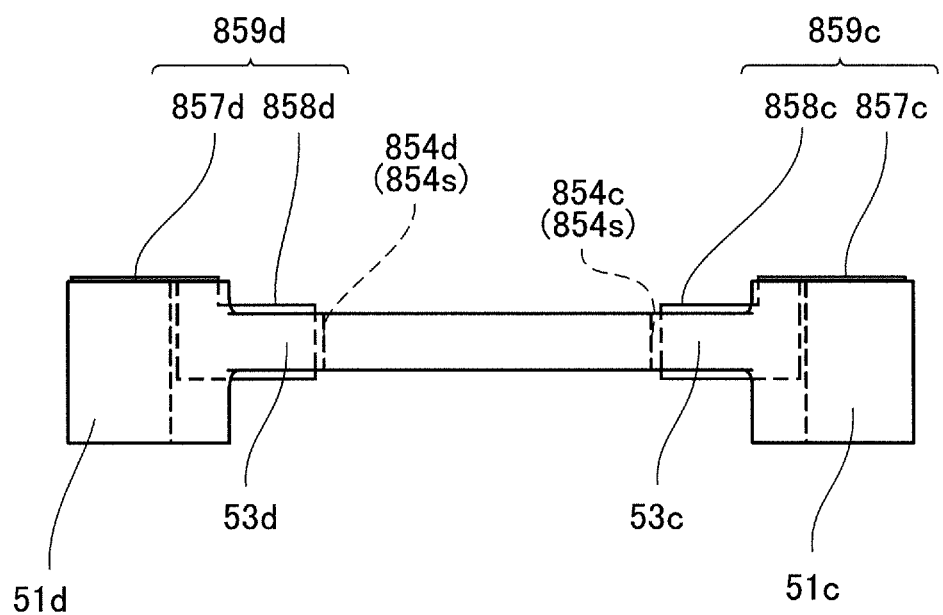
FIG. 41 is a side view of the holder.

FIG. 40 is an enlarged view illustrating a portion in which reinforcing plate 859 of holder 850 is disposed. FIG. 41 is a side view of holder 850.

FIG. 41 illustrates the left side of holder 850.

As illustrated in FIG. 40, reinforcing plate 859 is used while attached to holder 850. Reinforcing plate 859 is attached to holder 850 such that insertion unit 858 is inserted in slit 854 and such that support unit 857 is disposed on the upper surface of pillar body 51. As illustrated in FIG. 41, insertion unit 858 is formed such that the size in the vertical direction of insertion unit 858 is slightly larger than the size in the vertical direction of arm 53. Insertion unit 858 is disposed in slit 854 so as to run over upward and downward from arm 53 by a slight amount.

As illustrated in FIG. 40, unlike slit 754 of holder 750, slit 854 is formed to the position in which slit 854 slightly invades in pillar body 51. Insertion unit 858 is inserted in slit 854 such that the end edge portion on the side of pillar body 51 invades in pillar body 51. That is, the end edge portion on the side of pillar body 51 of insertion unit 858 is disposed in the position that is not largely deformed during the movement of vibrator 480.

Slit 854 is formed longer to the position closer to vibrator 480 beyond the position of the end edge portion (the upper end edge portion in FIG. 40) on the side of vibrator 480 of insertion unit 858. That is, the end edge portion on the side of vibrator 480 of insertion unit 858 is slightly separated from the end edge portion on the side of vibrator 480 of slit 854 with a gap 854s intervened therebetween.

A circular hole is made in the central portion of support unit 857. For example, the hole is required in the following case. That is, like the fourth embodiment, sometimes the pillar body is fixed to the frame such that the pole on the frame side is fitted in the pillar body of the holder. In this case, when reinforcing plate 859 is arranged, reinforcing plate 859 is disposed such that the pole is inserted in the hole of support unit 857. In other cases (for example, the case that reinforcing plate 859 is used while attached to holder 850), the hole in support writ 857 may be eliminated.

In the fifth embodiment, reinforcing plate 859 is bent together with arm 53 as retention unit 455 is displaced with respect to pillar body 51 during the movement of vibrator 480. Insertion unit 858 is disposed like a cantilever because one end portion of insertion unit 858 is retained by pillar body 51. Accordingly, when retention unit 455 is displaced in the crosswise direction, each insertion unit 858 is bent such that the end portion on the side of vibrator 480 is most displaced in the crosswise direction.

At this point, gap 854s is provided between insertion unit 858 and slit 854. Accordingly, even if both insertion unit 858 and arm 53 are bent as retention unit 455 is displaced, insertion unit 858 does not strongly contact the end edge portion of slit 854. Accordingly, generation of a failure such that insertion unit 858 invades in slit 854 to break arm 53 is prevented.

According to the first modification, vibrator 480 can be retained while slit insertion unit 858 is inserted in slit 854. The stiffness and strength of arm 53 in which slit 854 is provided decrease compared with the case that slit 854 is not formed. By inserting insertion unit 858 having the proper thickness and size in slit 854, the stiffness of arm 53 is properly maintained and the displacement amount of vibrator 480 can be set so as to become proper. The bending of arm 53 due to gravity or the impact, which applied to vibrator 480, can be prevented when vibration generator 801 is not driven.

Reinforcing plate is not limited to one in which the vertical position is fixed by sandwiching support unit 857 between pillar body 51 and the top surface of frame 20. Reinforcing plate may be fixed to pillar body 51 by another method. Reinforcing plate may be fixed to frame 20 or bottom plate 230 separately from the pillar body.

In the fifth embodiment, the holder having the structure in which the arm is molded using plural resins may be used instead of the structure in which the slit is provided in the arm.

Figure 42:
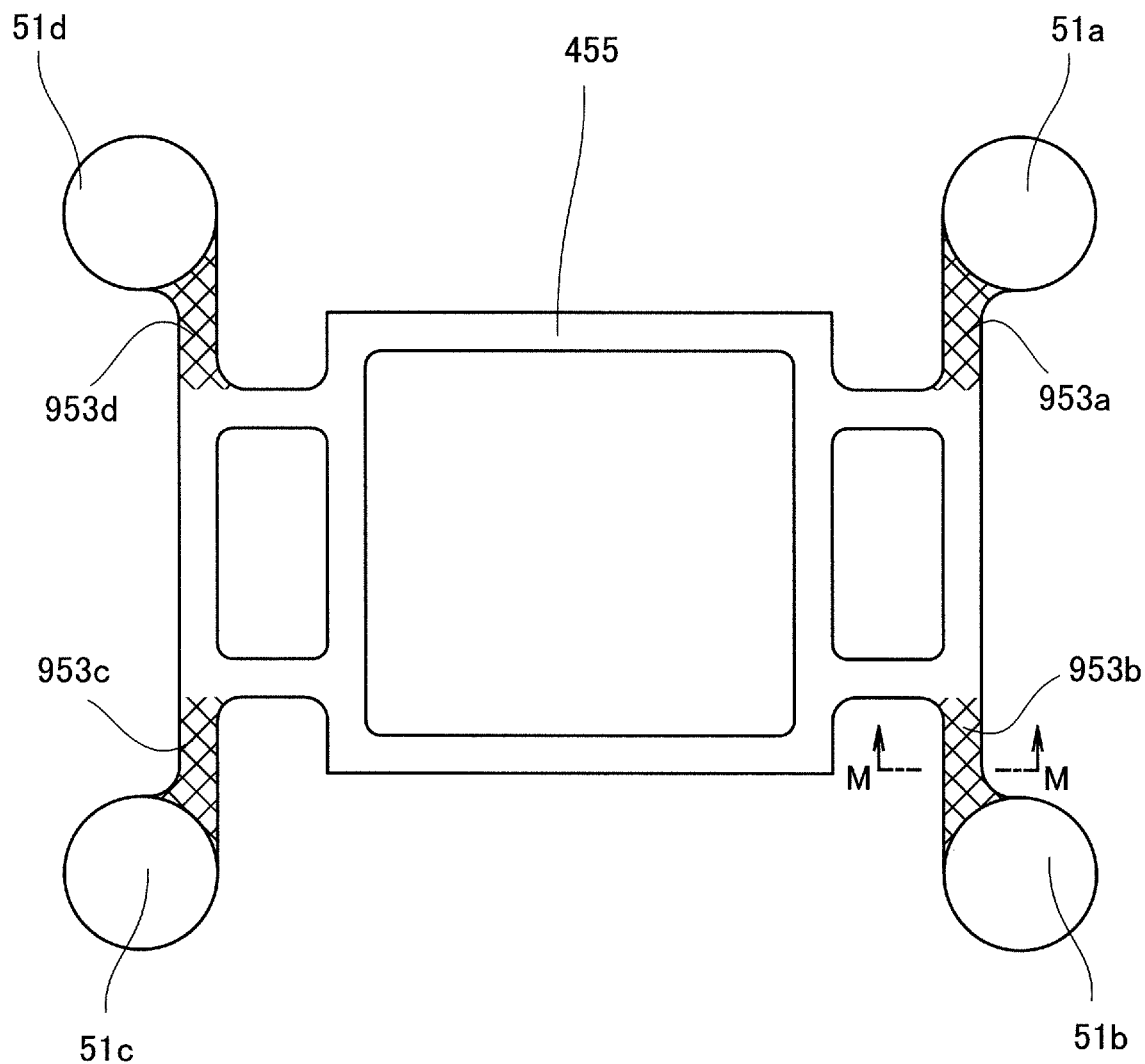
FIG. 42 is a plan view illustrating a holder of a vibration generator according to a second modification of the fifth embodiment.

FIG. 42 is a plan view illustrating a holder 950 of a vibration generator according to a second modification of the fifth embodiment.

In the second modification, the vibration generator includes holder 950 instead of holder 750. In the vibration generator, other configurations except holder 950 are identical to those of the fifth embodiment.

In the second modification, holder 50 and vibrator 480, which includes magnet 460 and yoke 470, are integrally molded. For the sake of convenience, holder 950 in which vibrator 480 is not attached to retention unit 455 is illustrated in FIG. 42. That is, vibrator 480 is not illustrated in FIG. 42, but only holder 950 made of the elastic material is illustrated.

As illustrated hi FIG. 42, similarly to holder 750, holder 950 includes retention unit 455 and four pillar bodies 51. In bolder 950, retention unit 455 and each pillar body 51 include an arm 953 (953a, 953b, 953c, and 953d) in which the configuration is different from that of holder 750.

In the second modification, each arm 953 is formed by two-color molding. In FIG. 42, the portion formed by the two-color molding is indicated by hatching.

Figure 43:
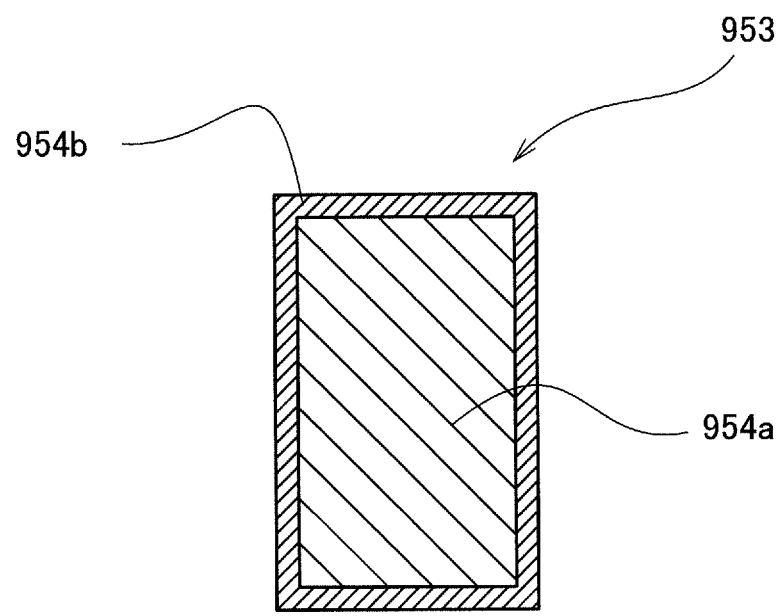
FIG. 43 is a sectional view taken on a line M-M of FIG. 42.

FIG. 43 is a sectional view taken on a line M-M of FIG. 42.

As illustrated in FIG. 43, arm 953 is formed by the two-color molding using a first resin 954a and a second resin 954b. For example, retention unit 455, pillar body 51, and arm 953 are integrally formed using first resin 954a. Second resin 954b is lower than first resin 954a in hardness.

Arm 953 is formed while the outside of the portion made of first resin 954a is covered with second resin 954b. In other words, in the second modification, each arm 953 includes a core portion made of first resin 954a. The outside of the core portion is coated with second resin 954b.

First resin 954a having the relatively high hardness is used as the material for the inside of each arm 953. Accordingly, the stiffness and the strength of each arm 953 are ensured, and the core portion of arm 953 becomes sound. The surroundings of first resin 954a is covered with relatively soft second resin 954b. Therefore, a crack or a flaw is hardly generated in arm 953. Accordingly, the life of arm 953 can be lengthened, and the reliability of the vibration generator can be improved.

The disposition of the resin in each arm 953 is not limited to the second modification. For example, depending on the shape of holder 950, the relatively soft resin is disposed at the point on which a stress is concentrated, which allows the life of arm 953 to be lengthened.

[Others]

The vibration generator may be configured by properly combining the feature points of the above embodiments and modifications. For example, in the vibration generators of the second to fifth embodiments, like the first embodiment, double-side boards, such as a glass epoxy board, may be used instead of the flexible printed board. The production cost of the vibration generator can be reduced in the case that the double-side hoard is used.

In the second to fifth embodiments, an R-chamfering unit may be provided in the notch of the bottom plate. For example, the R-chamfering unit may be provided in the edge portion that is formed by forming the notch. Therefore, even if the board that is of the FPC is folded at the notch, the stress is hardly applied to the board, and the breakage of the board can more surely be prevented.

The material for the frame is not limited to the steel, but the frame may be made of another material. For example, the frame may be made of resin separately from the holder. The frame may be formed such that the holder is surrounded by the frame without providing the upper surface or the bottom surface when viewed from above. The frame may be formed into a square shape when viewed from above.

The circuit board may not be provided. The bottom plate does not cover the whole surface of the bottom portion of the frame, but the bottom plate may be disposed only in a part of the bottom portion of the frame.

Four projections may be provided in the yoke, or odd-numbered projections may be provided in the yoke. The surface of the projection is not limited to the spherical shape, and not limited to the curved-surface shape. The projection is formed such that the region having the restricted area contacts the inner surface of the frame. Therefore, the above effects can be obtained.

It is only necessary to provide at least two pillar bodies and at least two arms. The pillar body is not limited to the columnar shape, but the pillar body may be formed into a polygonal column shape. The holder is not limited to the integral molding, but the holder may be constructed by assembling plural members.

The attachment structure of the holder to the frame is not limited to the structure in which two claws engage the pillar body or the structure in which the pole is fitted in the hole unit of the pillar body. In the attachment structure of the holder to the frame, the fixed unit having another shape on the holder side may engage engaging unit formed in the frame. For example, a hole-shape engaging unit is formed in the frame, and the projection on the holder side may be fitted in the engaging unit to attach the holder to the frame.

The holder is not limited to one that formed by single-color molding. For example, the pillar body, the retention unit, and the arm may be integrally molded by the two-color molding using different materials.

The attachment structure of the vibrator to the holder, namely, the attachment structure of the magnet and the yoke to the holder is not limited to the insert molding. For example, the magnet and the yoke, which are joined to each other by the welding, may be assembled in and bonded to the integrally-molded holder in a process different from the process of molding the holder. Alternatively, the holder and the yoke may be integrally molded and then the magnet may be attached to the yoke.

The weight may be disposed in the central portion of the magnet. In the magnet, the weight may be disposed in the portion that hardly influences the generation of the force moving the vibrator. Therefore, the vibration generator in which the large vibration force is generated while the downsizing of the vibrator is implemented can be constructed.

Alternatively, the coil is attached to a main board of the device in which the vibration is used, and the frame to which the holder is attached is attached to the coil-mounted main board, whereby the vibration generator in which the vibrator is driven may be constructed. In other words, the vibration generator may be constructed using the coil mounted on the board of another device.

The configuration of the holder is not limited to the holder used in vibration generator, but the configuration can widely be applied. That is, the holder is configured such that a movable body (in the embodiments, the portion constituting the vibrator) provided in the magnet can be displaced through the arm with respect to the portion supported by the frame. The holder can be used in various devices, such as an actuator driven by the magnetic force and a device in which the movable body is used while properly displaced in a predetermined orientation. In a device different from the vibration generator, the same effect can be obtained by constructing the holder in the above manner. For example, by providing the projection in the yoke of the holder, the region where the movable body contacts the frame can be restricted, and the device can properly be operated.

It should be understood that the embodiments described above are illustrative and non-resistive in every respect. The scope of the present invention is defined by the terms of the claims, rather than the description above, and is intended to include any modifications within the scope and meaning equivalent to the terms of the claims.

What is claimed is:

1. A vibration generator comprising:
 a frame;
 a vibrator including:
  a plurality of members that are bonded, solvent welded, or welded to each other, the plurality of members including: (i) a magnet, and (ii) a yoke that is formed into a planar shape and having an aperture, a planar coil, and a protrusion protruding toward the frame in a winding axis direction of the planar coil, the winding axis direction being different from a vibrating direction of the vibrator;

a holder displaceably supporting the vibrator with respect to the frame; and wherein:

a whole of the protrusion is fitted within the aperture of the yoke in a radial direction of the aperture, and a width of the protrusion is substantially identical in the vibrating direction of the vibrator.

2. The vibration generator according to claim 1, wherein the vibrator includes a weight, and the protrusion is provided on the weight arranged on a right or on a left of the magnet.

3. The vibration generator according to claim 1, wherein current is passed through the planar coil to displace the magnet with respect to the frame.

4. The vibration generator according to claim 1, wherein the aperture is formed in a side portion of the yoke in a displacement direction of the vibrator.

5. The vibration generator according to claim 4, wherein the vibrator includes a weight, the weight faces a side portion of the yoke in the displacement direction of the vibrator, and the protrusion is provided on the weight arranged on a right or on a left of the magnet.

6. The vibration generator according to claim 1, wherein the vibrator includes a raised unit facing an outer circumferential surface of the yoke, and the raised unit is raised toward the frame in a winding axis direction of the planar coil.

7. The vibration generator according to claim 6, wherein the raised unit is raised by a substantially same level as a thickness of the yoke.

8. The vibration generator according to claim 6, wherein the vibrator includes a weight, and the raised unit is provided at the weight arranged on a right or on a left of the magnet.

9. The vibration generator according to claim 6, wherein a plurality of the raised units including the raised unit is provided, and the yoke is fitted between the plurality of the raised units.

10. The vibration generator according to claim 1, wherein a top surface of the protrusion is aligned with a top surface of the yoke.

11. The vibration generator according to claim 1, wherein a longitudinal length of the protrusion and the aperture of the yoke extend in the winding axis direction of the planar coil.

12. The vibration generator according to claim 1, wherein the yoke includes at least two apertures, the vibrator includes at least two protrusions that respectively fit within the at least two apertures of the yoke, the at least two protrusions and the at least two apertures respectively are aligned along a longitudinal axis of the vibrator, and the at least two protrusions and the at least two apertures each extend in the winding axis direction of the planar coil.

13. The vibration generator according to claim 1, wherein a width of the aperture is substantially identical in the vibrating direction of the vibrator.

14. The vibration generator according to claim 1, wherein a first width in a frame side of the protrusion is within a second width in a vibrator side of the aperture in the vibrating direction of the vibrator.

15. The vibration generator according to claim 1, wherein a diameter of the protrusion is uniform in an axial direction of the protrusion.

16. The vibration generator according to claim 1, wherein a diameter of the aperture is uniform in an axial direction of the protrusion.

* * * * *